(12) United States Patent
Vance et al.

(10) Patent No.: US 6,442,526 B1
(45) Date of Patent: Aug. 27, 2002

(54) SYSTEM FOR CORPORATE TRAVEL PLANNING AND MANAGEMENT

(75) Inventors: Arlene M. Vance, Flower Mound; Kerry Balch, Dallas; Karl Vochatzer, Flower Mound; Cynthia Sawtell, Arlington; Sherry Williams, Dallas, all of TX (US)

(73) Assignee: The Sabre Group, Inc., Fort Worth, TX (US)

(*) Notice: Subject to any disclaimer, the term of this patent is extended or adjusted under 35 U.S.C. 154(b) by 0 days.

(21) Appl. No.: 09/273,254

(22) Filed: Mar. 22, 1999

Related U.S. Application Data

(63) Continuation-in-part of application No. 08/951,630, filed on Oct. 16, 1997, which is a continuation of application No. 08/524,381, filed on Sep. 6, 1995, now abandoned.

(51) Int. Cl.[7] .............................................. G06F 17/60
(52) U.S. Cl. ............................................. 705/5; 705/30
(58) Field of Search ............................... 705/1, 5, 6, 10, 705/34, 40, 13, 30; 340/825.28, 825.29

(56) References Cited

U.S. PATENT DOCUMENTS

| | | |
|---|---|---|
| 4,862,357 A | 8/1989 | Ahlstrom et al. |
| 4,922,439 A | 5/1990 | Greenblatt |
| 5,021,953 A | 6/1991 | Webber et al. |
| 5,191,523 A | 3/1993 | Whitesage |
| 5,202,985 A | 4/1993 | Goyal |
| 5,237,499 A | 8/1993 | Garback |
| 5,253,166 A | 10/1993 | Dettelbach et al. |
| 5,270,921 A | 12/1993 | Hornick |
| 5,311,425 A | 5/1994 | Inada |
| 5,331,546 A | 7/1994 | Webber et al. |
| 5,467,268 A | 11/1995 | Sisley et al. |
| 5,570,283 A | 10/1996 | Shoolery et al. |
| 5,644,721 A | 7/1997 | Chung et al. |
| 5,648,900 A | 7/1997 | Bowen et al. |
| 5,832,454 A | 11/1998 | Jafri et al. |

FOREIGN PATENT DOCUMENTS

| | | |
|---|---|---|
| EP | 0 660 251 A2 | 6/1995 |
| WO | WO 89/07798 | 8/1989 |
| WO | WO 92/15063 | 9/1992 |
| WO | WO 93/10502 | 5/1993 |
| WO | WO 97/08639 | 3/1997 |

OTHER PUBLICATIONS

Fried, Lisa I., "USTravel Star May Rise with Pritzkers," Business Travel News, CMP Publications, Inc., Monday, Nov. 22, 1993, Issue: 275.

David Vis, "TraveLogix Launches On–Line Service," Travel Weekly, vol. 54, No. 6, Section 1, Monday, Jan. 23, 1995, pp. 57 and 60.

Isae Wada, "Rosenbluth Int'l, AT&T to Unveil Cost–Tracking Tool for Clients,"Travel Weekly, vol. 54, No. 59, Thursday, Jul. 27, 1995, p. 3.

Cheryl Rosen, "Amex Offers Software to Help Create a Travel Policy," Business Travel News, Sep. 4, 1995, Issue 325, p. 22.

Mary Ann McNulty, "Expense Data Product Deluge," Business Travel News, Jul. 17, 1995, Issue 321, pp. 1 and 52.

Mary Ann McNulty and Cheryl Rosen, "Carlson, Amex: T&E Automation Generation," Business Travel News, Jul. 17, 1995, Issue 321, pp. 1, 50, and 51.

(List continued on next page.)

*Primary Examiner*—Frantzy Poinvil
(74) *Attorney, Agent, or Firm*—Finnegan, Henderson, Farabow, Garrett & Dunner LLP

(57) ABSTRACT

A system and method for processing travel data and travel receipts. Travel data including travel segments is received by the system. Receipts for the trip are also received from a credit card provider. The received credit card data and travel data are each converted into a predefined format. The converted information is compared to match information in the receipts and the travel data such as chain codes or dates of travel. A list of matching data is output, such as to use in preparing an expense report.

15 Claims, 61 Drawing Sheets

OTHER PUBLICATIONS

E–Mail, Electronic Ticket Delivery On The Rise, Corporate Travel, 1994 Black Book Issue, vol. IX, No. 11, p. 67 (month unavailable).

Mary Brisson, "EDS Pauses But Widens Sights," Business Travel news, Issue 299, Oct. 10,1994, pp. 1, 8, and 42.

Jennifer Dorsey, "Carlson Wagonlit's Booking, Expense–Reporting Systems Bow," Travel Weekly, vol. 54, No. 60, Monday, Jul. 31, 1995, p. 33.

TravelNet, Inc. Brochure (undated).

David Vis, "Worldview: On–Line Product Limited," Travel Weekly, vol. 53, No. 103, Thursday, Dec. 29, 1994.

VIN.net™ Brochure (undated).

Travel Man, Travel Agency Management Reporting Software, Brochure (undated).

Wendy Pickering, "TravelNet lets corporation tackle travel costs in–house," PC Week, Oct. 2, 1995.

Laura Del Rosso, "Software Firm Rolls Out Travel Management Product," Travel Weekly, Dec. 11, 1995.

Ed Leefeldt, "Plane Truth, Airline Reformer Kevin Mitchell Preaches That Frequent–Flier Miles Must Go," Your Guide to Money and Markets, Bloomberg Personal, The Dallas Morning News, Oct., 1994, pp. 4–9.

Jonathan Dahl, "Many Bypass the New Rules of the Road," The Wall Street Journal, Section B1, Thursday, Sep. 29, 1994.

Rik Fairlie, "Data System Being Sold Directly to Corporations," Travel Weekly, Oct. 4, 1993, pp. 53, 54, and 56.

Travel Information Management Newsletter, vol. 2, No. 2, Fall 1993.

Travel Information Management User Notes, "Version 1.5 Overview," Special Edition, Winter 1995.

"Travel Manager's Workstation" Brochure, PRISM Group, Inc. (undated).

AmadeusPro Sale, Functional Overview, Aug. 1995.

AmadeusPro Sale, "Train the Trainer" Course, Aug. 1995.

AmadeusPro Sale, Product Guide, Mar. 1994.

"Introducing AmadeusPro Sale," Aug. 1995.

AmadeusPro Sale 2.0 (OS/2 Version) Walkabout, Apr. 1995.

System One Workbook and User Guide, Sep. 1995.

"How To Use The Online Index For: ACCESS Product Guide," Sep. 1995.

Letter, Fantasia Information Network (NZ) Limited to Sydney Yap, Manager, Stars Travel International, Jun. 1995.

System One —Workbook block diagrams, Sep. 1995.

SABRE TRAVEL PLANNER

RESERVATION EDIT VIEW REQUEST OPTIONS HELP

TRIP ACTIVITY LOG

| JAN | FEB | MAR | APR | MAY | JUN | JUL | AUG | SEP | OCT | NOV | DEC | 1995 |

HOTEL LIST - CHICAGO, IL

PLEASE SELECT A HOTEL FROM THE LIST BELOW BY DOUBLE-CLICKING ON THE LINE OF YOUR CHOICE OR BY SINGLE-CLICKING THE LINE OF YOUR CHOICE AND PRESSING THE "SELECT HOTEL" BUTTON.

HOTEL LIST:

| CO PREF | PERS PREF | CHAIN | PROPERTY | CITY | USD ($) |
|---|---|---|---|---|---|
| | | HILTON | PALMER | CHICAGO, IL | 121.00 |
| | ✓ | HOLIDAY INN | CITY CENTER | CHICAGO, IL | 140.00 |
| | ✓ | HOLIDAY INN | MART PLAZA | CHICAGO, IL | 109.00 |
| ✓ | | HYATT | HYATT | CHICAGO, IL | 149.00 |
| | | HYATT | PARK HYATT | CHICAGO, IL | 179.00 |
| | | MARRIOT | CITY CENTER | CHICAGO, IL | 158.00 |

SELECT HOTEL
MODIFY SEARCH...
CANCEL
MORE HOTELS...
HOTEL DETAILS...

?

388

RESERVED:
AMERICAN
DEPART: D
JULY 6, 1
ARRIVE: O
JULY 6, 1

RESERVED:
AMERICAN
DEPART: O
JULY 7, 1
ARRIVE: D
JULY 7, 1

| | 2 | 3 | 4 | 5 | 6 | 7 | 8 |

STATUS LINE   7/02/1995

DETAILED ITINERARY...

MESSAGE LINE

| CO PREF | PERS PREF | COMPANY | TYPE | LOCATION | MILES | USD ($) |
|---|---|---|---|---|---|---|
| | | ALAMO | MID-SIZE | ON TERM | UNL | 56.99 |
| | ✓ | AVIS | MID-SIZE | ON TERM | UNL | 57.99 |
| | ✓ | BUDGET | MID-SIZE | ON TERM | UNL | 54.99 |
| ✓ | | DOLLAR | MID-SIZE | ON TERM | UNL | 58.99 |
| | | ENTERPRISE | MID-SIZE | OFF ARPT | UNL | 58.99 |
| | | HERTZ | MID-SIZE | ON TERM | UNL | 60.99 |

* PRICE IS BASED ON A DAILY RATE AND DOES NOT INCLUDE TAXES, INSURANCE, FUEL COSTS OR CHARGES, AND ANY OTHER MISCELLANEOUS CHARGES OR FEES.

EXPENSE DATE RANGE FOR JAMES P. KELVIN — 458

ENTER EXPENSE REPORT HEADER INFORMATION BELOW

PURPOSE TRIP/EXPENSE: NEW PRODUCT DISCUSSION - CHICAGO

START DATE: 08/11/95

END DATE: 08/14/95

DEFAULT PROJECT: CC000

OK — 460

CANCEL

AIR ITEM DETAIL

CHARGES

| | |
|---|---|
| TICKET PRICE: | $812.50 |
| CURRENCY: | USD-US DOLLAR → FX |
| TAX AMOUNT: | $0.00 |
| AMOUNT IN USD: | $812.50 |
| TICKET #: | 7442222104 |
| AMOUNT TYPE: | R-REIMBURSABLE → |

EXPLANATION — 466

| ORIGINATION CITY | DESTINATION CITY | CLASS OF SERVICE | CARRIER | DATE | UPGRADE FEE |
|---|---|---|---|---|---|
| ▶ DFW-DALLAS/FT. | ORD-CHICAGO | Y-COACH | AA-AMERICAN | 8/11/95 | $0.00 |
| * ORD-CHICAGO | DFW-DALLAS/FT. | Y-COACH | AA-AMERICAN | 8/14/95 | $0.00 |

— 464

[OK] — 468  [CANCEL]  [?]

FIG. 16D

HOTEL ITEM DETAIL — 476

HOTEL BOOKING
- HOTEL CITY CODE: ORD-CHICAGO O'HARE →
- HOTEL NAME: O'HARE HILTON
- HOTEL ZIP: 60606
- CHAIN CODE: HILTON INTERNATIONAL →
- CHECK-IN DATE: 08/11/95
- CHECK-OUT DATE: 08/14/95

CAR RECEIPT
- RECEIPT TOTAL: 183.48
- CURRENCY: USD-US DOLLAR →  [FX]
- ⦿ DAILY DETAIL
- ○ TOTAL
- AMOUNT TYPE: [ ]
- ☐ VALUE ADDED TAX

| DATE | AMOUNT | TAX | AMOUNT TYPE | DESCRIPTION |
|---|---|---|---|---|
| 08/11/95 | $85.00 | $6.74 | R-REIMBURSABLE | SINGLE WITH BATH |
| 08/11/95 | $85.00 | $6.74 | N-NON-REIMBURSABLE | SINGLE WITH BATH |

- SALES TAX: $13.48     COMPANY PAID: $0.00
- TOTAL AMOUNT: $183.48     NON-REIMBURSABLE: $91.74
- AMOUNT IN USD: $183.48     REIMBURSABLE: $91.74

[BREAK DOWN RECEIPT]   [OK] — 478   [REPEAT ROW] [REMOVE ROW] [CANCEL] [?]

*FIG. 16E*

MEALS DETAIL — 480

DATES
- START DATE: 08/11/95
- STOP DATE: 08/14/95

REIMBURSEMENTS METHODS
- ○ ACTUAL RECEIPTS
- ● PER DIEM
- RATE TYPE: COMPANY →
- MEAL CITY: ORD-CHICAGO O'HARE →

| DATE | MEAL | CITY | AMOUNT | TAX | AMOUNT TYPE | CURRENCY |
|---|---|---|---|---|---|---|
| 08/11/95 | DAILY | ORD-CHICAGO | $38.00 | $0.00 | R-REIMBURSABLE | USD-1 |
| 08/12/95 | DAILY | ORD-CHICAGO | $38.00 | $0.00 | R-REIMBURSABLE | USD-1 |
| 08/13/95 | DAILY | ORD-CHICAGO | $38.00 | $0.00 | R-REIMBURSABLE | USD-1 |

- SALES TAX: $0.00    COMPANY PAID: $0.00
- RECEIPTS TOTAL: $68.00    NON-REIMBURSABLE: $0.00
- AMOUNT IN USD: $68.00    REIMBURSABLE: $68.00

[REMOVE ROW]   [OK] — 482   [CANCEL]   [?]

*FIG. 16F*

ENTERTAINMENT DETAIL

BUSINESS ENTERTAINMENT DETAIL — 484

PURPOSE OF ENTERTAINMENT: LUNCH DISCUSSION

START DATE: 08/11/95   PLACE: PALMER HOUSE-HILTON   TOPIC: NEW PRODUCT DESIGN

STOP DATE: 08/14/95   RECEIPT TOTAL: $63.87   CURRENCY: USD-US DOLLAR   FX

☐ VALUE ADDED TAX

| NAME | AMOUNT | COMPANY | AFFILIATION |
|------|--------|---------|-------------|
| SUSAN CLARK | $59.00 | SANDERSON PLASTICS, INC. | V.P. MARKETING |
| ROGER SANDERSON, Jr. | | SANDERSON PLASTICS, INC. | PRESIDENT |

| DATE | TAX | AMOUNT TYPE | ENT. TYPE | DESCRIPTION |
|------|-----|-------------|-----------|-------------|
| 08/11/95 | $4.87 | R-REIMBURSABLE | MEAL | |

SALES TAX:              $0.00       COMPANY PAID:      $0.00
TOTAL AMOUNT:           $63.87      NON-REIMBURSABLE:  $0.00
AMOUNT IN USD:          $63.87      REIMBURSABLE:      $963.87

[OK] — 486   [REPEAT ROW]   [REMOVE ROW]   [CANCEL]   [?]

EXPENSE REPORT FOR JAMES P. KELVIN — 502

FILE  EDIT  VIEW  OPTIONS  HELP

EMPLOYEE #: 5051232     FROM: 08/11/95     THROUGH: 08/14/95     EXP.RPT #

| DATE | EXPENSE TYPE | CITY | AMOUNT | EXP ALLOC | AMT TYPE | RECEIPT ALLOC | APPROV STATUS |
|---|---|---|---|---|---|---|---|
| 08/11/95 | AIR | DFW-DALLAS/FT. WORTH | $432.00 | | C | | |
| 08/11/95 | CAR | ORD-CHICAGO O'HARE | $43.52 | | R | | |
| 08/11/95 | HOTEL | ORD-CHICAGO O'HARE | $103.48 | | R | | |
| 08/11/95 | MEAL | ORD-CHICAGO O'HARE | $68.00 | | R | | |
| 08/11/95 | ENTERTAIN | ORD-CHICAGO O'HARE | $63.87 | | R | | |

EXPENSE REPORT TOTAL:  $790.87   [CALCULATE TOTALS]   [REMOVE ROW]

[ENTER DETAIL]   [ALLOCATE EXPENSE..]   [SAVE]   [CANCEL]

FIG. 16M

SYSTEM FOR CORPORATE TRAVEL PLANNING AND MANAGEMENT

This application is a continuation-in-part of U.S. patent application Ser. No. 08/951,630, filed Oct. 16, 1997, now pending, which is a continuation of U.S. patent application Ser. No. 08/524,381, filed Sep. 6, 1995, now abandoned.

Applicants are attaching copies of the filing receipts for the pertinent applications. A Request For Corrected Filing Receipt is being filed concurrently herewith.

FIELD OF THE INVENTION

This invention relates in general to a travel and transportation information system, and in particular to an integrated database system that communicates with a credit card provider and a travel planner to match travel plans to credit card receipts.

BACKGROUND OF THE INVENTION

Historically, corporate travel has often escaped the close scrutiny by management that was used for every other function of the corporation. Travel dollars were seen as a necessary evil and were spent until the corporate balance sheet showed more problem than promise. Recently, corporations have aggressively examined every process and paradigm to re-engineer and transform themselves into a lean and highly-productive corporate machine that can support success and growth. As a result, travel dollars became one of the first expenses tightly controlled or cut.

Given that approximately $130 billion were spent on travel in 1994, Corporate Travel Managers are examining and implementing a variety of solutions to manage costs and change the aura that typically surrounds corporate travel expenses. For example, corporations have consolidated travel management in credit card services, published corporate travel policies, and mandated the use of preferred travel providers.

Corporate policies, however, that force a frequent traveler to sit through a two hour connection or stay in a less than mid-line hotel off the beaten path have driven the typical frequent traveler to come up with creative ways to circumvent the travel policy in order to meet their own personal requirements. Frequent travelers are bypassing policy at every turn to maintain their productivity and to take advantage of any perks that compensate them for long hours away from home. This scenario compounds the already huge information deficit Corporate Travel Managers are struggling to resolve including travelers' circumvention of corporate policy which results in travel data being totally lost.

From a corporate standpoint, travel has an impact on the traveler, the Corporate Travel Manager, the Department Manager, Accounts Payable and the Corporation itself. The traveler seeks an easy and fast way to arrange travel. Under conventional methods, however, the traveler must arrange trips through a series of telephone conversations with a travel management firm or agency. In addition, the traveler seeks an automated expense reporting system. Present methods which combine manual and automated forms may require repetitive data input of previously requested travel information for report presentation. In addition, the approval and reimbursement of expenses is typically manual.

The Corporate Travel Manager needs a true summary of the total corporate travel expenses by category. Presently, the Corporate Travel Manager may estimate travel expenses and category breakdowns based upon report information from Travel Management Firms, corporate credit card companies, or preferred vendors. These estimates may be inaccurate, however, if the traveler made on-the-road trip changes, did not comply with usage of corporate travel agencies or credit card, or stayed in a hotel that is not the same as the one which was booked. Corporate Travel Managers must also stay informed as to the status of preferred vendor agreements. Historically, summaries of the corporation's actual market share performance was provided by travel management firms or the preferred vendor. These summaries, however, were typically not provided on a timely basis, provided minimal information on a pre-travel basis, and provided no method for self-validation of performance.

Department managers need pre-travel reporting of travel expenses and possible violations of travel policy. Presently, random manual notification of policy violations is provided by travel management firms to the Corporate Travel Manager. Typically, this notification is insufficient or not timely enough to allow Department Managers to enforce corporate policy on a pre-travel basis. Department Managers also desire an automated expense reporting system. Current methods require manual processing of approval and reimbursements of expenses by Department Managers.

Accounts Payable desires an automated processing system for expense reports. Current methods require manual auditing, posting, and payments of expense reports.

Many of the limitations on the current corporate travel planning and management systems stem from the corporate traveler's dependence on travel management firms. Travel management firms currently function as the central hub for all travel service and information regarding travel for the corporate traveler. There is a total reliance on the travel management firm by the travelers for trip planning and management as well as by the Corporate Travel Managers for summary reporting.

Therefore, a need has arisen for a corporate travel planning and management system which operates on a corporate database environment that allows automated travel planning from a corporate traveler's desktop, pre-travel decision support to inform a corporation of planned travel expenditures before corporate dollars are spent, and automated expense reporting.

There is also a need for automatic matching of credit card receipts to travel records to facilitate preparation of expense reports by travelers.

SUMMARY OF THE INVENTION

Systems and methods consistent with the principles of the present invention address these needs by having an integrated database system that formats credit card receipt data and travel plans to allow for automatic comparison of the data.

A system and method consistent with the principles of the present invention receives travel data with travel segments and expense receipts. Merchant information is extracted from each expense receipt and a chain code is assigned based on the merchant information. The assigned chain code is compared to chain codes associated with the travel data.

In one embodiment, merchant information is found in each travel segment. A chain code associated with the merchant information is determined. The chain codes associated with the travel segments are matched to the expense receipts by comparing chain codes associated with both.

In alternative embodiments many different pieces or combinations of pieces of data in the expense receipts and the travel data are compared to attempt to match the receipts to the travel segments. For example, travel dates and times may be used as the matching parameter.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1:
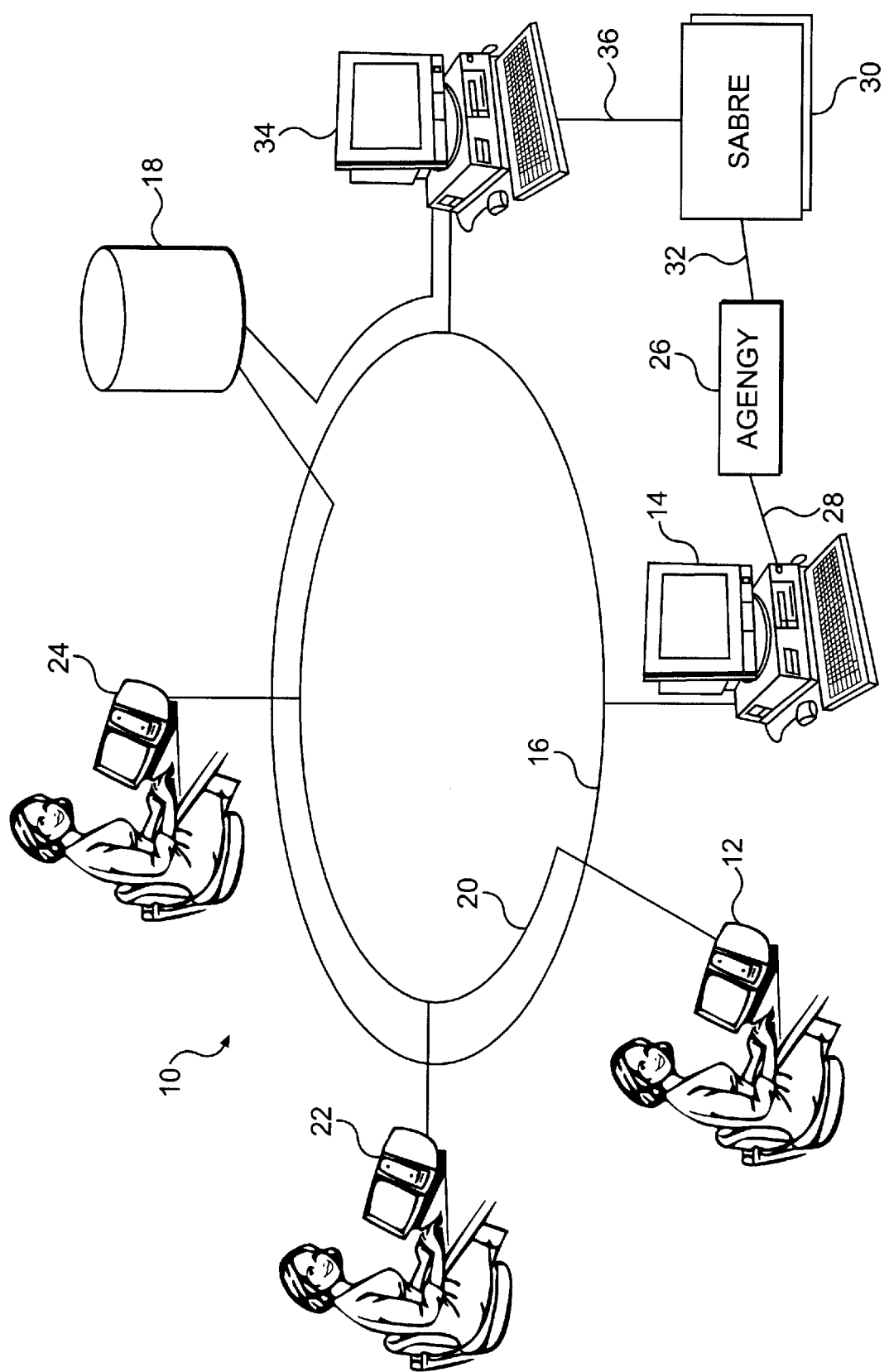
FIG. 1 is a simplified diagram of the platform of the present invention as it may look in a corporation.

The client-server system of the present invention for corporate travel planning and management 10 is shown in simplified platform diagram form in FIG. 1. The client interface of the present invention may be deployed on any conventional personal computer or client workstation 12, running a suitable operating system such as Windows, OS\2, or Macintosh. The client workstation 12 is in communication with an E-mail server 14 via a conventional network connection 16. The E-mail system may operate any standard E-mail protocol such as VIM or MAPI. The client workstation 12 is in communication with a corporate database server 18 via network connection 20. The corporate database server 18 may operate any open relational database environment such as Oracle or Sybase. The corporate database server 18 may be a pentium (NT), or Unix having 32–64 MB of memory.

A department manager workstation 22 is in communication with the E-mail server 14 via network connection 16 and the corporate database server 18 via the network connection 20. The department manager workstation 22 may be any conventional personal computer with a suitable operating system as specified above. The travel manager workstation 24 is in communication with the E-mail server 14 via network connection 16 and in communication with the corporate database server 18 via the network connection 20. The travel manager workstation 24 may be any conventional personal computer with a suitable operating system.

The E-mail server 14 is in communication with any conventional travel agency 26 via a telecommunication link 28. The telecommunication link 28 preferably consists of high speed modems and telephone lines or the equivalent thereof. The travel agency 26 is in communication with any airline computerized reservation system such as the SABRE Computerized Reservation System 30 via a telecommunication link 32. The corporate database server 18 communicates with the gateway 34 using a TCP\IP sockets interface, which is the industry standard cross-platform interprocess communication protocol. The gateway 34 will provide a Generalized Data Stream (GDS) style request and reply interface with the CRS 30 via telecommunication link 36.

Figure 2:
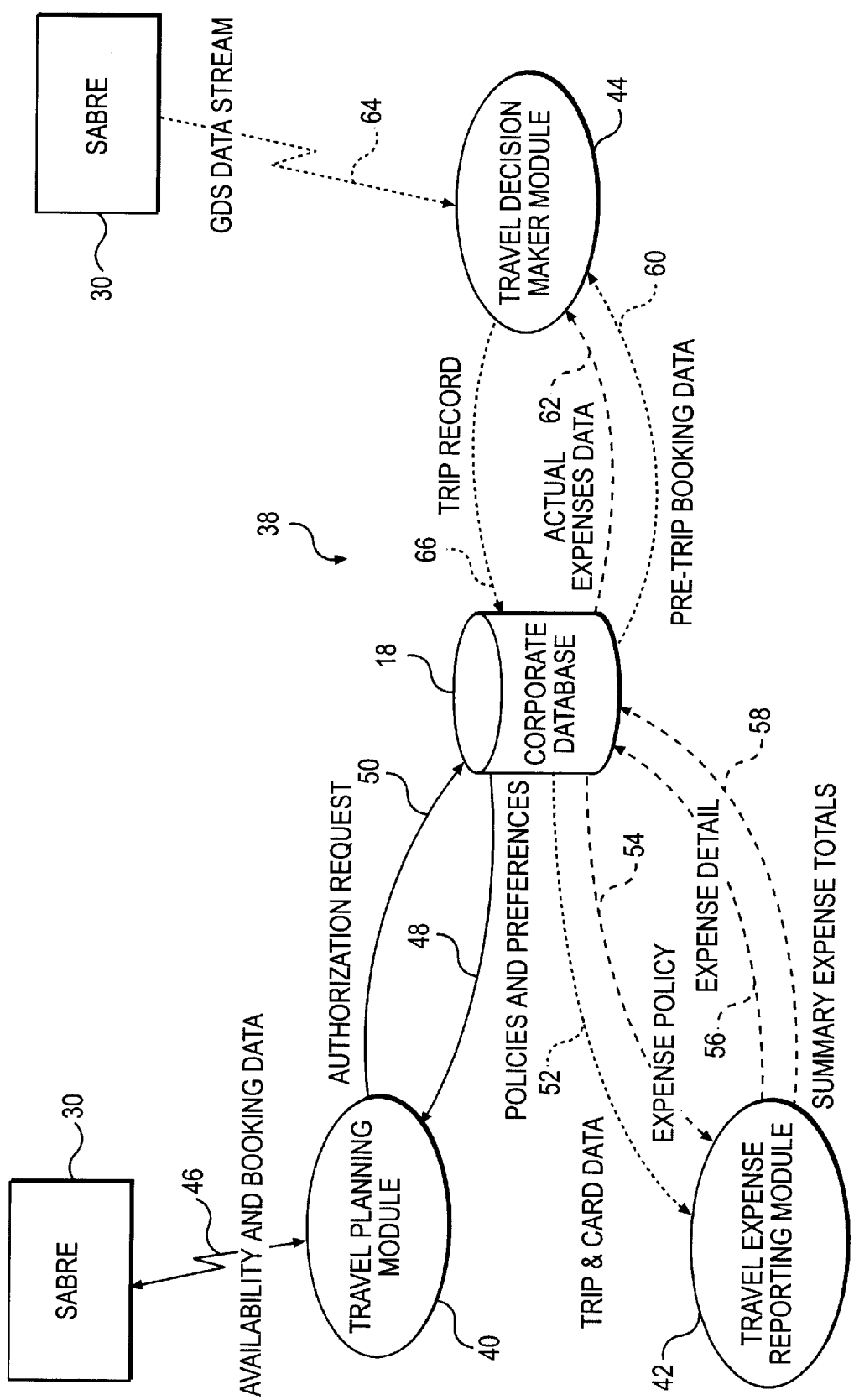
FIG. 2 is a simplified block diagram of the modules of the present invention.

A simplified block diagram of the corporate travel planning and management system generally designated 38 is illustrated in FIG. 2. The corporate centric client-server system 38 comprises Travel Planning module 40, Travel Expense Reporting module 42, and Travel Decision Maker module 44. From the client workstation 12, the Travel Planning module 40 receives and sends availability, fare and booking data 46 from the CRS 30. The Travel Planning module 40 receives policies and preferences data 48 from the corporate database 18 and sends authorization request data 50 to the corporate database 18. The Travel Expense Reporting module 42 receives trip and card data 52 and expense policy data 54 from the corporate database 18. The Travel Expense Reporting module 42 sends expense detail data 56 and summary expense totals 58 to the corporate database 18. The Travel Decision Maker module 44 receives pre-trip booking data 60 and actual expenses data 62 from the corporate database 18. The Travel Decision Maker module 44 receives GDS data 64 from the CRS 30. The Travel Decision Maker module 44 sends trip record data 66 to the corporate database 18.

Figure 3:
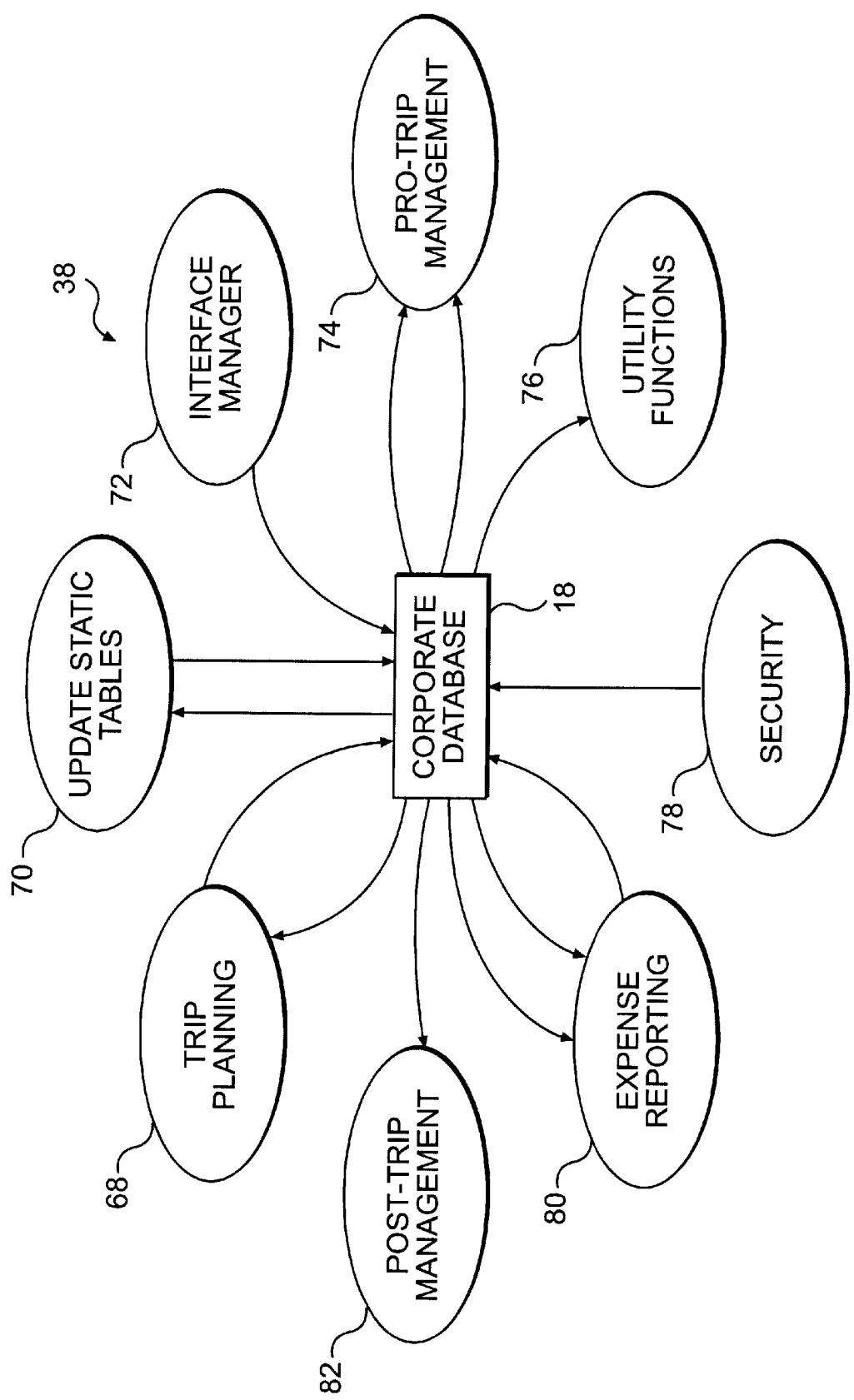
FIG. 3 is a simplified block diagram of the system of the present invention.

A simplified block diagram of the functional elements of the corporate centric clientserver system 38 is depicted in FIG. 3. The functional elements comprise trip planning 68, update static tables 70, interface manager 72, pre-trip management 74, utility functions 76, security 78, expense reporting 80, and post-trip management 82.

Figure 4:
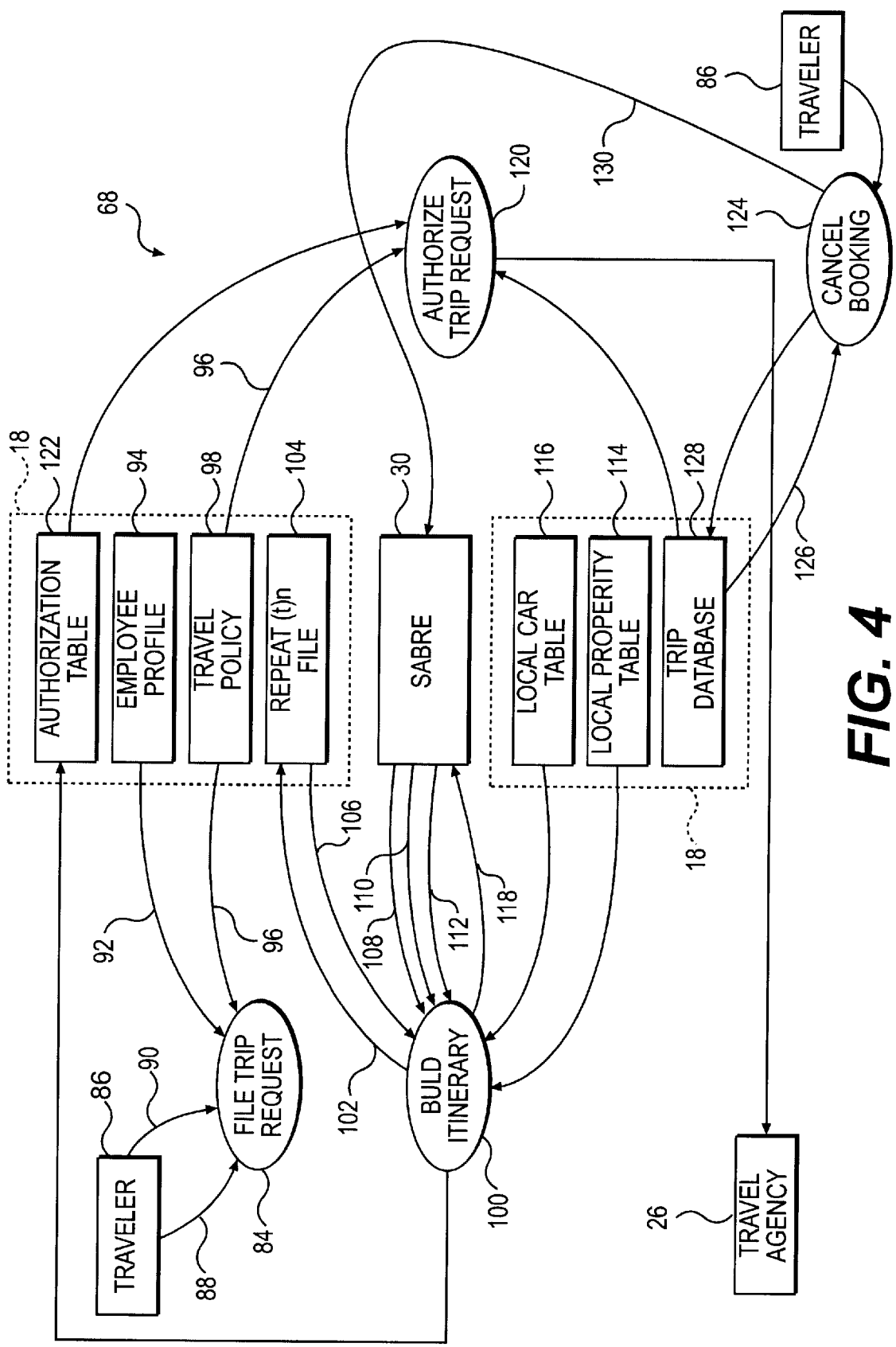
FIG. 4 is more detailed block diagrams of the trip planning system of FIG. 3.

Turning now to FIG. 4, the trip planning 68 of FIG. 3 is described in greater detail. The first step in trip planning 68 is a trip request process 84. Entry into the trip request process 84 can be done by either the corporate traveler 86 or by a corporate travel arranger (not pictured). The trip request process 84 may also be backfilled through a CRS PNR download if the trip originated with a telephone request. The Corporate traveler 86 must enter an employee number 88 and the trip parameters 90 during the trip request process 84. After the trip request process 84 has been initiated, the employee record data 92 is retrieved from the employee profile database 94 located in the corporate database 18. The corporate travel policy data 96 from the corporate travel policy database 98 located in the corporate database 18 is also downloaded during the trip request process 84. The employee profile database 94 includes information such as seat preferences, special meals, frequent flier, account numbers, hotels, car rental, connecting flights, and airline equipment preferences.

The next step in trip planning 68 is the build itinerary process 100. The build itinerary process 100 allows the traveler 86 to enter basic trip parameters and either request a booking or make a booking with direct access to CRS 30 availability and fare information or allows the traveler 86 to pull up saved, repeat itinerary data 102 from the repeat itinerary file database 104 and provide a new departure date and autofilled trip parameters for use in an availability display. For routine trips, the traveler 86 may fill the trip parameters section from stored repeat itinerary data 106 and subsequently add, modify or delete segments for the itinerary of a specific trip.

For standard or non-routine trips, the build itinerary process 100 allows the traveler 86 to enter basic trip parameters such as departure date, time and city, arrival date, time and city, and hotel and car requirements. The traveler 86 will input in a batch all the travel requirements (air, hotel, car) grouped by segment. The build itinerary process 100 via communication with CRS 30 displays flight availability data 108, fare data 110 and highlights preferred vendor data from the corporate travel policy 112. The traveler 86 is able to make only one selection from the availability data 108 for each segment. The traveler 86 can change selection if desired using the display window. As selections are made, an in-process itinerary will be built and displayed to the traveler 86 showing information as it is selected or adding to what has been previously selected. The in-process itinerary will display the associated cost of each item as well as a running total of the entire trip, including air, hotel, car and a grand total.

From the availability data 108, the traveler 86 may request a list of preferred hotels in the destination city. The display will highlight which hotels can be booked via CRS 30 access and also those that would need to be contacted directly. The traveler 86 can request availability at one or more of the preferred hotels. The build itinerary process 100 also allows display of preferred chains as well as preferred hotels specified to a city location which are stored in the local property table 114.

The traveler 86 may request a list of preferred rental car vendors through CRS 30. Special negotiated rates for a vendor in a specific city stored in local car table 116, when present, will override the data returned from CRS 30. The build itinerary process 100 returns a queued PNR 118 including air, hotel and car requirements to CRS 30.

The trip planning process 68 further comprises the authorized trip request process 120. The authorized trip request process 120 provides for the routing of the trip request form to the appropriate authorizer (not pictured) and provides the authorization utility. Once authorized, the traveler 86 is notified of the authorization electronically. Actual routing of the trip request form is determined in the authorization table 122 and the travel policy table 98. The routing may be to a specific person or a specific manager position. The trip request form is electronically signed for the traveler 86 before it is routed for approval. The approver is able to review a version of the trip request form that allows the approver to view the completed itinerary, the cost, the purpose for the trip and the remarks fields. The approver is also able to review the traveler's 86 request for a travel cash advance.

If the approver does not approve the request, the authorized trip request process 120 requires that the approver input a description of the reason for disapproval. The trip request is then routed back to the originator of the request. If the originator was a travel arranger, a copy of the disapproval will be sent to the traveler 86. If the approver does approve the request, it is routed to the next processing step, for example, travel agency 26. The trip request form is electronically signed for the approver whether the request is approved or disapproved.

Another feature of the trip planning 68 is the cancel booking process 124 which allows the traveler 86 a quick means of canceling a booked trip from the client workstation 12. The canceled booking process 124 displays an abbreviated list of all booked trip records whose departure date is equal to or greater than today's system date. The traveler 86 receives stored trip data 126 from the trip table 128 and may select a stored trip to cancel from the list. Once a canceled trip button is activated on the screen, the traveler 86 may send cancellation data 130 to the CRS 30. A response from the CRS 30 will be displayed back to the traveler 86 confirming the cancellation is complete.

Figure 5:
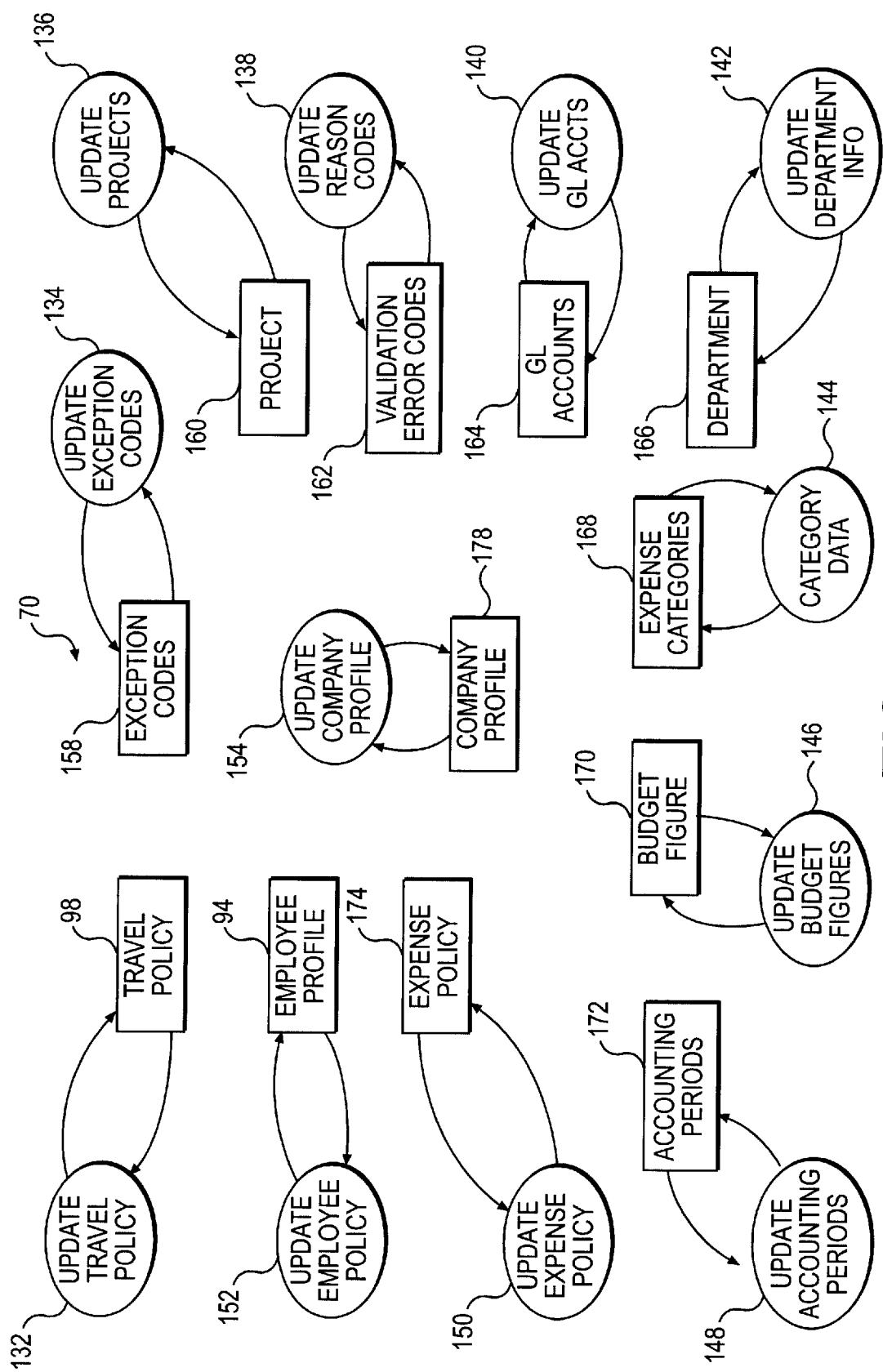
FIG. 5 is more detailed block diagrams of the update static tables system of FIG. 3.

Now referring to FIG. 5, a block diagram representing the update static tables process 70 of FIG. 3 is presented. All of the corporation's static tables are presumably part of the corporate centric client-server system 38 implementation process. Each corporation defines the static tables in order to start using the corporate centric client-server system 38. Typically, a system administrator inputs the update travel policy data 132, the update exception codes data 134, the update projects data 136, the update reason codes data 138, the update GL accounts data 140, the update department information data 142, the update category data 144, the update budget figures data 146, the update accounting periods data 148, the update expense policy data 150, the update employment profile data 152, the update company profile data 154, the travel policy table 98, the exception codes table 158, the project table 160, the validation error codes table 162, the GL accounts table 164, the department table 166, the expense categories table 168, the budget figures table 170, the accounting period table 172, the expense policy table 174, the employee profile table 94, and the company profile table 178, each of which are part of the larger corporate database 18. All static tables 70 have the ability to add new records, update existing records, and delete unused records.

Figure 6:
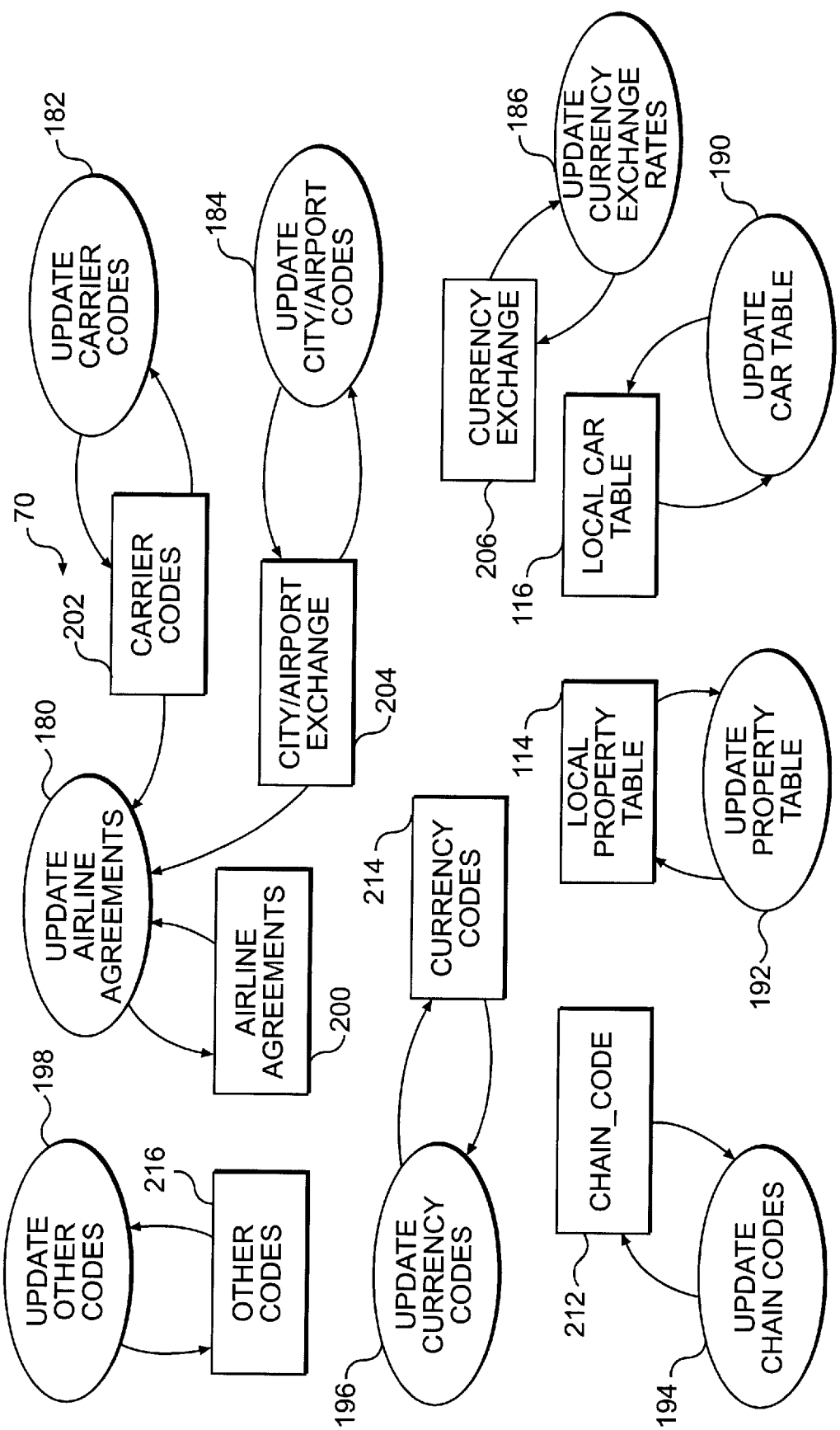
FIG. 6 is more detailed block diagrams of the update static tables system of FIG. 3.

Now referring to FIG. 6, the system administrator may update the static table 70 by inputting the update airline agreements data 180, the update carrier codes data 182, the update city/airport codes data 184, the update currency exchange rates data 186, the update car table data 190, the update property table data 192, the update chain codes data 194, the update currency codes data 196, and the update other codes data 198, respectively updating the airline agreements table 200, the carrier codes table 202, the city/airport codes table 204, the currency exchange table 206, the local car table 116, the local property table 114, the chain code table 212, the currency code table 214, and the other codes table 216, each of which are part of the corporate database 18.

Figure 7:
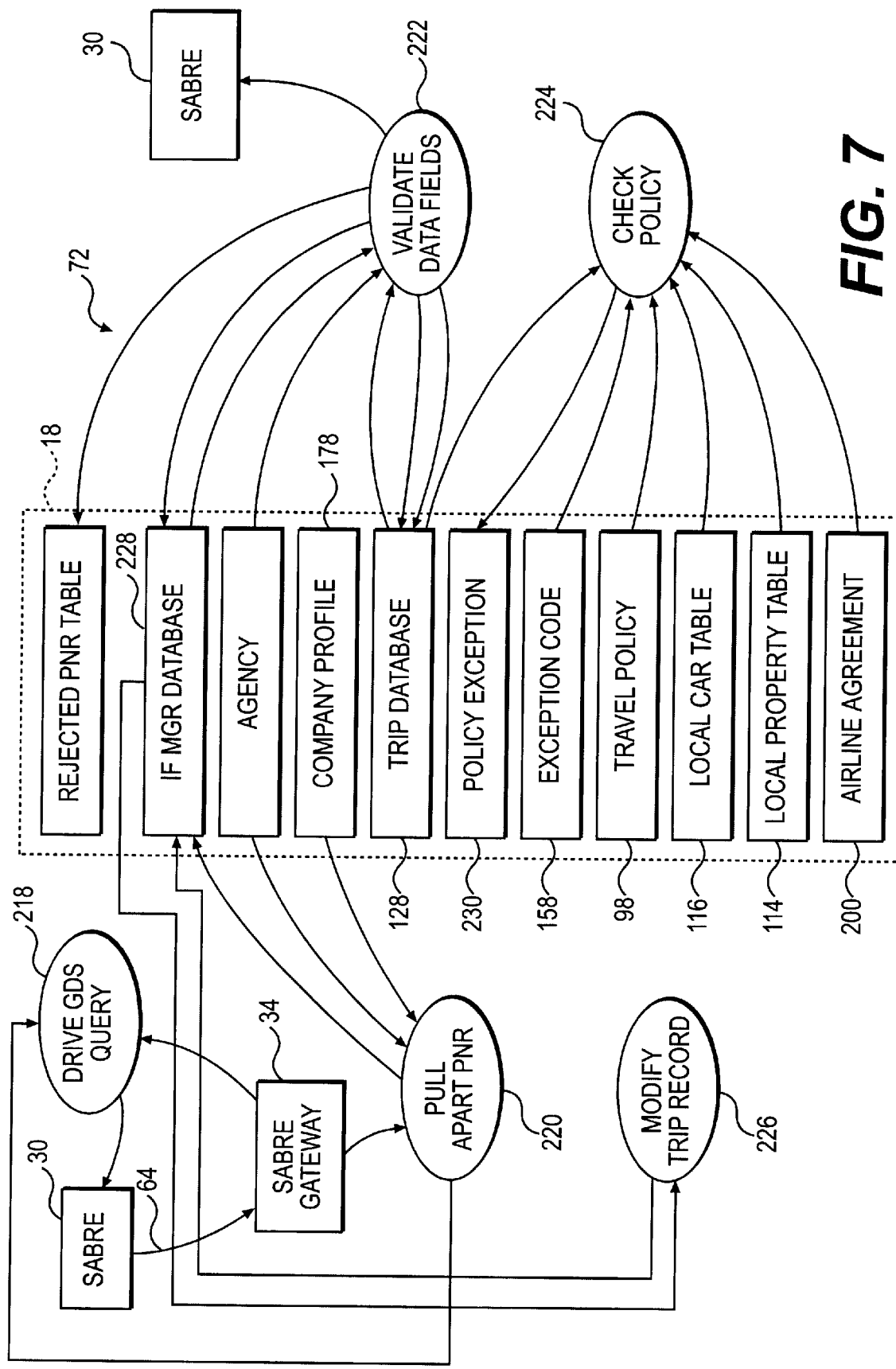
FIG. 7 is more detailed block diagrams of the interface manager system of FIG. 3.

Referring now to FIG. 7, a block diagram detailing the interface manager 72 of FIG. 3 is depicted. The interface manager 72 involves processing CRS 30 data which consists of five distinct processes: the drive GDS query process 218, the pull apart PNR process 220, the validate data fields process 222, the check policy process 224, and the modify trip record process 226. The drive GDS query process 218 resides on the CRS SABRE Gateway 34 and serves to retrieve the GDS data 64 for each PNR. After the GDS data 64 is retrieved, the GDS data 64 is forwarded to the corporate database 18 where the parsing of the stream is performed and the trip is inserted into the interface manager table 228.

The pull-apart PNR process 220 reads GDS data 64 and maps the CRS elements to the interface manager table 228.

The validate data fields process 222 ensures the integrity of the data being inserted into the trip table 128. An incomplete PNR or a PNR containing a value that cannot be found in the static tables 70 will be rejected by the validate data fields process 222 and the queued for reprocessing through CRS 30. The PNR's which pass the validation data fields process 222 are assigned a unique trip number that does not already exist in the trip table 128 and such valid trips are inserted into the trip table 128.

The check policy process 224 has a hierarchical order of application, for example, project policy takes precedence over employee policy and a negotiated hotel rate takes precedence over a company-preferred vendor. In the check policy process 224, each policy violation is flagged and the violation is assigned a code type based upon the nature of the violation. Depending upon how the violation is set up in the policy record, the violation will either simply be an item on a report, or it may be queued to an individual specified in the employee or project record for approval or rejection. The status of the violation is stored within the policy exception table 230. Data from trip table 128 is compared against data from the travel policy table 98, the local car table 116, the local property table 114, and the airline agreement table 200. If the check policy process 224 finds any violations, a code from the exception code table 158 is applied and then stored in the policy exceptions table 230.

The modify trip record process 226 allows the traveler 86 to maintain non-purged PNR's in the interface manager table 228. Maintenance may occur at two levels, a high-level delete of detail older than a specified date, or a modification utility which allows fixes to fields such as project I.D. which, once repaired, will enable the PNR to populate the trip table 128.

Figure 8:
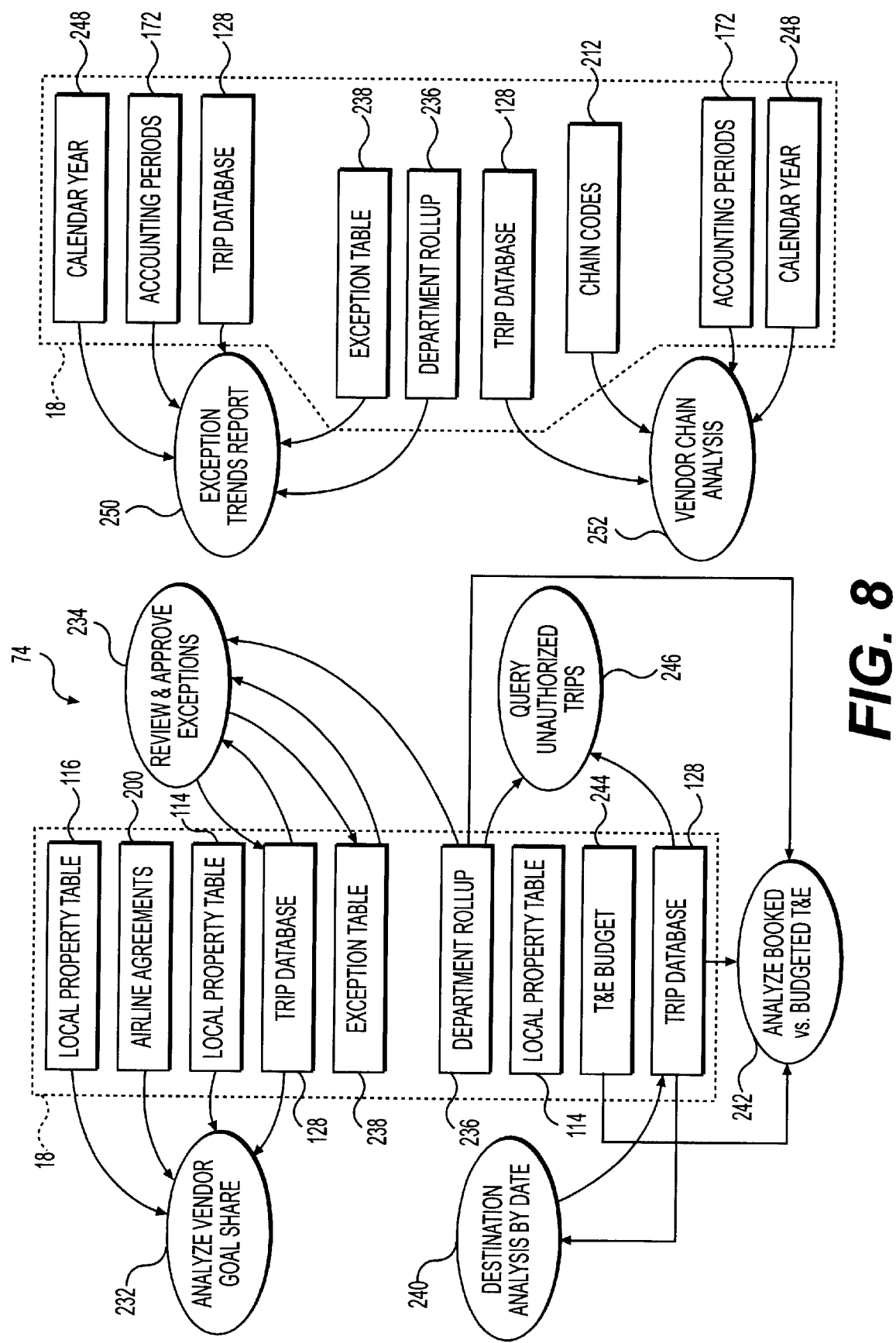
FIG. 8 is more detailed block diagrams of the pre-trip management system of FIG. 3.

Now referring to FIG. 8, a detailed block diagram of the pre-trip management 74 of FIG. 3 is illustrated. The analyze vendor goal share process 232 imports data from the local car table 116, the airline agreements table 200, the local property table 114, and the trip table 128. The analyze vendor goal share process 232 analyzes each preferred airline vendor on a specified city pair and divides the number of segments booked on that airline by the total number of segments booked and compares the obtained percentage with the share agreement for that airline.

The review and approve exceptions process 234 imports data from the trip table 128, the exception table 238, and the department roll-up table 236 and creates exception reporting for the overall corporation, an overall cost center, an individual, trend analysis, year-to-date totals, and chronic policy violators.

The destination analysis by date process 240 uses data from the trip table 128 and reports to the corporate travel manager all destination cities where multiple travelers 86 will be traveling on a given date or date range for the purpose of managing opportunities for obtaining zone fares or discounted group hotel rates.

The analyze booked versus budgeted travel and entertainment expense process 242 imports data from the trip table 128 and travel and expense budget table 244 to show projected cost of booked trips, a comparison between booked and budgeted expenses, and a trend analysis for forecasting if the travel budget will be met based upon trends.

The query unauthorized trips process 246 imports data from the department roll-up table 236 and trip table 128 to provide department managers or corporate travel managers information regarding unauthorized trips that require either authorization or cancellation. Department managers or Corporate Travel Managers may either cancel or authorize trips and electronic notification of canceled trips will be sent to the traveler 86.

The exception trends report process 250 imports data from the department roll-up table 236, the exception table 238, the trip table 128, the accounting periods table 172, and the calendar year table 248. The exception trends report process 250 provides a trend analysis of travel policy exceptions for a defined time frame. Both written and graphical reports show trends of exceptions by individual, by type, and by department as well as the known costs of those exceptions.

The vendor chain analysis process 252 imports data from the trip table 128, the chain codes table 212, the accounting periods table 172 and the calendar year table 248 and provides an analysis of the booked plus actual activity for a specific date range for a given hotel or car chain. The output includes a total transaction count for number of room/nights or car/days plus a summary of the dollar value of each transaction as well as an average room/car nights per booking and average daily rates.

Figure 9:
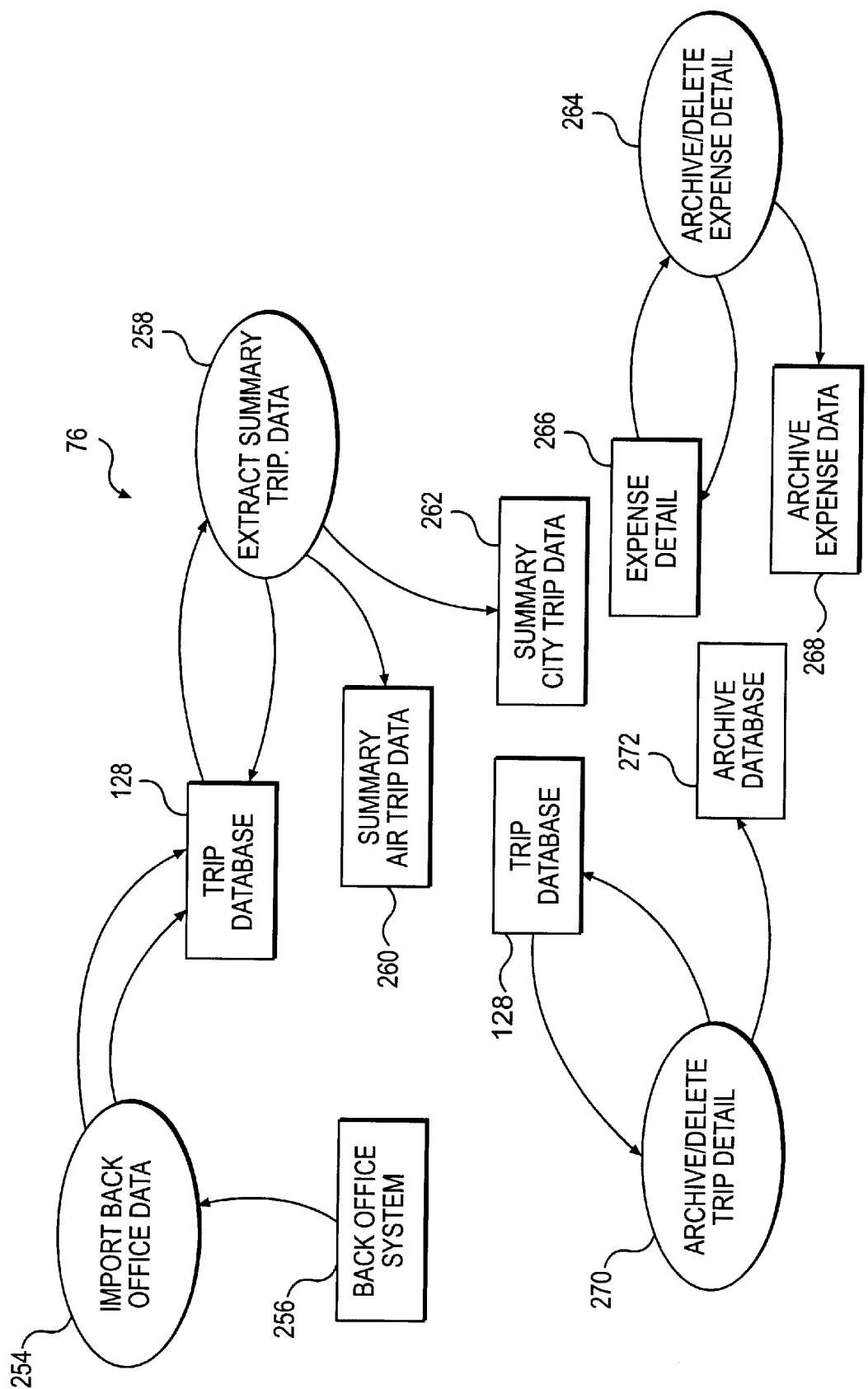
FIG. 9 is more detailed block diagrams of the utilities function system of FIG. 3.

Now referring to FIG. 9, a detailed block diagram of the utility functions 76 of FIG. 3 is depicted. The import back office data process 254 creates an electronic handoff of data from agency back office system 256 such as ADS or TravelBase, at a defined frequency. The import back office data process 254 is a means by which agency invoice numbers associated with tickets, refunds or exchanges are obtained by the corporate database 18.

The extract summary trip data process 258 provides regular updates to the trip table 128 on a predetermined basis (e.g. nightly) and provides data to the summary air trip table 260 and summary city trip table 262.

The archive/delete expense detail process 264 allows input of date parameters such that select expense detailed records that match date parameters are purged from the expense detail table 266 and placed in the archive expense table 268.

The archive/delete trip detailed process 270 allows input of the date parameters such that select trip records that match date parameters are purged from the trip table 128 and placed in the archive table 272.

Figure 10:
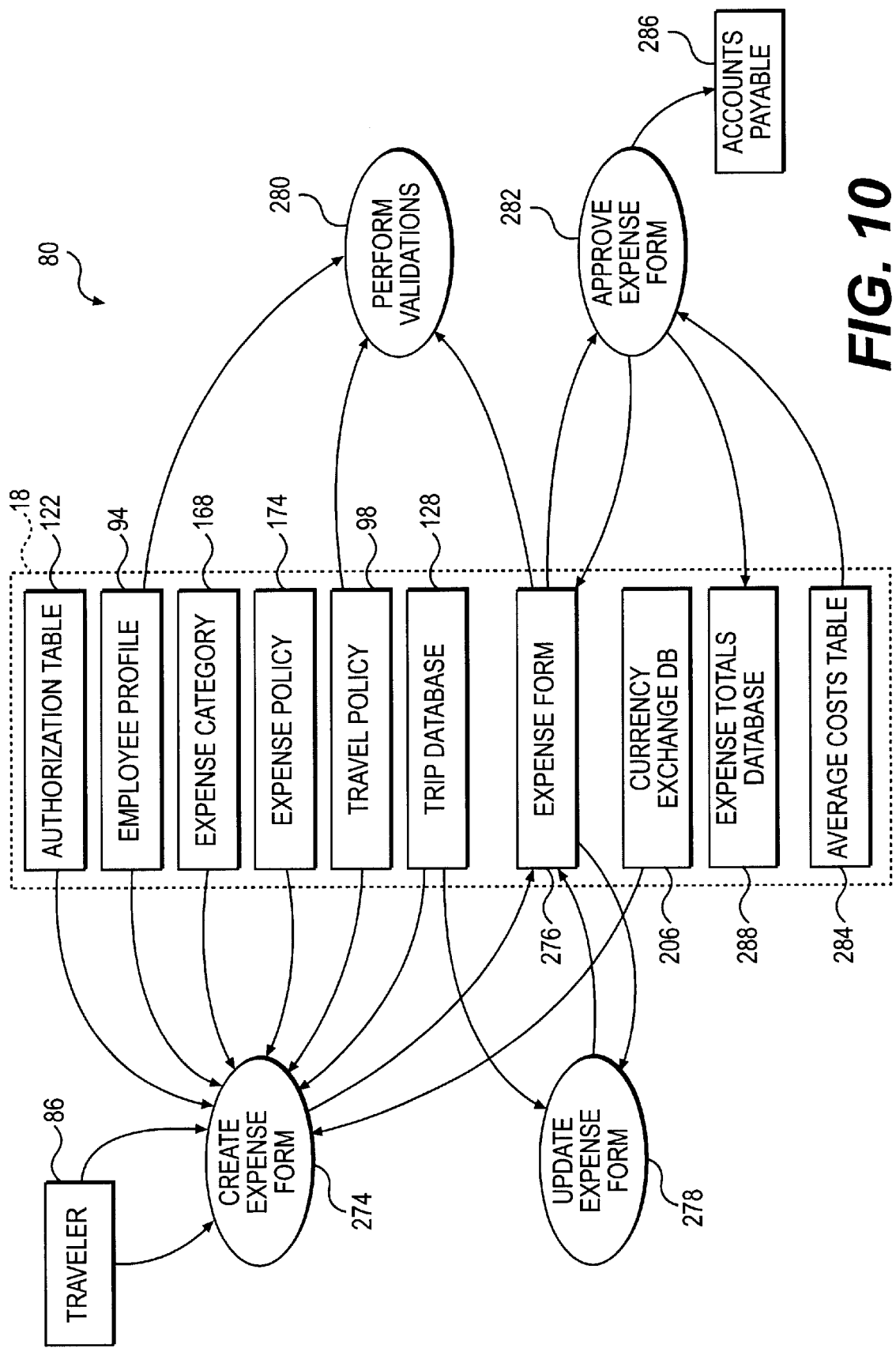
FIG. 10 is more detailed block diagrams of the expense reporting system of FIG. 3.

Now turning to FIG. 10, a detailed block diagram of the expense reporting 80 from FIG. 3 is illustrated. The create expense form process 274 provides secured access to the expense forms, autofills the forms with data from the employee profile table 94 and allows the traveler 86 to construct an expense report semi-automatically as well as by pulling stored data from the trip table 128. The create expense form process 274 imports data from the expense category table 168, the expense policy table 174, and the travel policy table 98, and provides this information to the traveler 86 so that the traveler 86 can construct a policy compliant expense report.

The create expense form process 274 also imports data from the currency exchange table and allows the traveler 86 to process currency exchange conversions. When the traveler 86 has completed the expense report, a filled expense form is electronically forwarded to the expense form table 276, where it is assigned a unique expense form number. The number is assigned the first time an expense form is saved. The number is associated with a optional receipt envelope which may be printed at any time after the initial saving of the expense report has taken place. There is also a traveler reference number to support pre-bar coded envelopes for receipts.

The update expense form process 278 allows the traveler 86 to modify or cancel an expense report. The traveler 86 may import expense form data from expense form table 276 and modify an expense form until it has been approved or may pull up disapproved expense forms for modification and resubmission. An unsubmitted or disapproved expense report may also be canceled.

The perform validations process 280 checks an expense form against data from the travel policy table 98 to identify unapproved policy violations. Policy violations on the expense form are highlighted and the approver has access to explanations for each of the errant fields. The approver will be able to approve the violations or return the form to the traveler 86 with comments.

The approve expense form process 282 comprises two methods of expense approval. First, the manager level approval gives the manager the option of rejecting an expense form if, for example, it exceeds the data provided from the average cost table 284. If the manager rejects the expense form, it can be routed back to the traveler 86 with comments. If the manager approves the expense form, it is routed to the Accounts Payable 286 for further processing. All approved expense data is also routed to the expense totals table 288. In the second case, the corporation can define situations when approval will be automatic and the expense form is routed directly to the Accounts Payable department 286.

Figure 11:
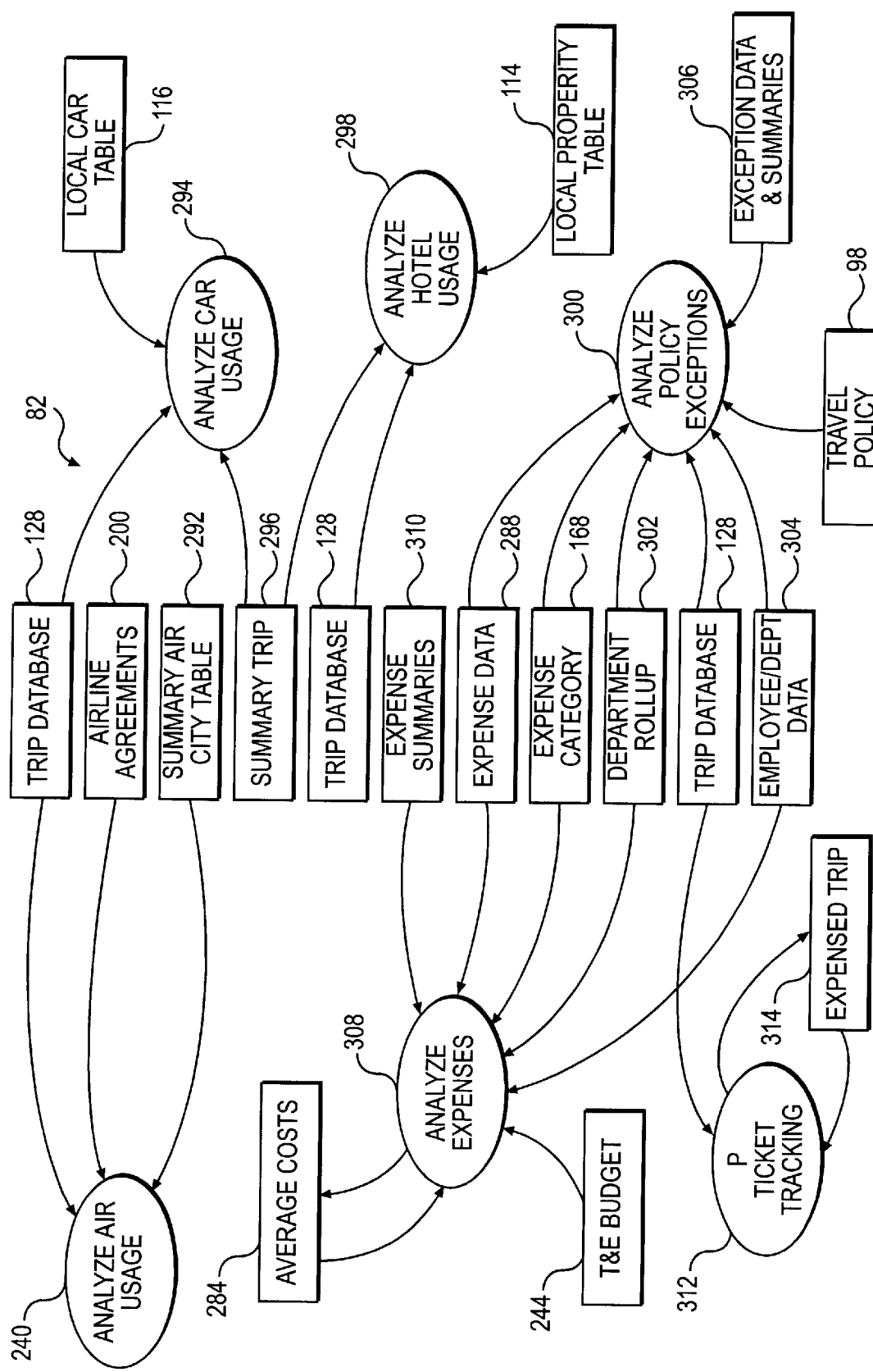
FIG. 11 is more detailed block diagrams of the post-trip management system of FIG. 3.

Now turning to FIG. 11, a detailed block diagram of the post-trip management 82 of FIG. 3 is depicted. The analyze air usage process 290 imports data from the trip table 128, the airline agreements table 200, and the summary air city table 292. The analyze air usage process 290 reports the percentage of goal share achieved for a specified city pair carrier, percent of goal share achieved for a carrier overall, overall usage for a given city pair, overall air cost for a given city pair, and average leg fare cost for a given city pair.

The analyze car usage process 294 imports data from the local car table 116, the trip table 128 and the summary trip table 296. The analyze car usage process 294 reports percent of goal share achieved for specified chain in a specified city, percent of goal share achieved for chain overall, overall usage for a given city, overall car dollar spent in a given city, overall chain usage, and average car rental day cost in each city. The analyze hotel usage process 298 imports data from the local property table 114, the summary trip table 296 and the trip table 128.

The analyze hotel usage process 298 reports percent of goal share achieved for a specified hotel chain in a specified city, percent of goal share achieved for a chain overall, overall usage for a given city, overall hotel dollars spent in a given city, overall chain usage, and average hotel night cost in each city.

The analyze policy exceptions process 300 imports data from the expense table 288, the expense category table 168, the department roll-up table 302, the trip table 128, the employee/department table 304, the travel policy table 98, and the exception data and summaries table 306. The analyze policy exceptions process 300 creates on request reports, for example, for monthly reporting of exceptions by employee and by type, overall monthly exception trends by employee and type, overall monthly exception trends by department and type, and overall exceptions by type and monthly trends.

The analyze expenses process 308 imports data from the expense summaries table 310, the expense table 288, the expense category table 168, the department roll-up table 302, the employee/department table 304, and the travel and expense budget table 244. The analyze expenses process 308 creates a report that shows trends by overall company, summary by department, summary by project, and summary by employee.

The ticket tracking process 312 imports data from the trip table 128 and the expense trip table 314. The ticket tracking process 312 reports on the status of any given ticket, lists tickets older than a given number of days that have not appeared on an expense report or been refunded or voided, lists tickets returned for refund which have not been credited, and reports unrefunded tickets or miscellaneous change orders available for exchange.

Figure 12:
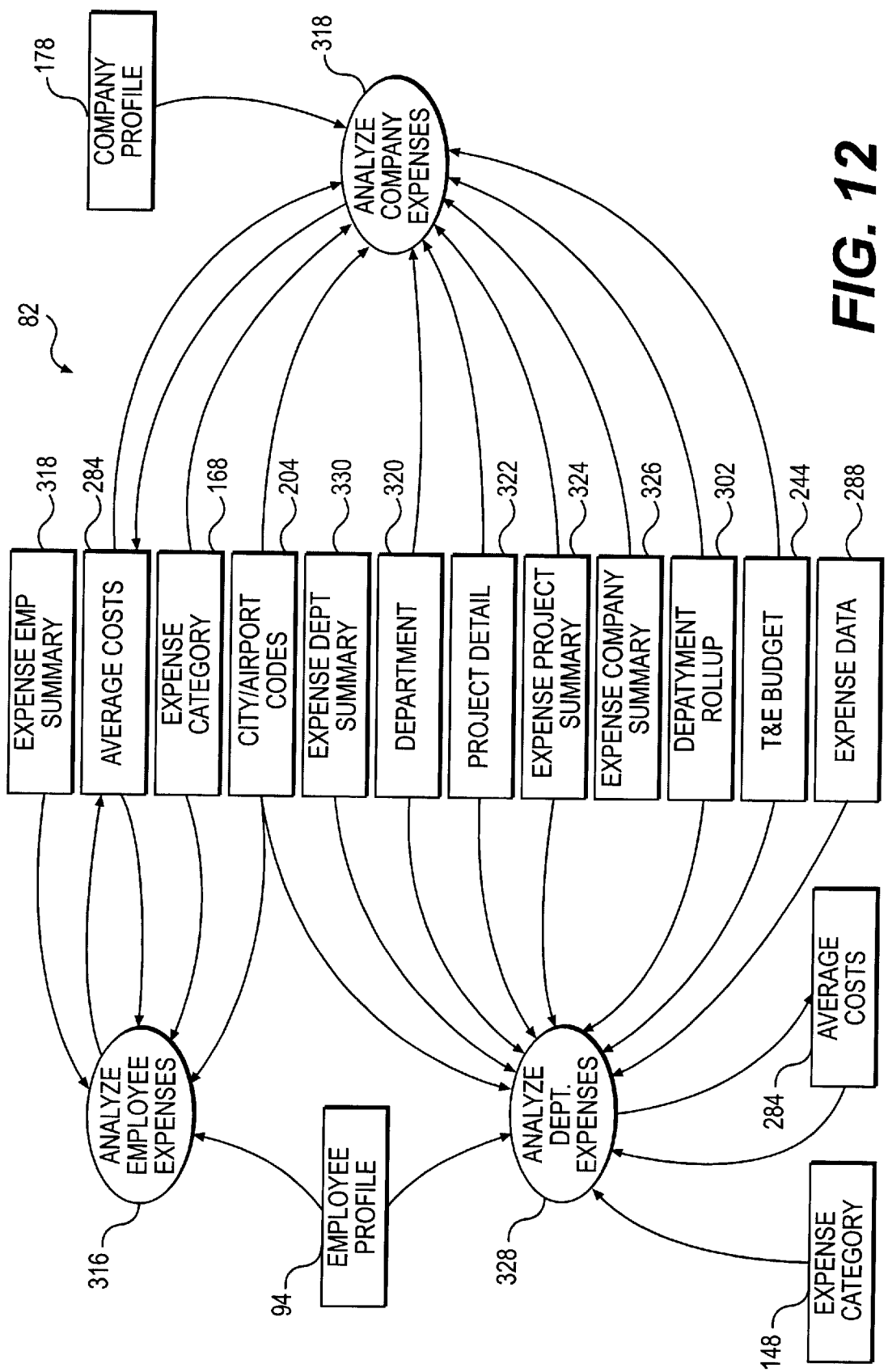
FIG. 12 is more detailed block diagrams of the post-trip management system of FIG. 3.

Now turning to FIG. 12, a detailed block diagram of post-trip management 82 of FIG. 3 is detailed. The analyze employee expenses process 316, uses data from the expense employee summary table 318, the average costs table 284, the expense category table 168, the city/airport codes table 204, and the employee profile table 94. The analyze employee expense process 316 summarizes for a given time period employee expenses by category as well as shows trends in employee expenses by category.

The analyze company expenses process 318 uses data from the company profile table 178, the average costs table 284, the expense category table 168, the city/airport codes table 204, the department table 320, the project detail table 322, the expense project summary table 324, the expense company summary table 326, the department roll-up table 302, and the travel and expense budget table 244. The analyze company expenses process 318 creates a summary for a given time period of company expenses by category and by project as well as trends in company expenses by project and by category.

The analyze department expenses process 328 imports data from the employee profile table 94, the city/airport codes table 204, the expense department summary table 330, the department table 320, the project detail table 322, the expense project summary table 324, the department roll-up table 302, the travel and the expense budget table 244, the expense table 288, the average costs table 284, and the expense category table 168. The analyze department expenses process 328 creates a summary for a given time period of departmental expenses by category and by project. The analyze department expenses process 328 also reports trends in departmental expenses by category and by project.

Figure 13:
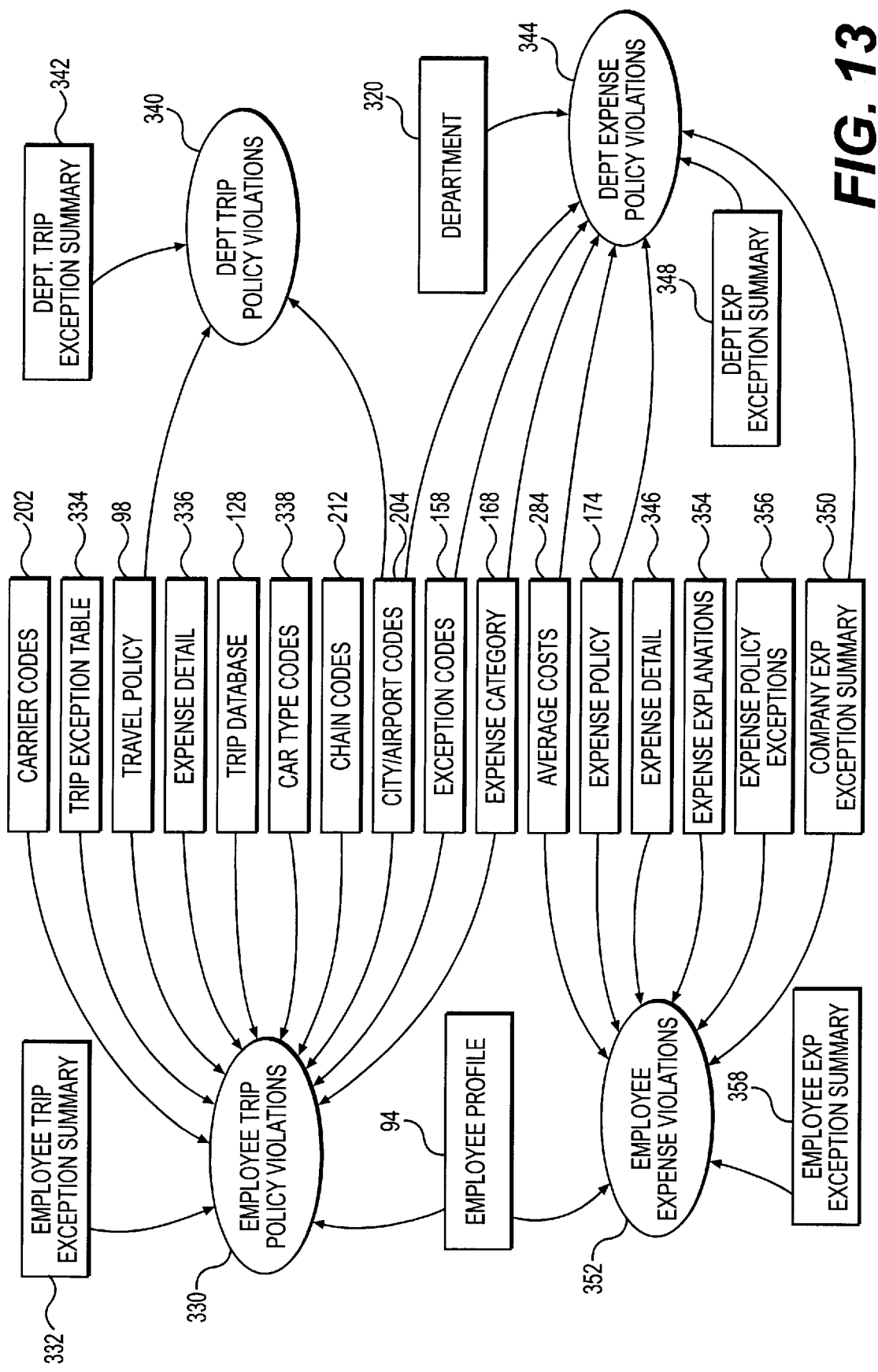
FIG. 13 is more detailed block diagrams of the post-trip management system of FIG. 3.

Now turning to FIG. 13, a detailed block diagram of another aspect of the post-trip management 82 of FIG. 3 is depicted. The employee trip policy violations process 330 imports data from employee trip exception the summary table 332, the carrier codes table 202, the trip exception table 334, the travel policy table 98, the expense detail table 336, the trip table 128, the car type codes table 338, the chain codes table 212, the city/airport codes table 204, the exception codes table 158, the expense category table 168, and the employee profile table 94. The employee trip policy violations process 330 creates a summary for a given time period of employee trip violations by category and violation trends by category.

The department trip violations process 340 imports data from the department trip exception summary table 342, the travel policy table 98, and the city/airport codes table 204. The department trip policy violations process 340 creates a summary for a given time period of department trip violations by category and reports trends in department trip violations.

The department expense policy violations process 344 uses data from the city/airport codes table 204, the exception codes table 158, the expense category table 168, the average costs table 284, the expense policy table 174, the department expense exception summary table 348, the company expense exception summary table 350, and the department table 320. The department expense policy violations process 344 creates a summary for a given time period of departmental expense policy violations by category and trends in departmental expense policy violations. The employee expense violations process 352 uses data from the employee profile data base 94, the average costs table 284, the expense policy table 174, the expense detail table 346, the expense explanations table 354, the expense policy exceptions table 356, the company expense exception summary table 350, and the employee expense exception summary table 358. The employee expense violations process 352 creates a summary for a given time period of employee expense violations by category and trends in employee expense violations.

Figure 14A:
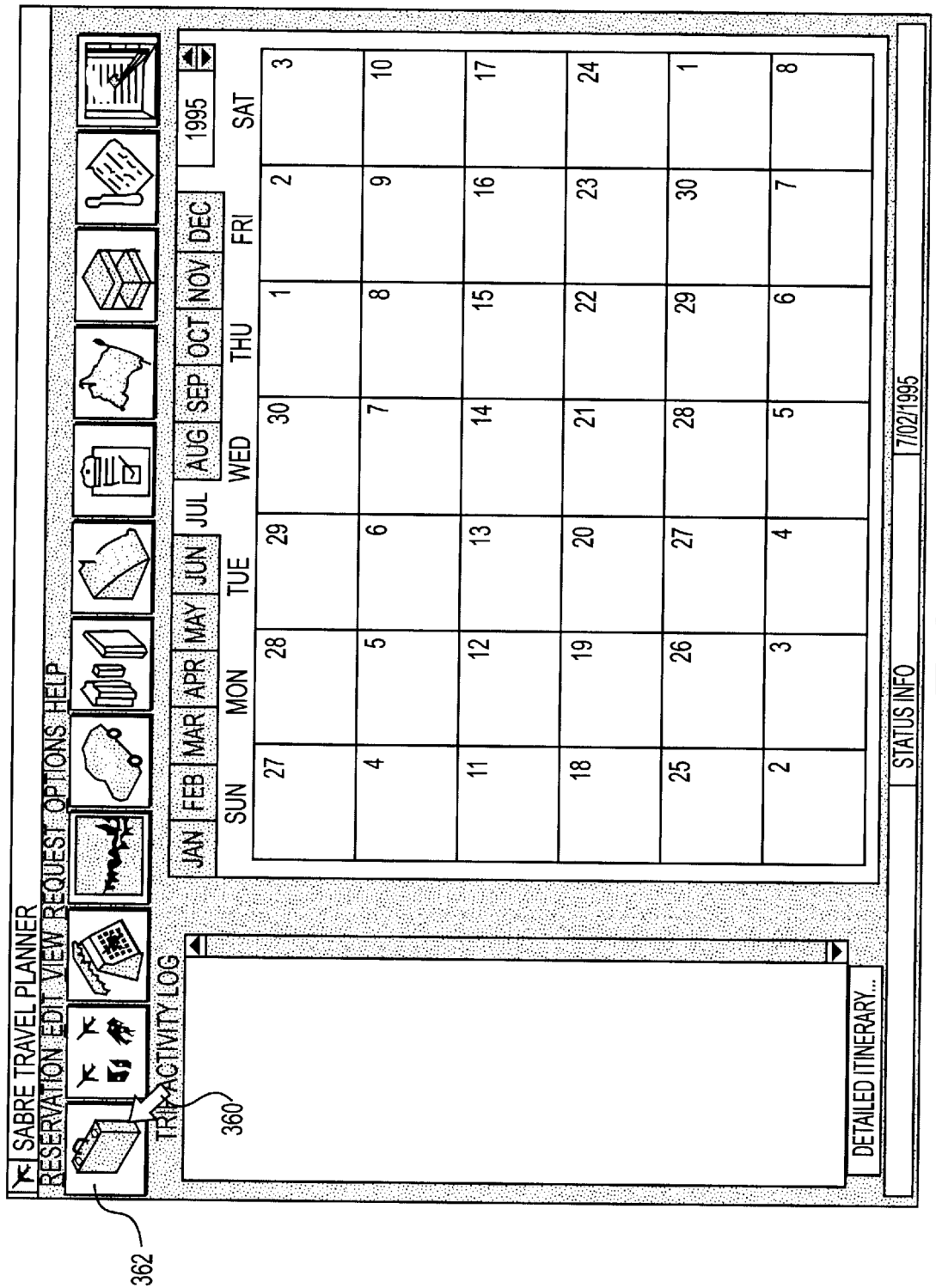
FIG. 14, consisting of 14A–14X, is a series of graphical user interfaces for scheduling a trip.
Figure 14B:
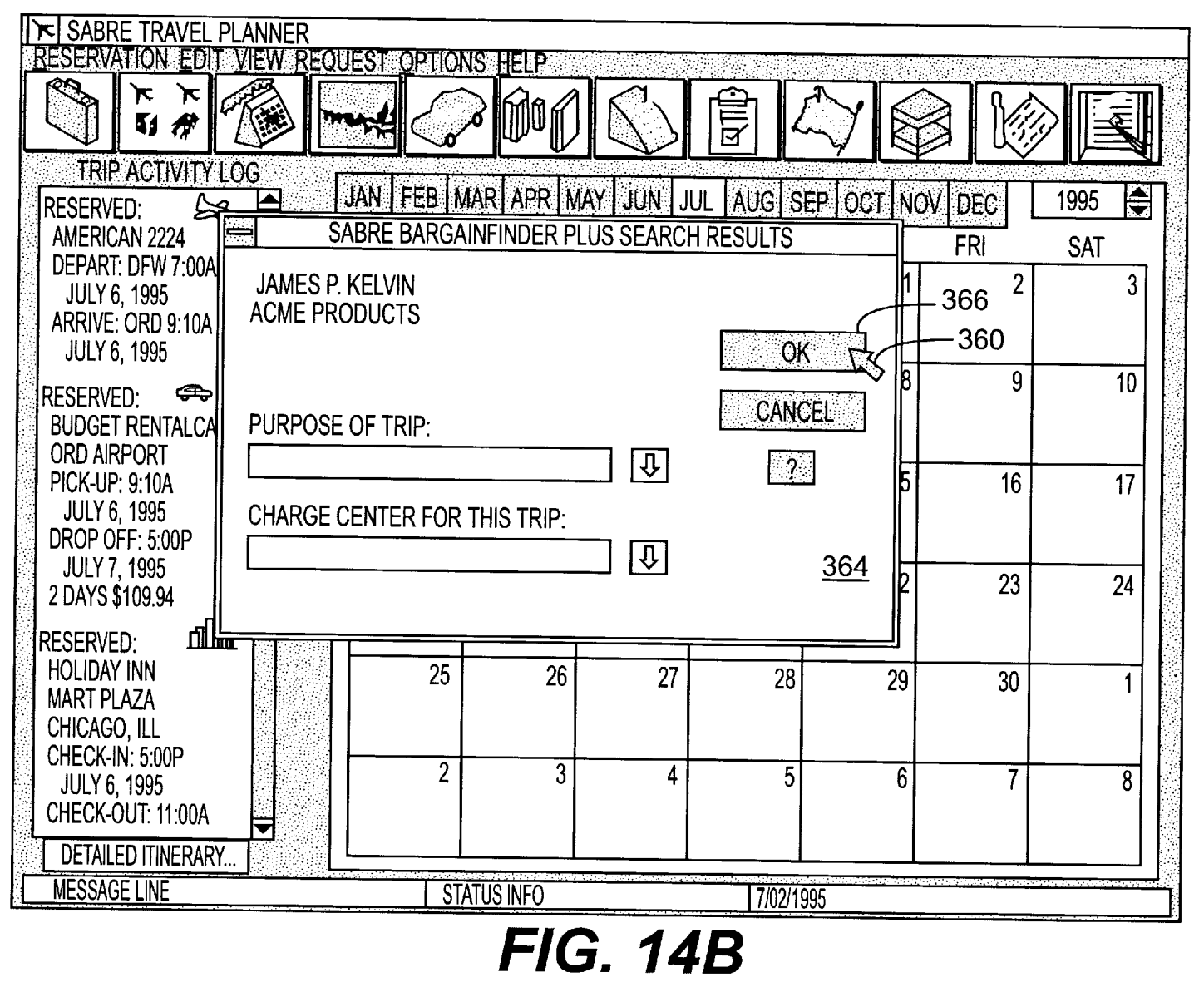
Figure 14C:
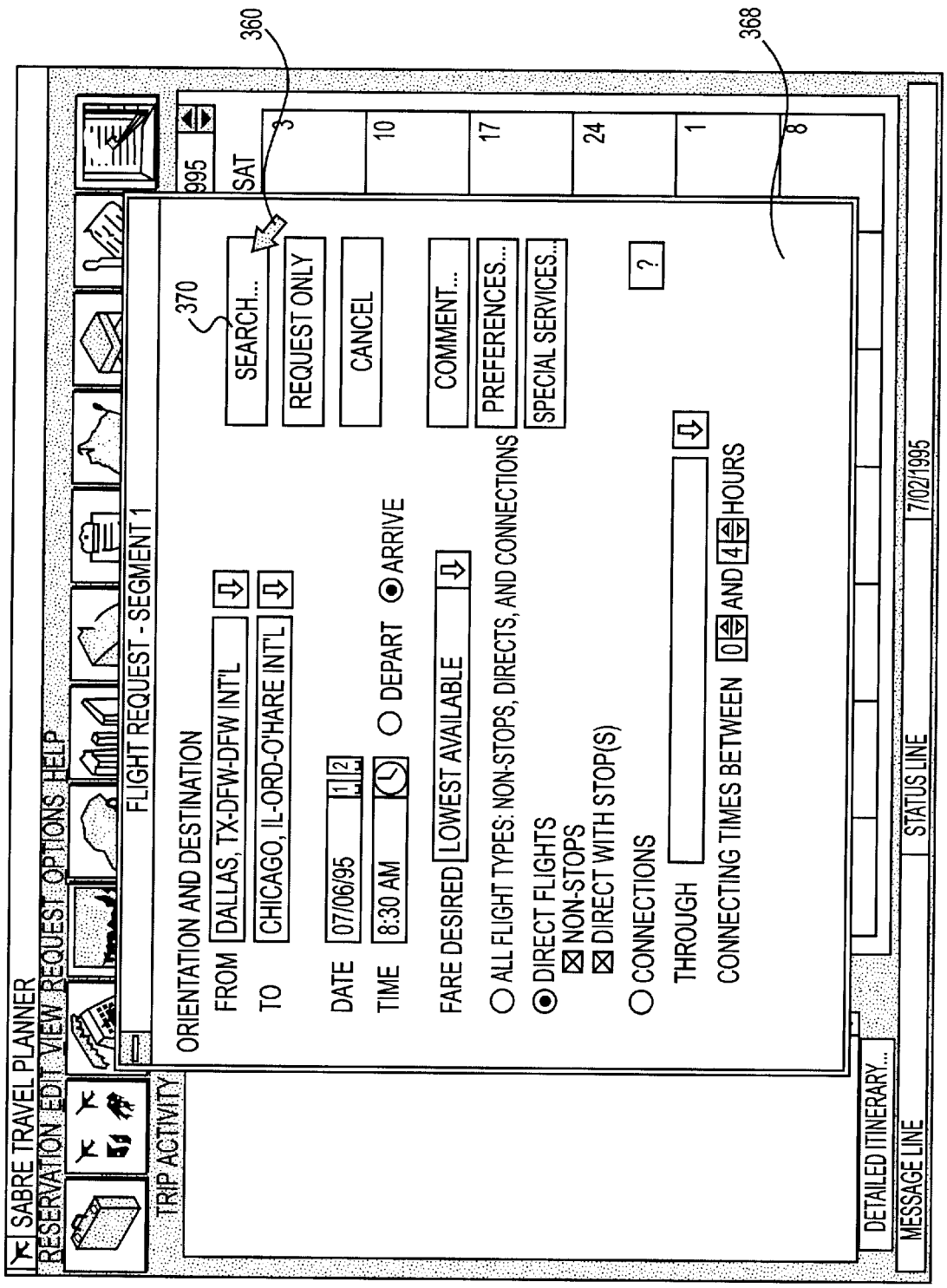
Figure 14D:
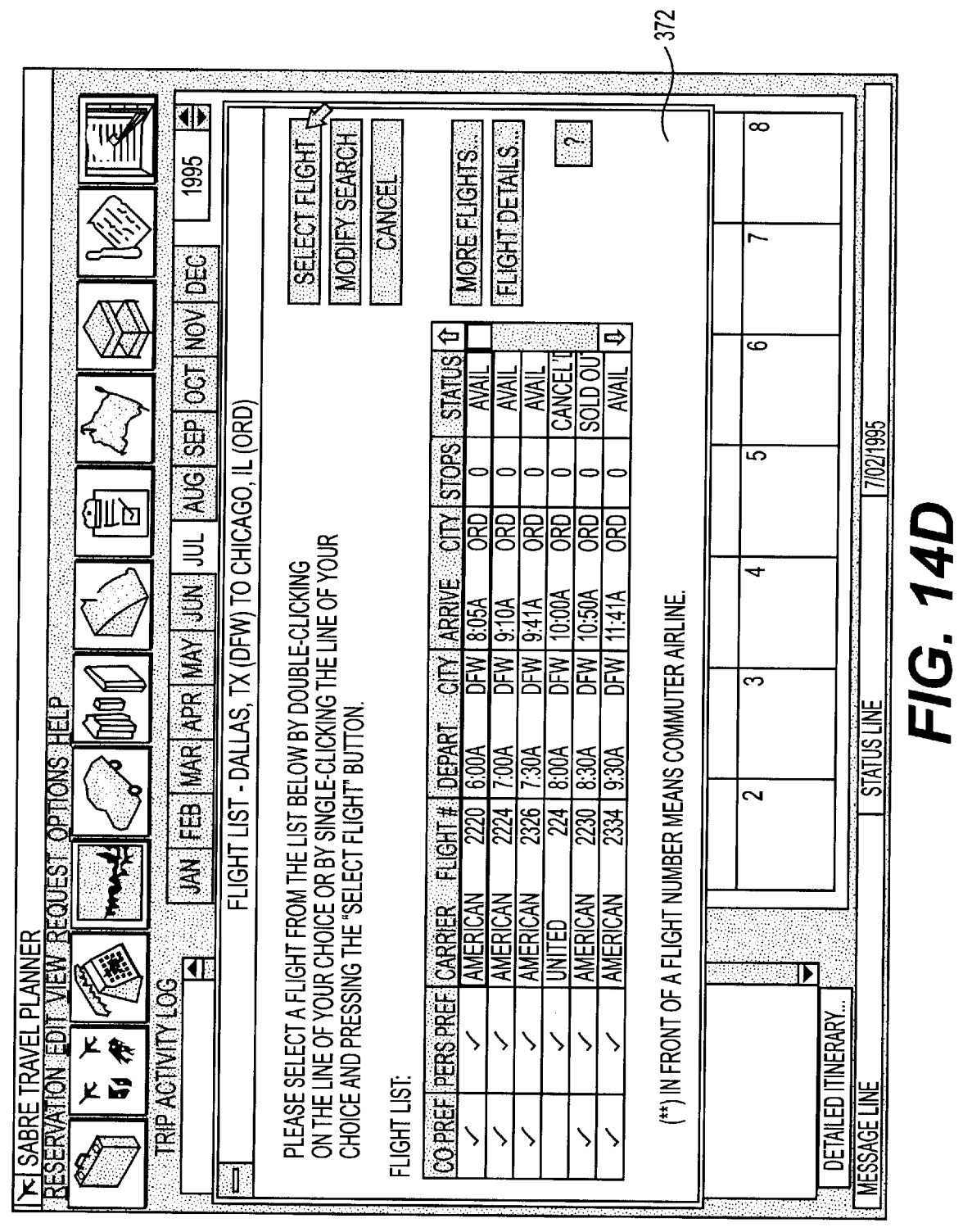
Figure 14E:
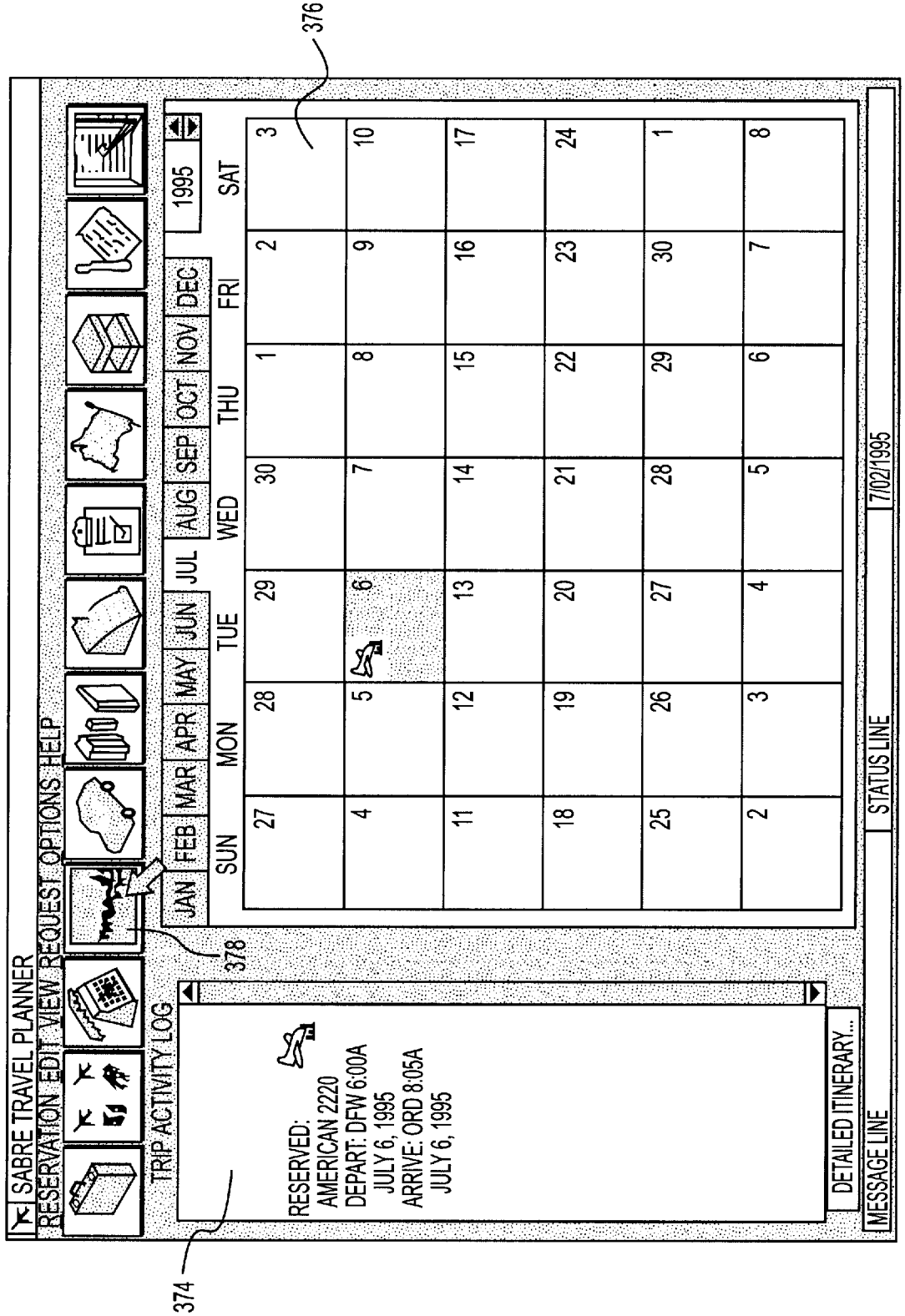
Figure 14F:
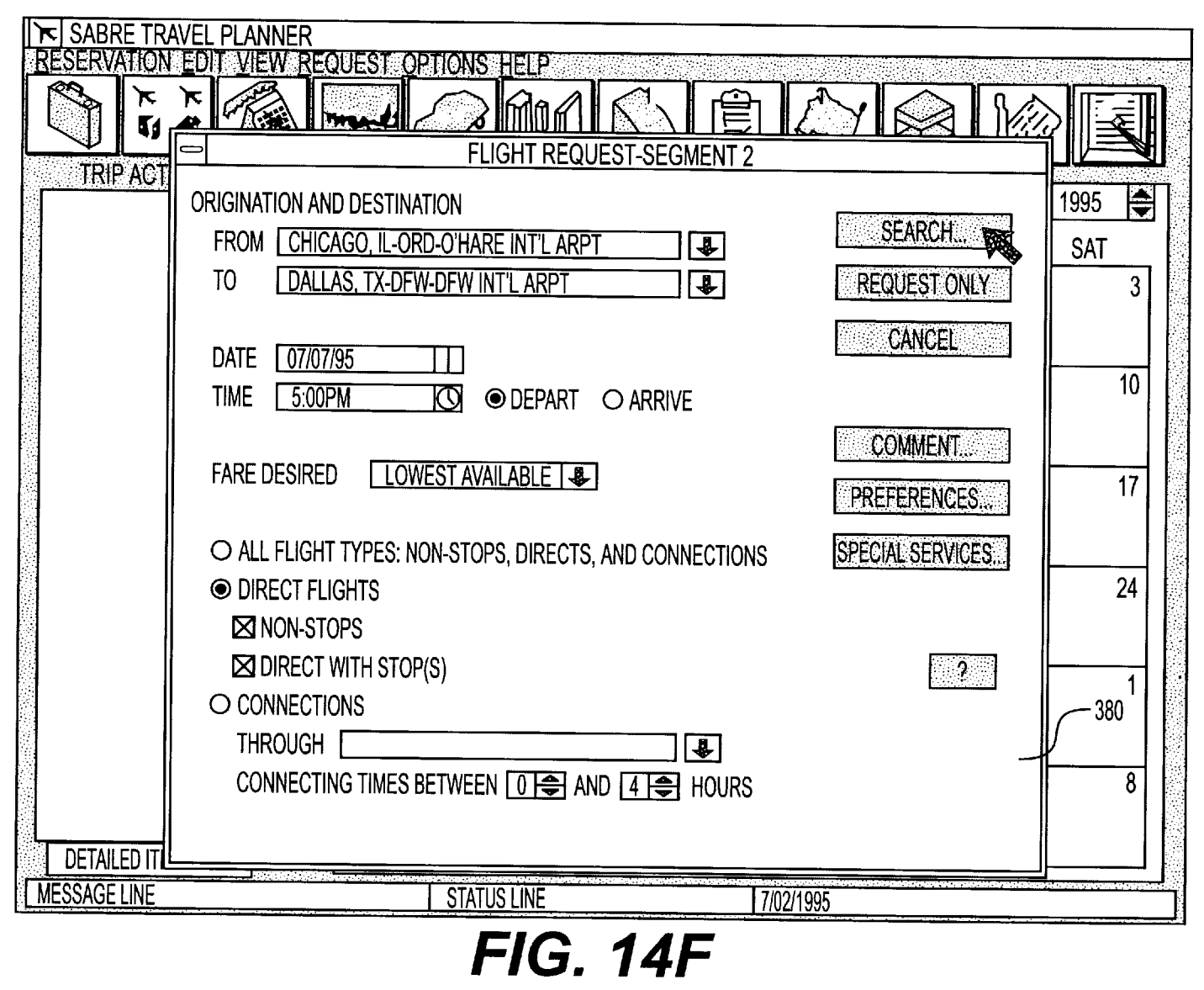
Figure 14G:
Figure 14H:
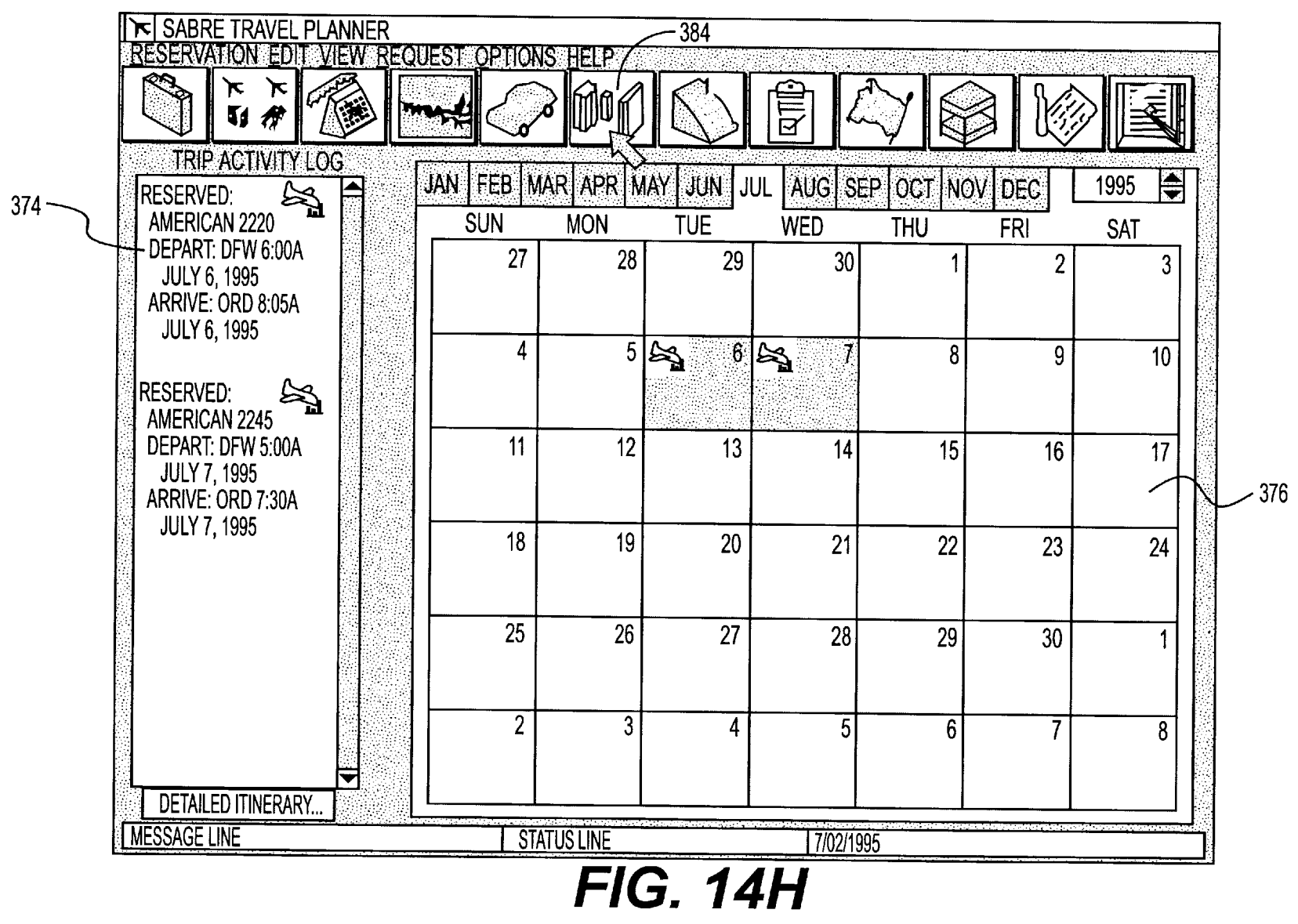
Figure 14I:
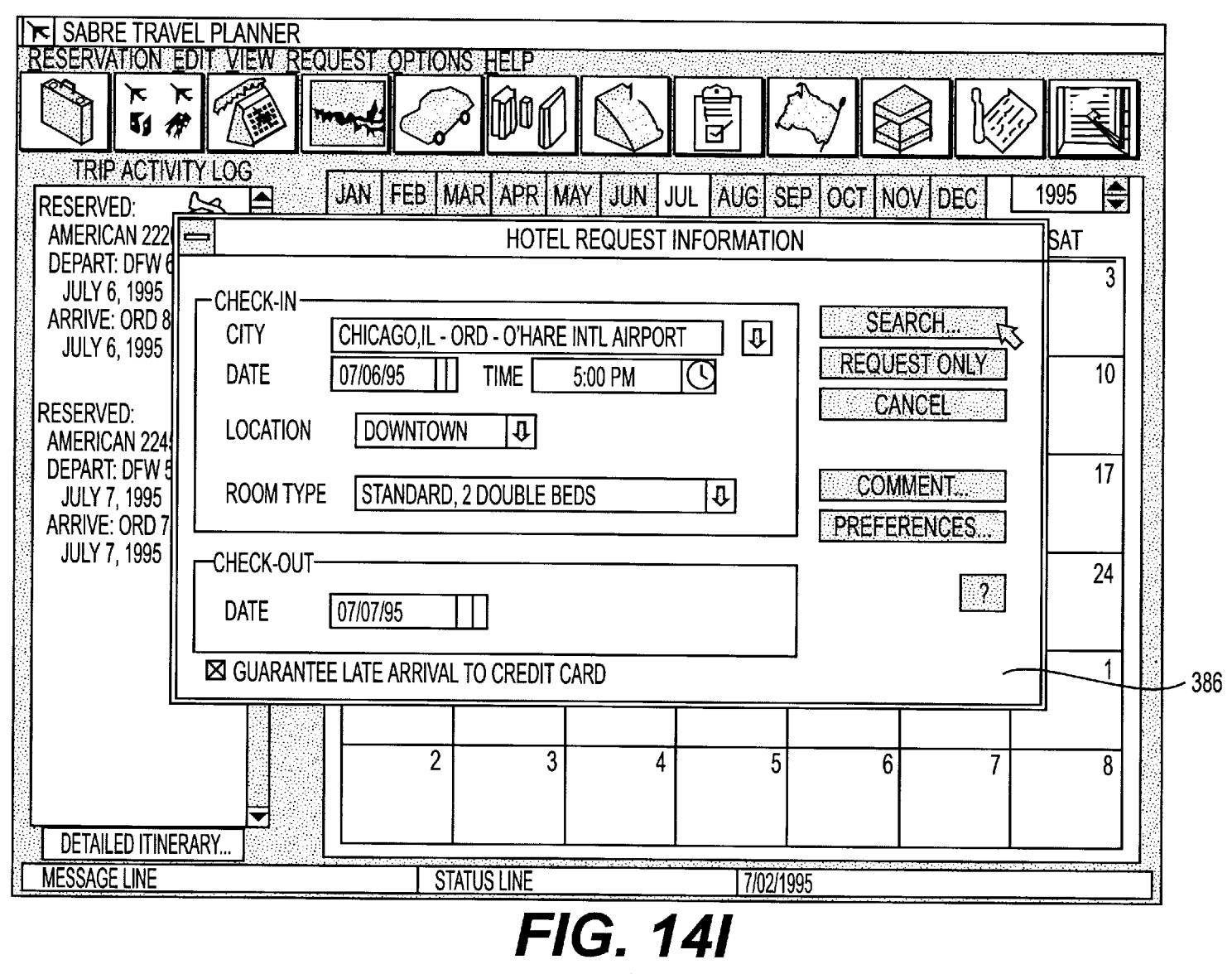
Figure 14K:
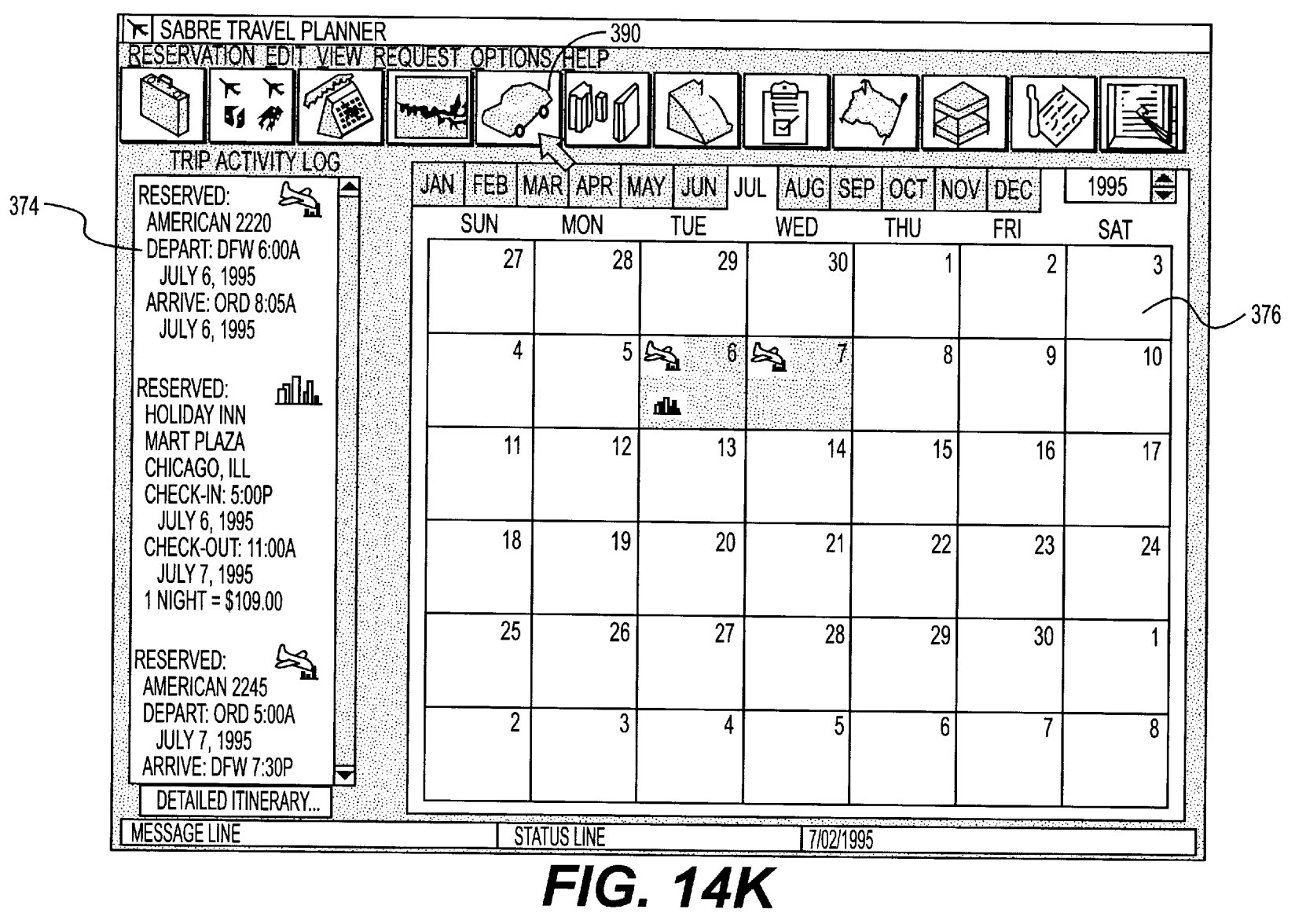
Figure 14L:
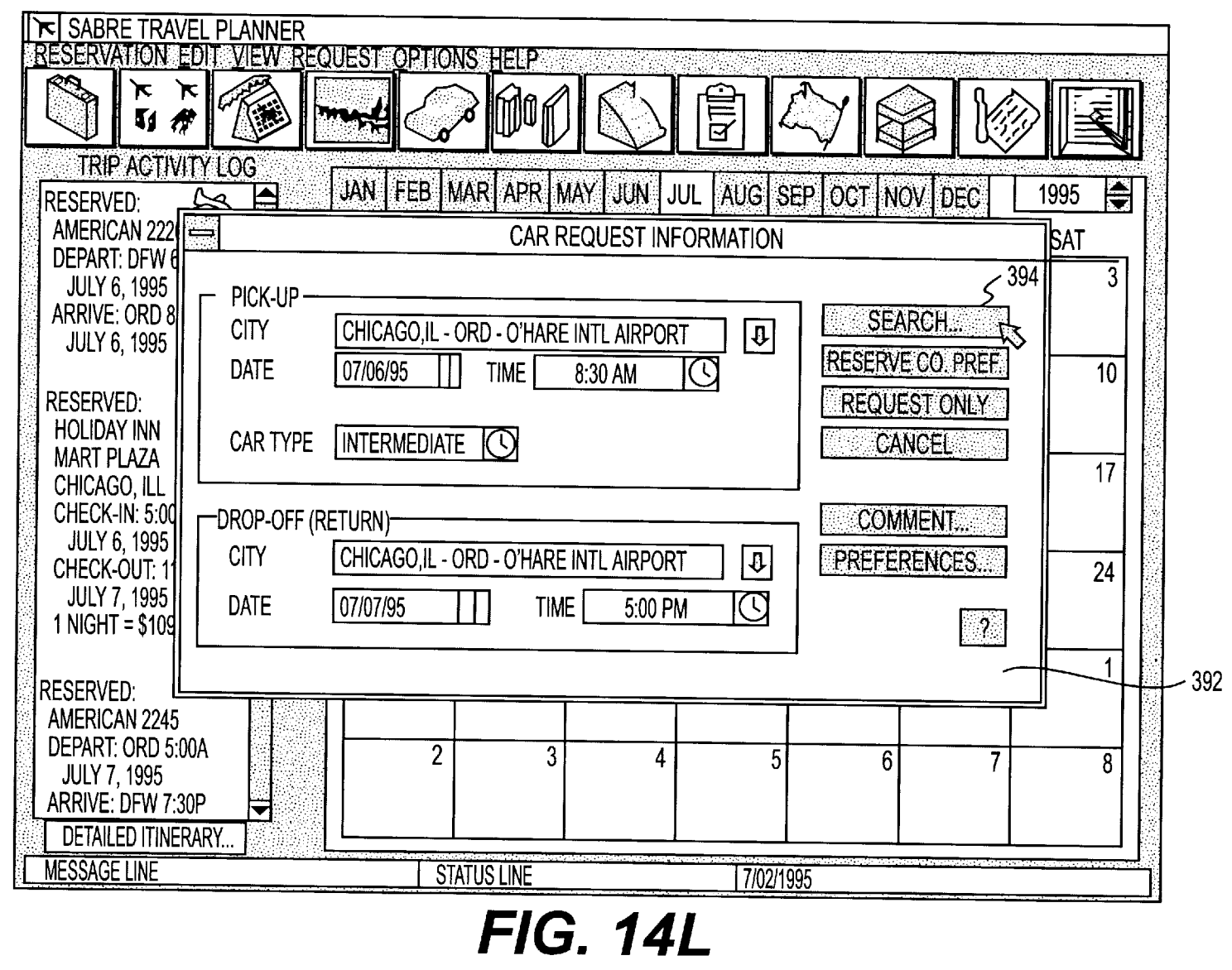
Figure 14N:
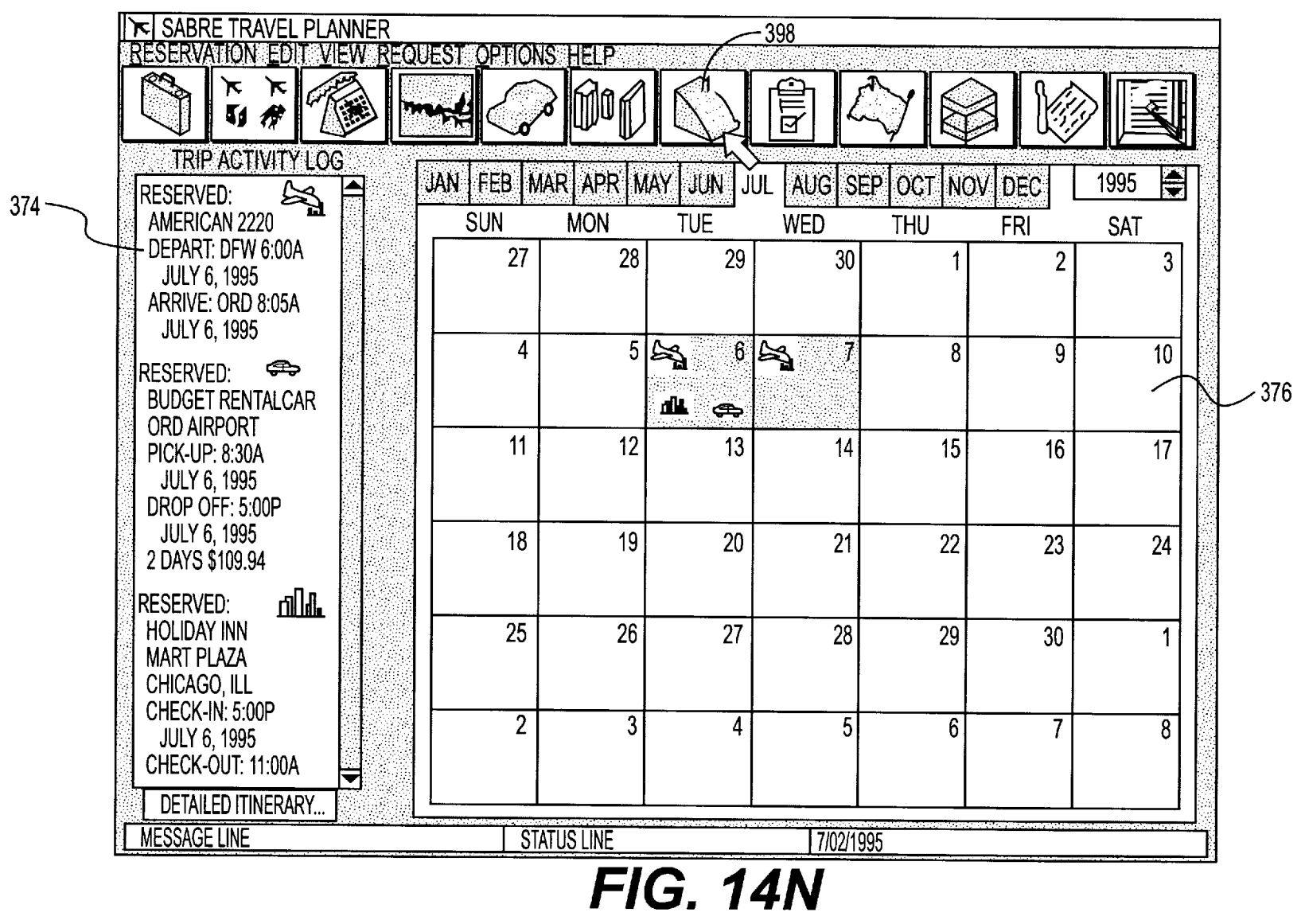
Figure 14O:
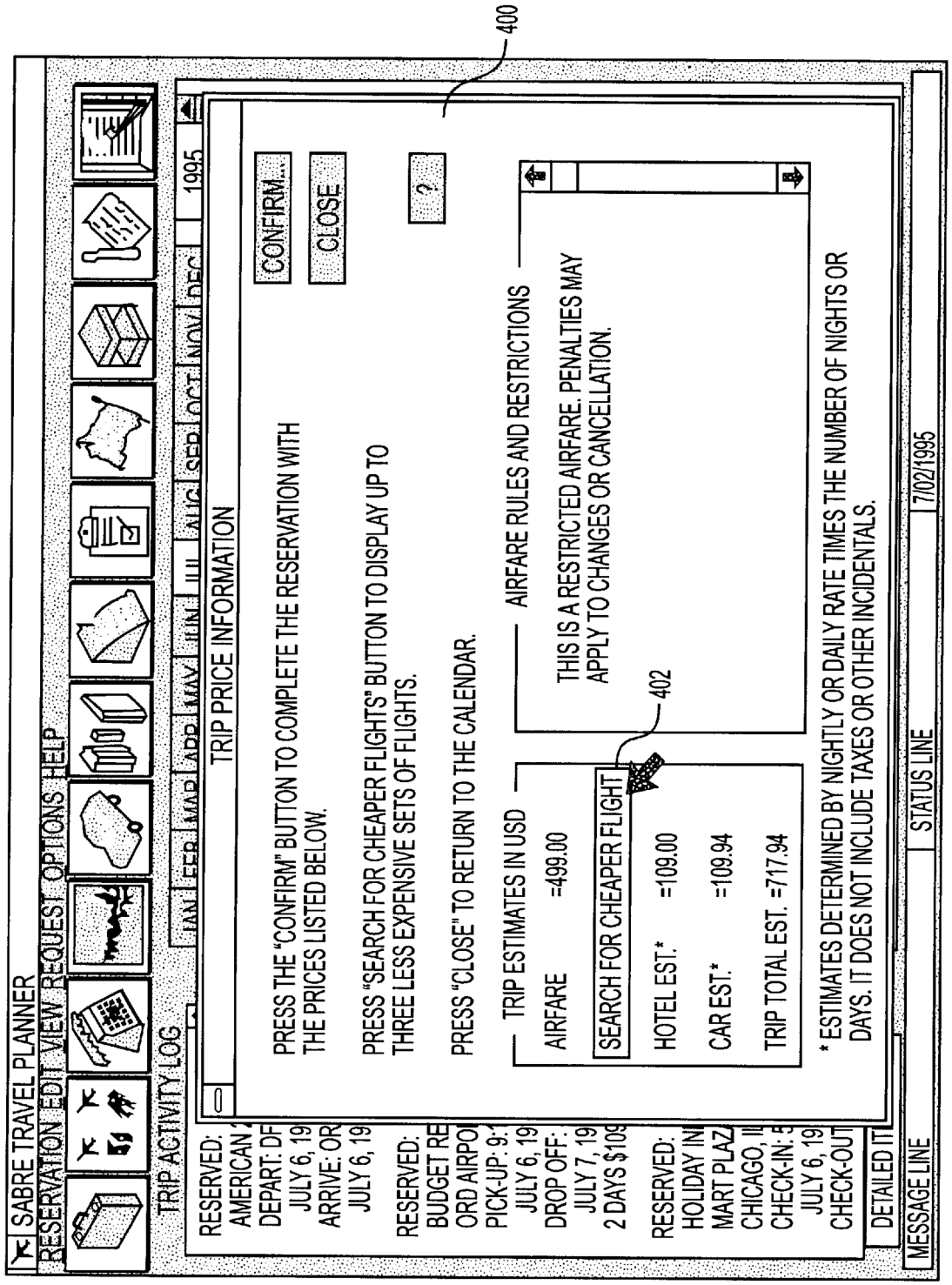
Figure 14P:
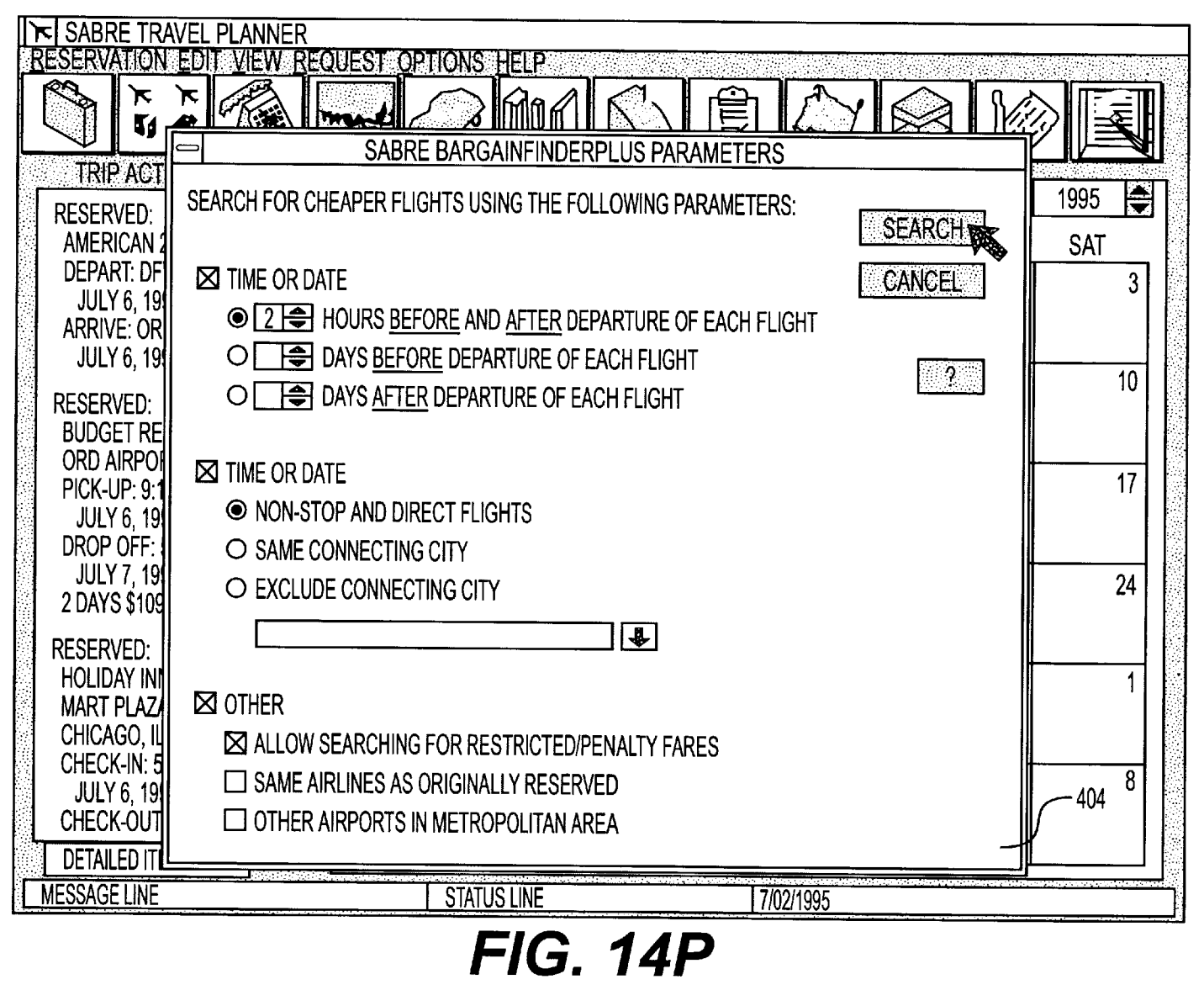
Figure 14Q:
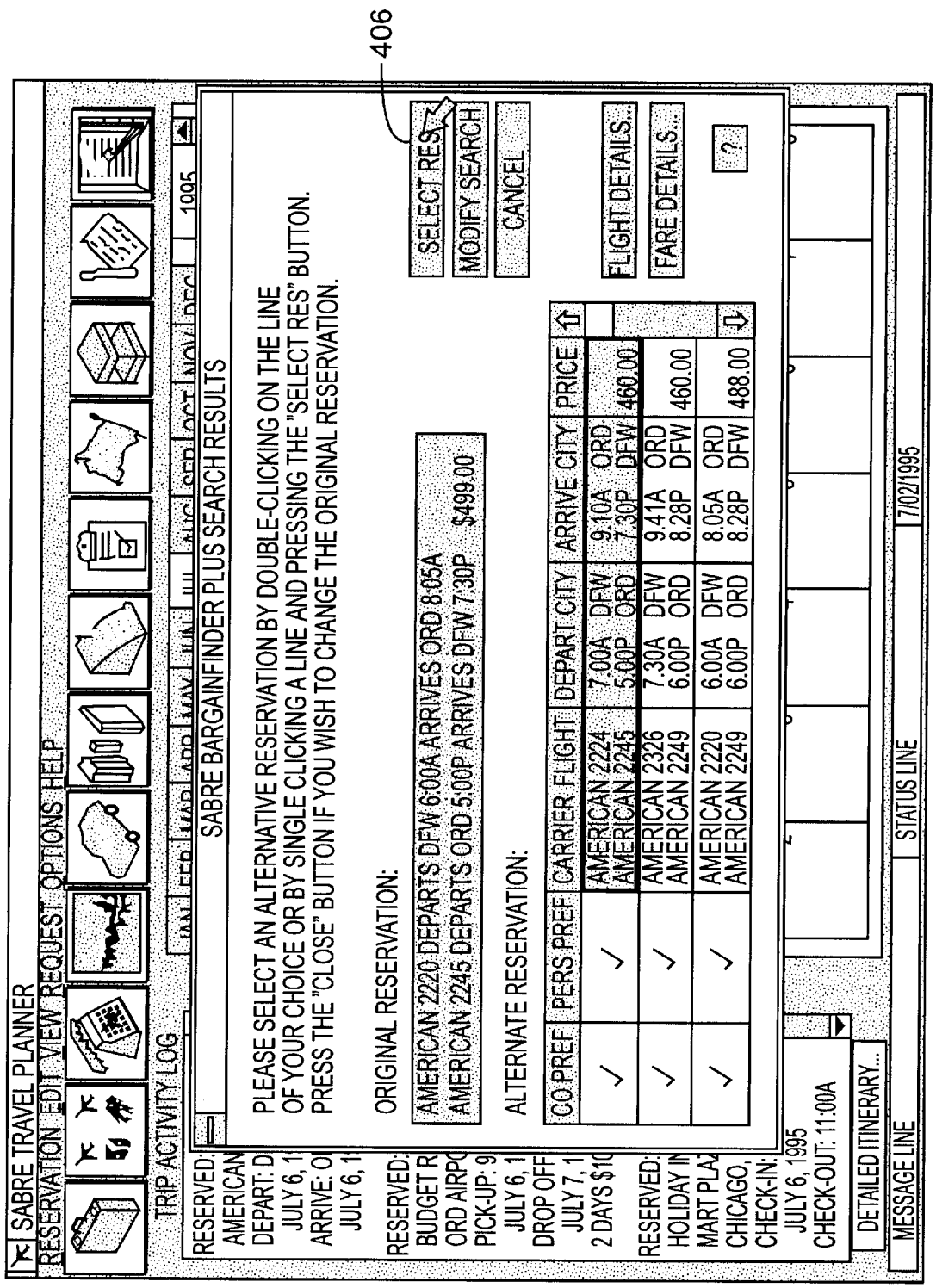
Figure 14R:
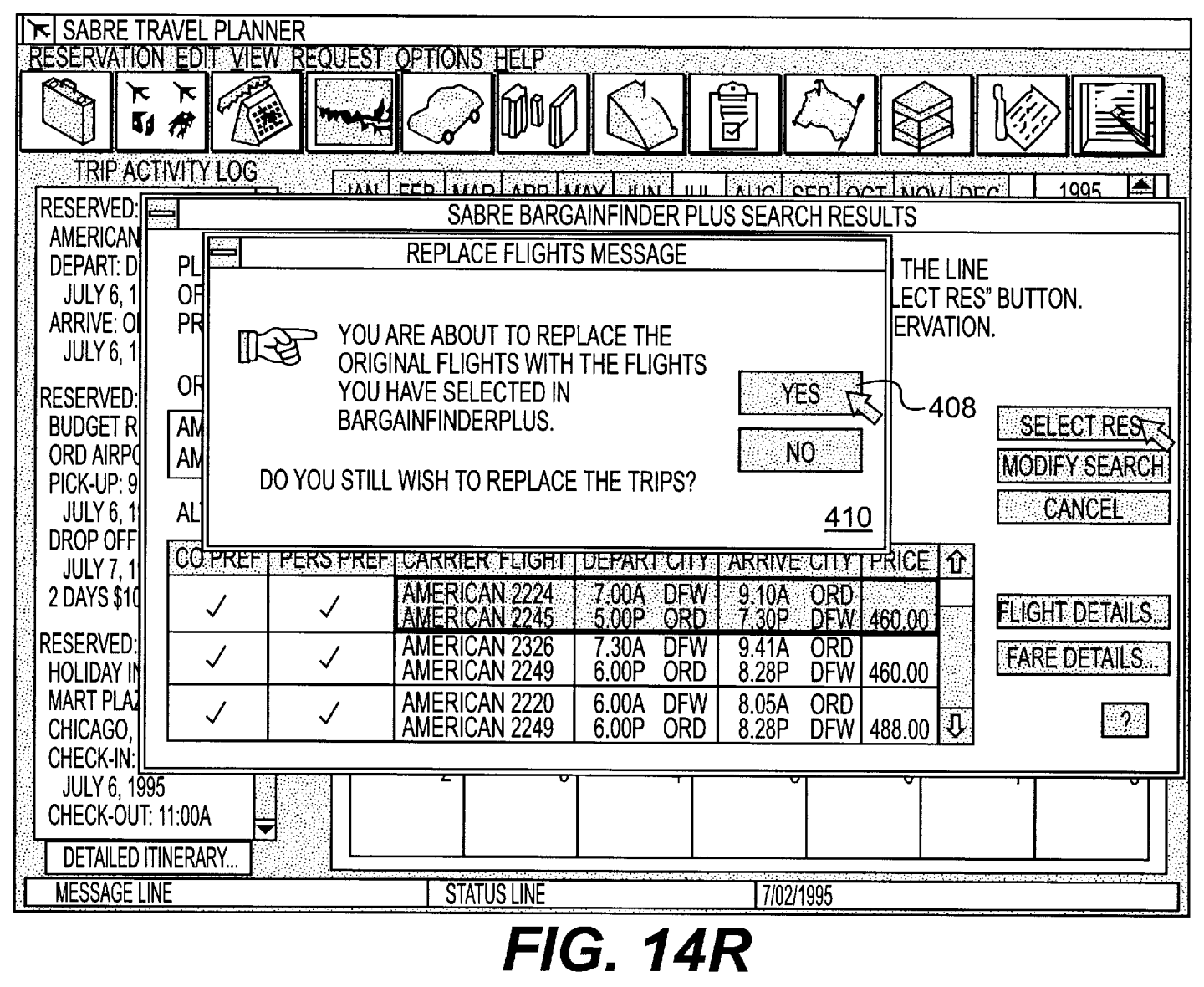
Figure 14S:
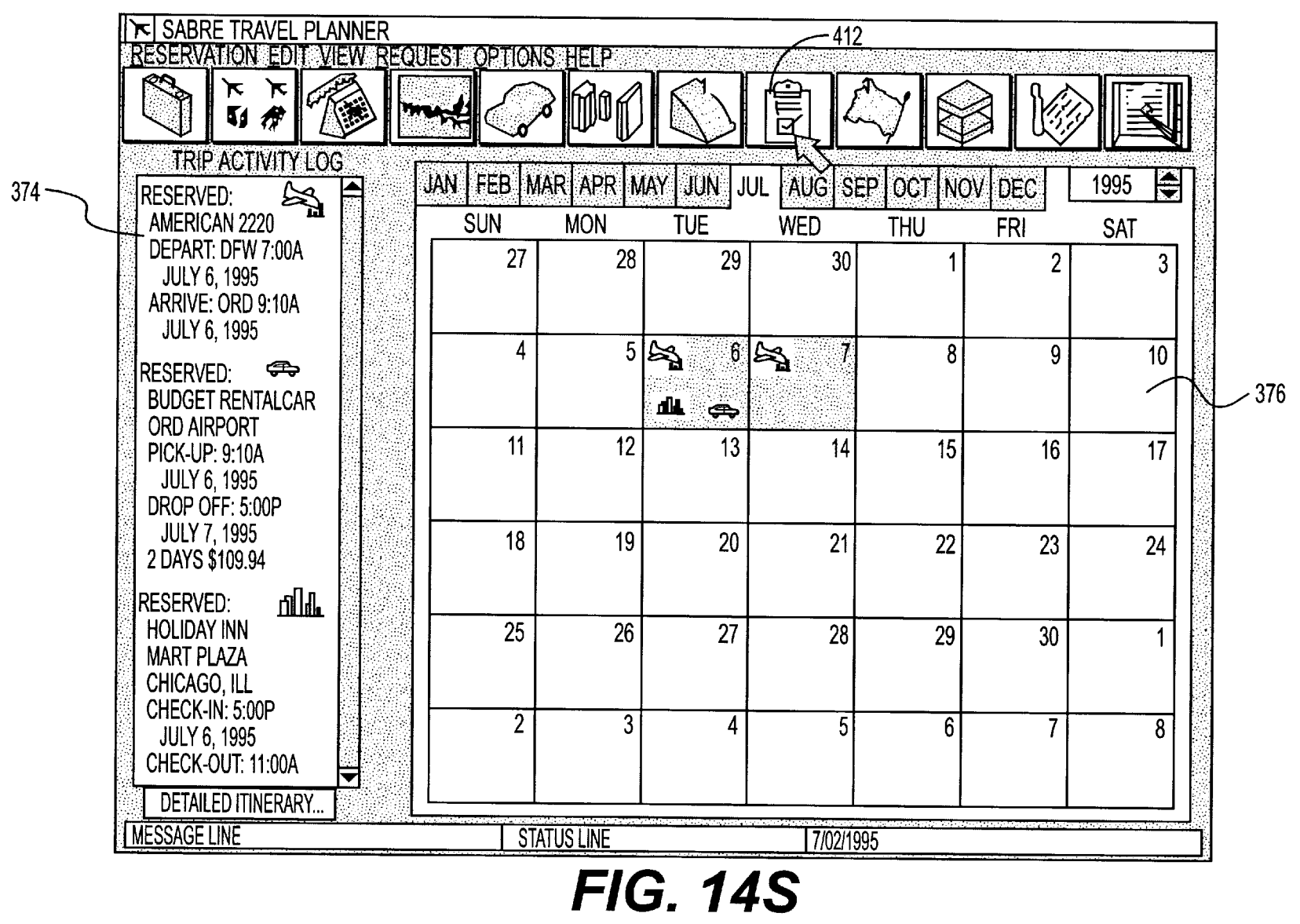
Figure 14T:
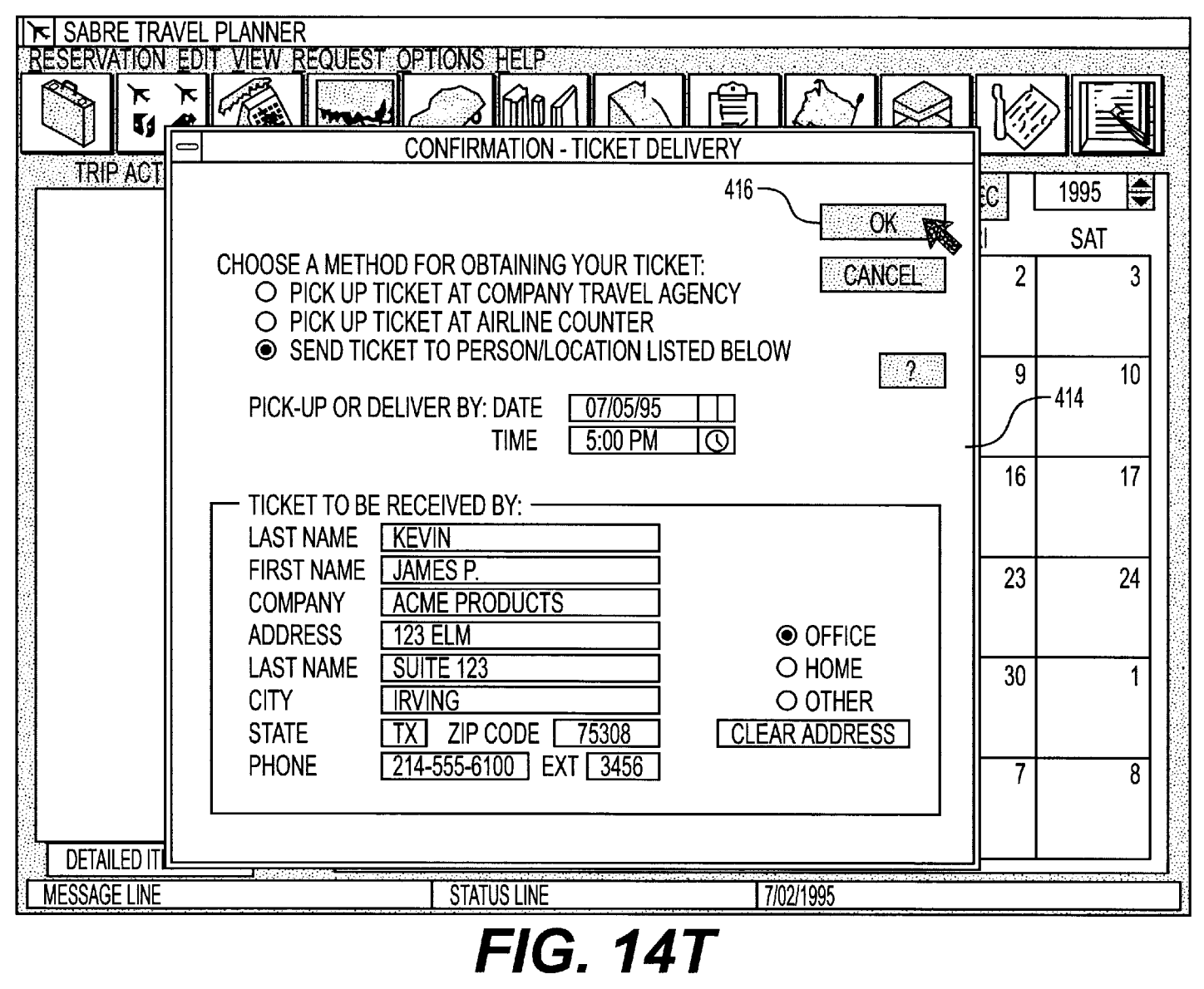
Figure 14U:
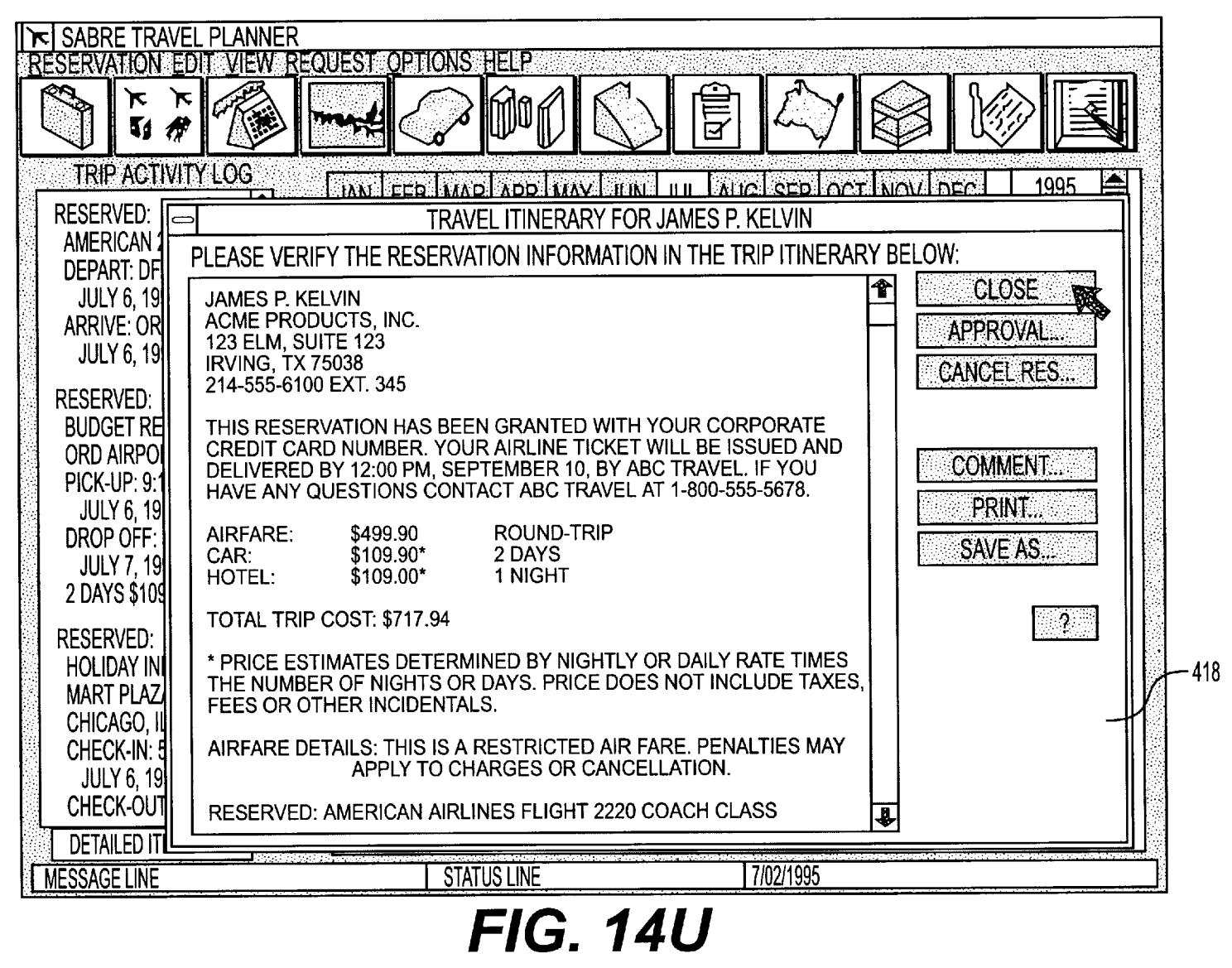
Figure 14V:
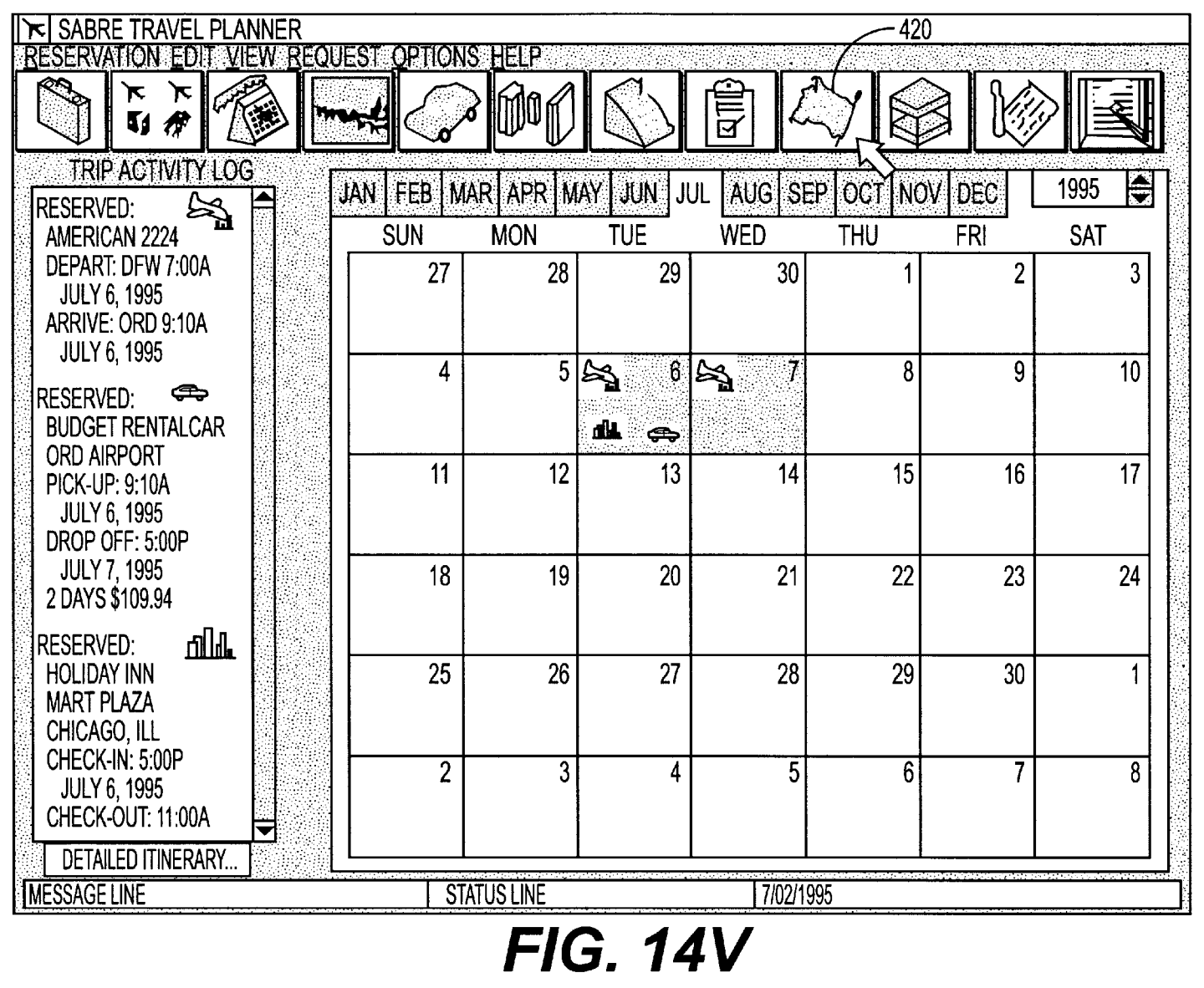
Figure 14W:
Figure 14X:
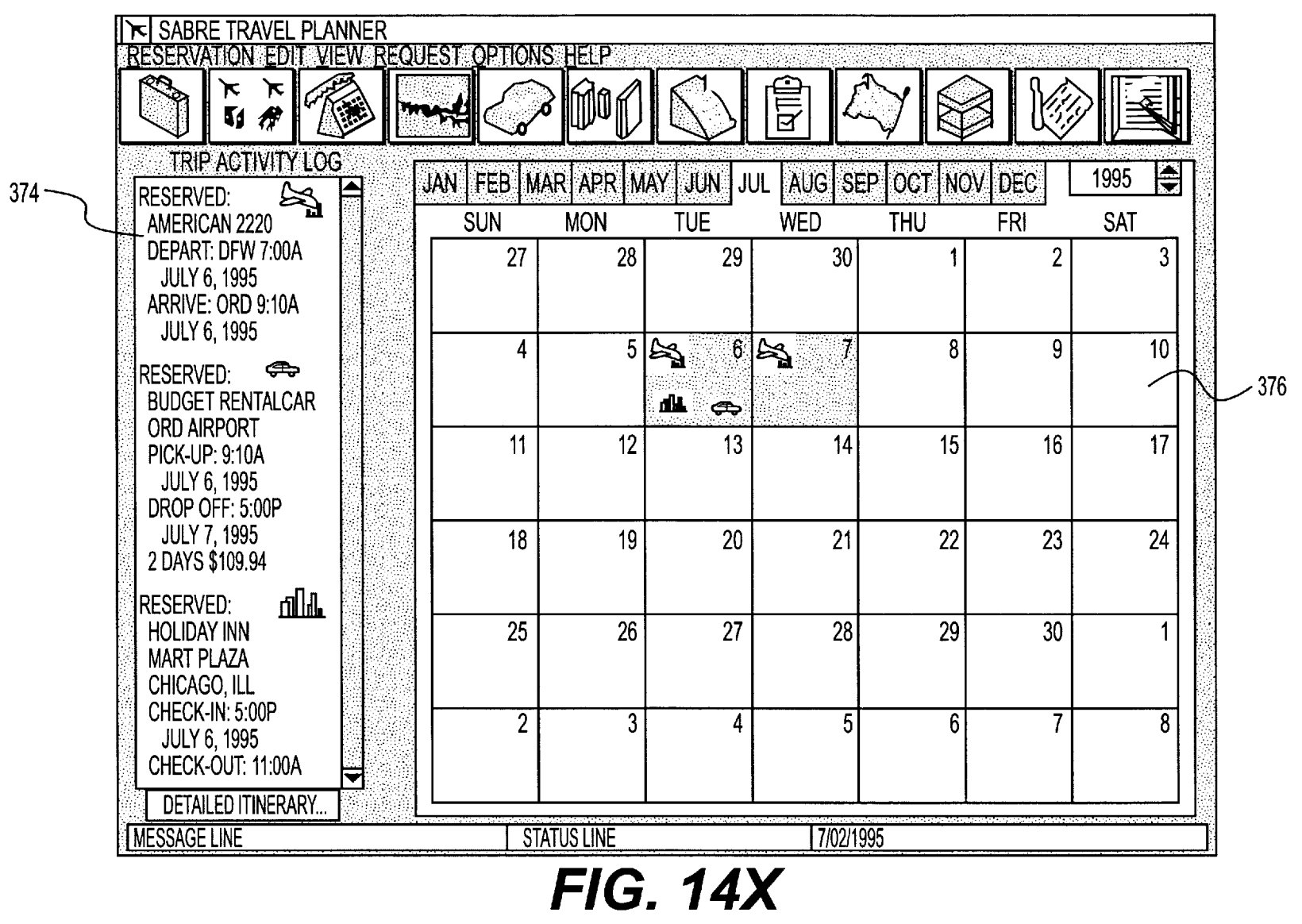
Figure 15A:
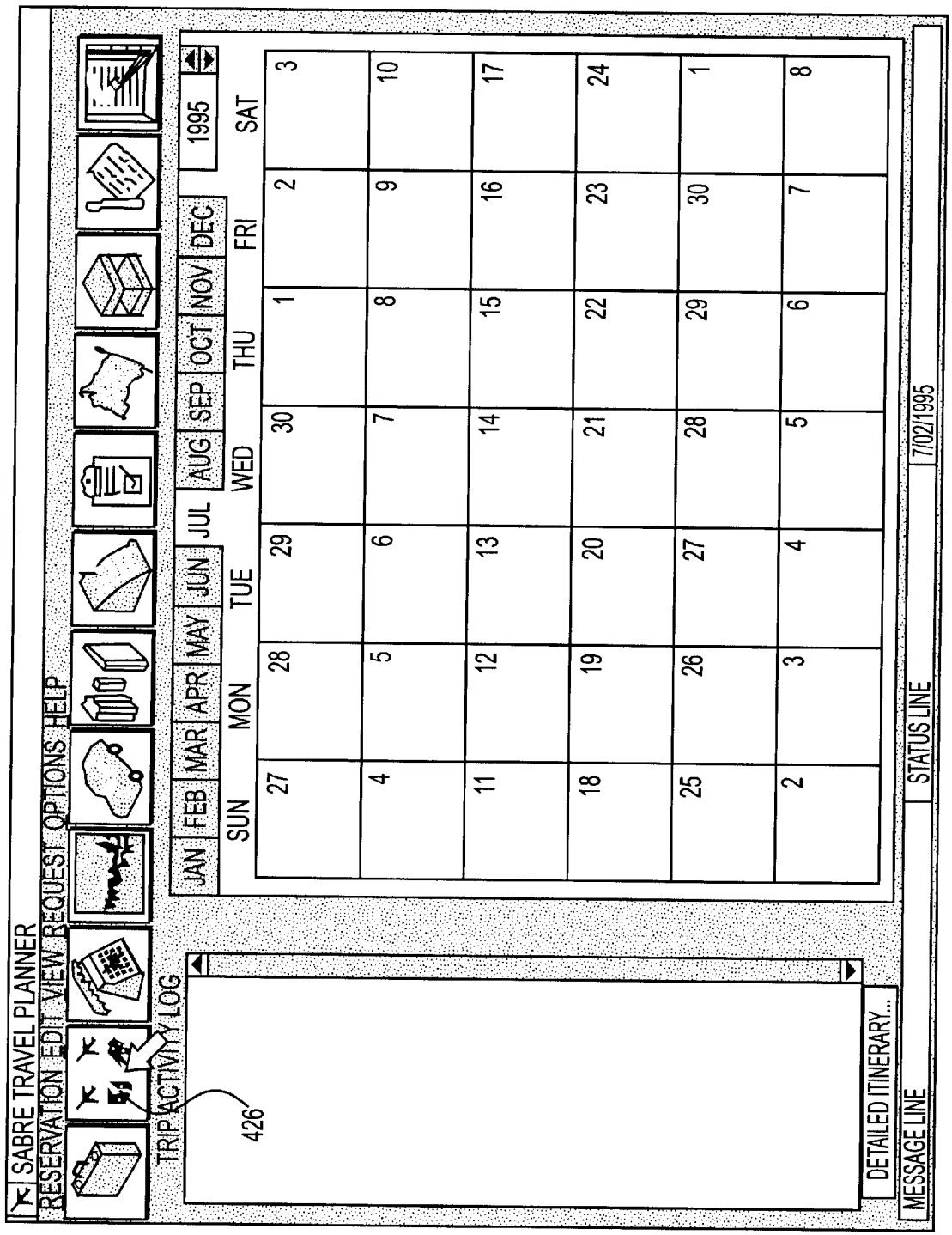
FIG. 15, consisting of 15A–15G, is a series of graphical user interfaces for scheduling repeat trips.
Figure 15B:
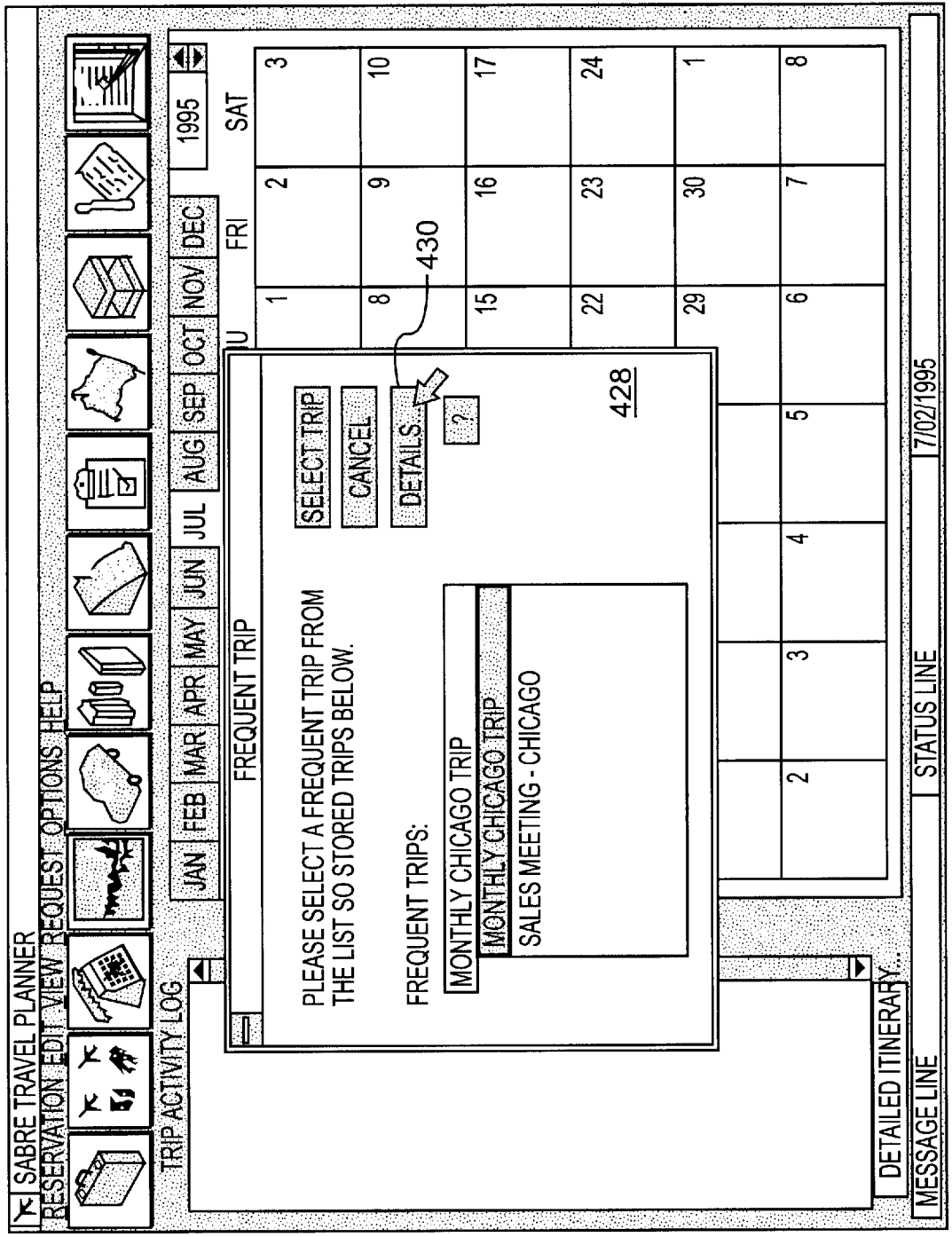
Figure 15C:
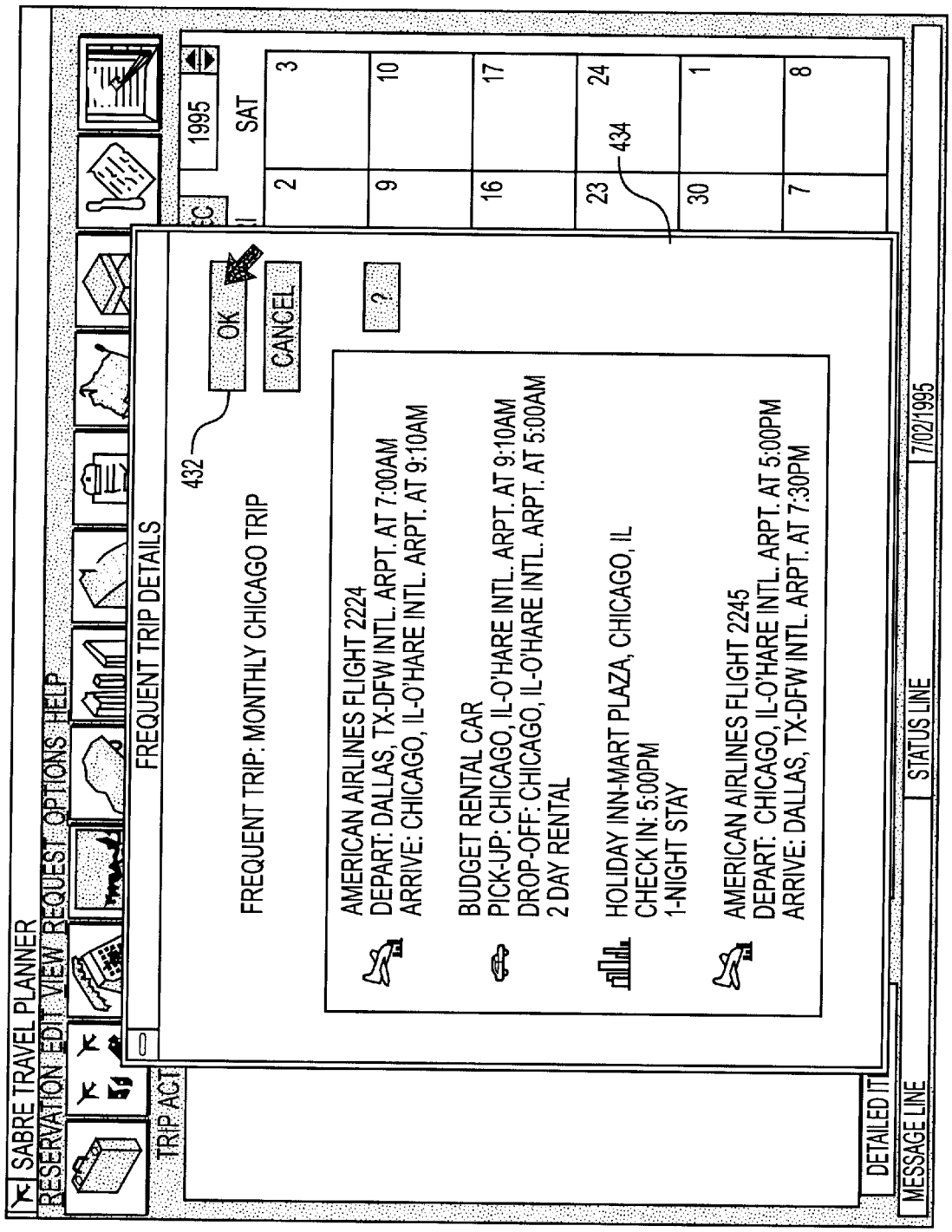
Figure 15E:
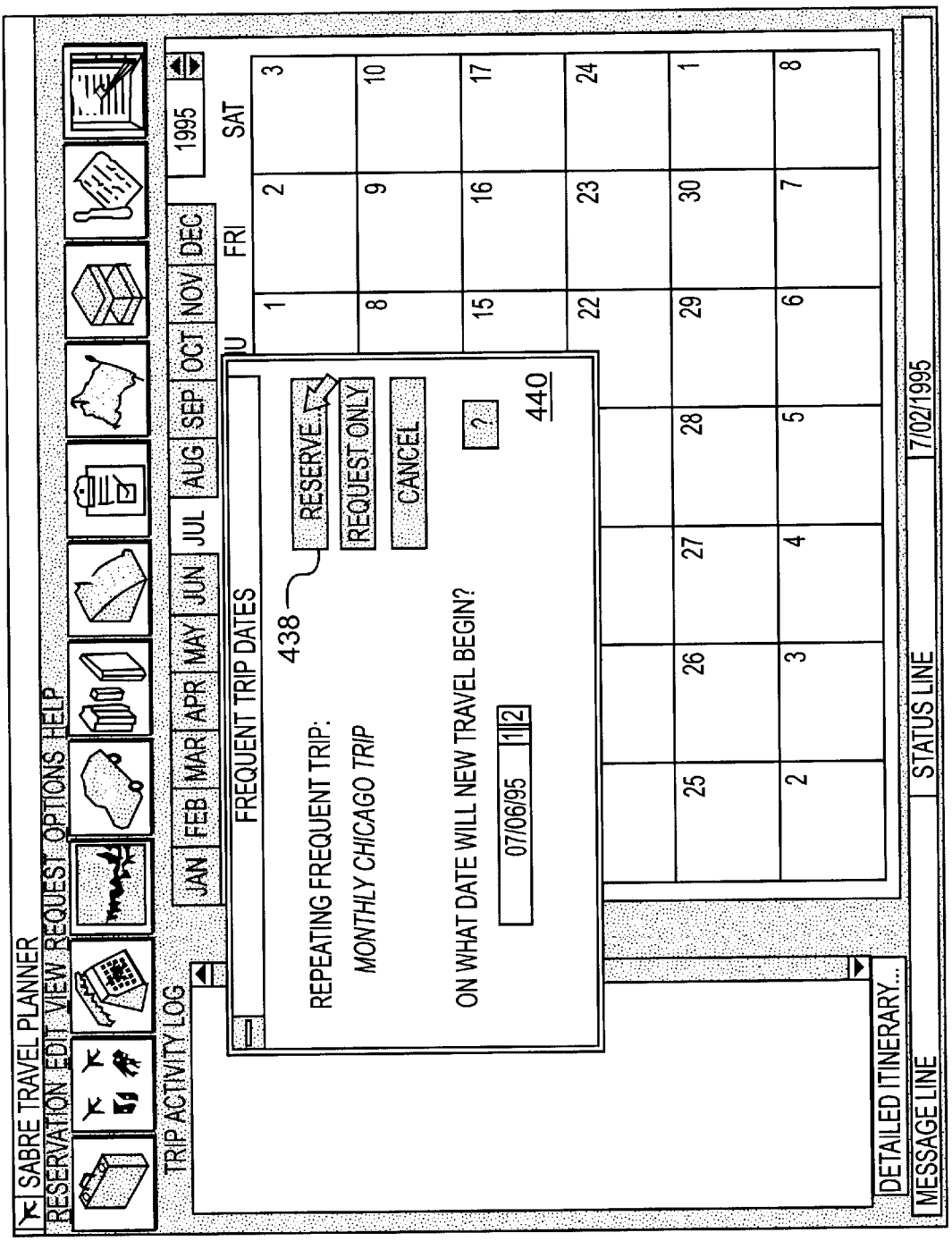
Figure 15F:
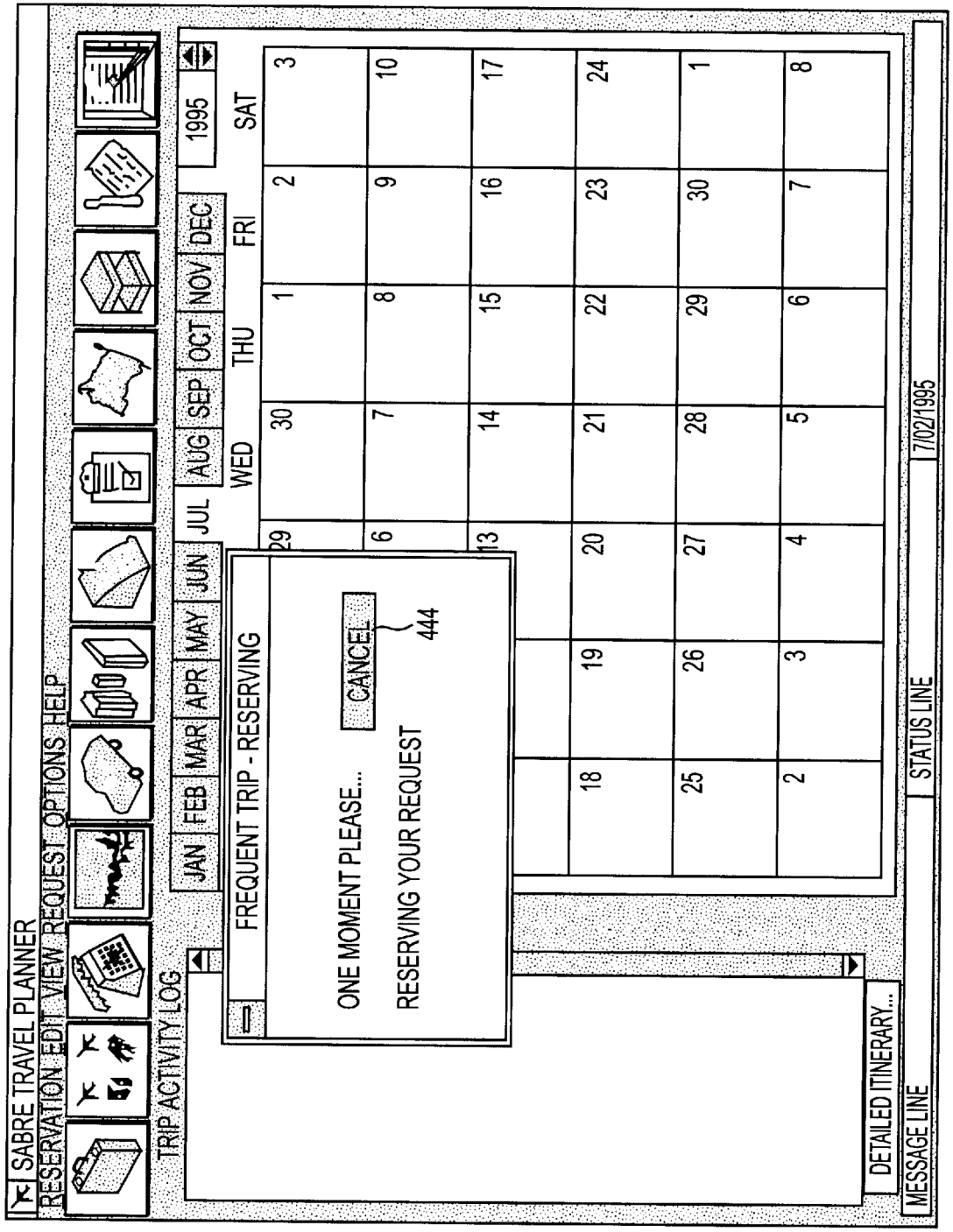

Now turning to FIG. 14, which consists of FIGS. 14A–14X, which are drawings that depict graphical user interfaces for trip planning module 68 as described above in reference to FIG. 4. The traveler 86 places a cursor 360 on the New Trip icon 362 and energizes the New Trip icon 362. The traveler 86 then enters the purpose of the trip and charge center for the trip and purpose of trip in the Charge Center window 364 then energizes okay button 366 with cursor 360. The traveler 86 selects origination and destination data in Flight Request-Segment 1 window 368 and energizes the Search button 370 with the cursor 360. The traveler 86 selects a flight from the Flight List window 372 which makes a record of the flight in the Trip Activity Log 374 and the Calendar 376. The traveler 86 selects the Continuing Trip icon 378 and selects an origination and destination in the Flight Request-Segment 2 window 380. The traveler 86 selects flight data from the Flight List window 82 and a record of the selected flight is made in the Trip Activity Log 374 and the Calendar 376.

The traveler 86 selects the Hotel icon 384. From the Hotel Request Information window 386, the traveler 86 may search for hotels in the destination city. The traveler 86 selects from a list of hotels from the Hotel List window 388. A record of the hotel selection is made in the Trip Activity Log 374 and on the Calendar 376.

The traveler 86 may select the Rental Car icon 390 to see the Car Request Information window 392. After energizing the Search button 394, the traveler 86 receives a list of available cars and prices in the destination city from the Car List window 396. After the traveler 86 selects a car, a record of the car selected is made in the Trip Activity Log 374 and on the Calendar 376.

The traveler 86 selects the Cost icon 398 to view the Trip Price Information window 400. From the Trip Price Information window 400, the traveler 86 may search for cheaper flights by energizing the Search for Cheaper Flights button 402 which brings up the BargainFinderPlus Parameters window 404. From the BargainFinderPlus Parameters window 404, the traveler 86 may search for cheaper flights by selecting from a menu of parameters. After completing the search, results are displayed from the BargainFinderPlus Search Results window 406 from which the traveler 86 may select from a menu of flights. The traveler 86 may select a different flight by energizing Yes button 408 in the Replace Flights Message window 410. A record of this transaction is made by updating the Trip Activity Log 374 and the Calendar 376.

The traveler 86 may confirm ticketing by energizing the Confirm Ticketing icon 412. From the Confirmation-Ticket Delivery window 414, the traveler 86 may choose a method for obtaining tickets by energizing Okay button 416. The travel Itinerary window 418 is then displayed for the traveler 86.

The traveler 86 may create a reservation by pressing the Finish icon 420. If the traveler 86 wishes to finish the reservation process and send it on to the travel agency for processing, the traveler 86 may energize Yes button 422 in the Finish Reservations window 424. The resulting display shows the Trip Activity Log 374 and the Calendar 376 with current travel information.

Now turning to FIG. 15, which consists of FIGS. 15A–15G, which are diagrams of graphical user interfaces for repeat trip planning as described above in reference to FIG. 4. The traveler 86 energizes the Frequent Trip icon 426 to receive a menu of frequent trips in the Frequent Trip window 428. The traveler 86 then requests additional details from a selected frequent trip by energizing the Details button 430. If the appropriate frequent trip was selected, the traveler 86 energizes Okay button 432 from the Frequent Trip Details window 434. The traveler 86 then energizes the Select Trip button 436 from the Frequent Trip window 428. The traveler 86 then inputs the date on which travel will begin and energizes the Reserve button 438 in the Frequent Trip Dates window 440. As this information is being processed, the Frequent Trip-Reserving window 442 is viewed by the traveler 86. If Cancel button 444 is not depressed, the Frequent Trip Completed window 446 is displayed and the traveler 86 finishes the reservation process by energizing Yes button 448.

Figure 16A:
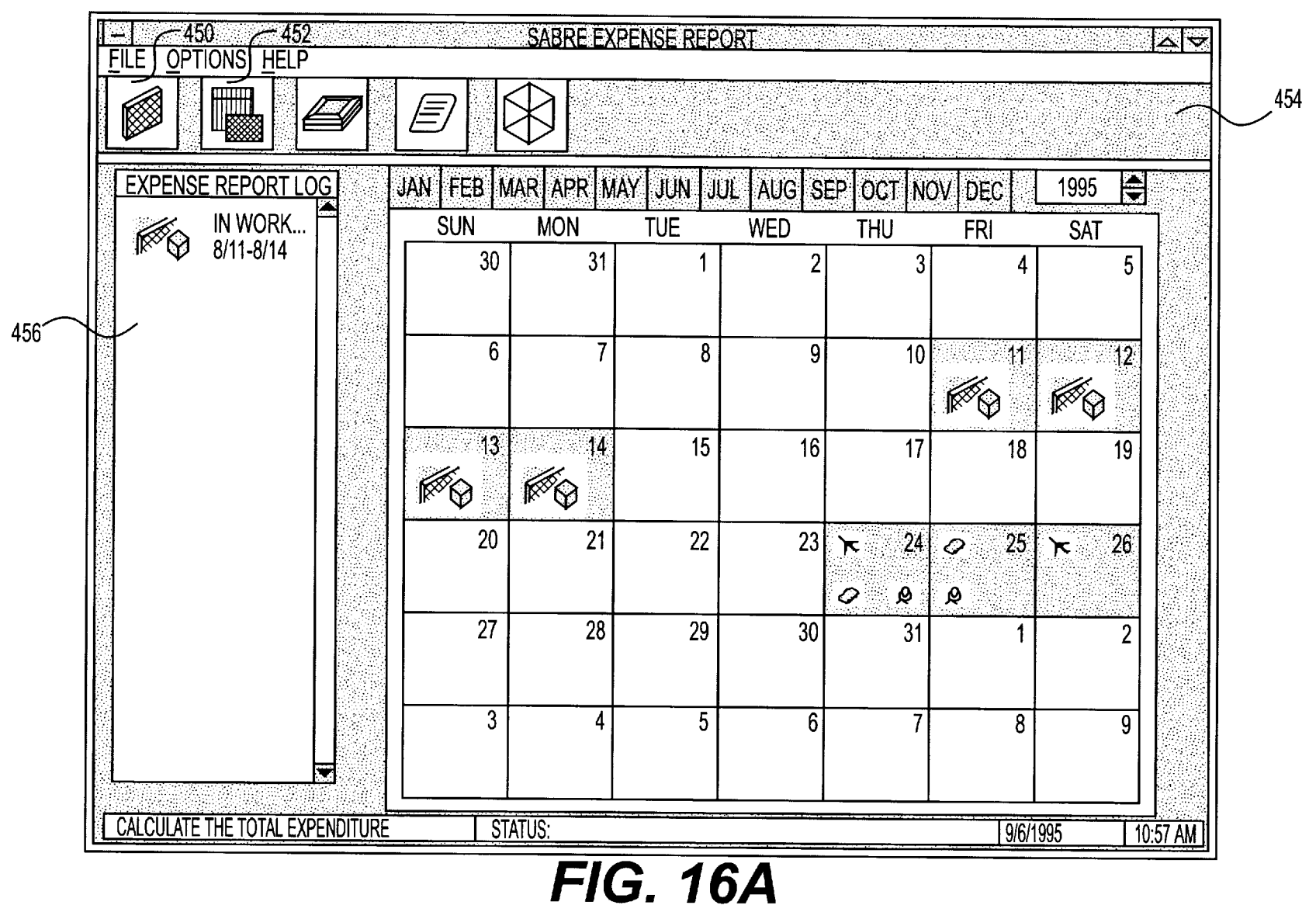
Figure 16D:
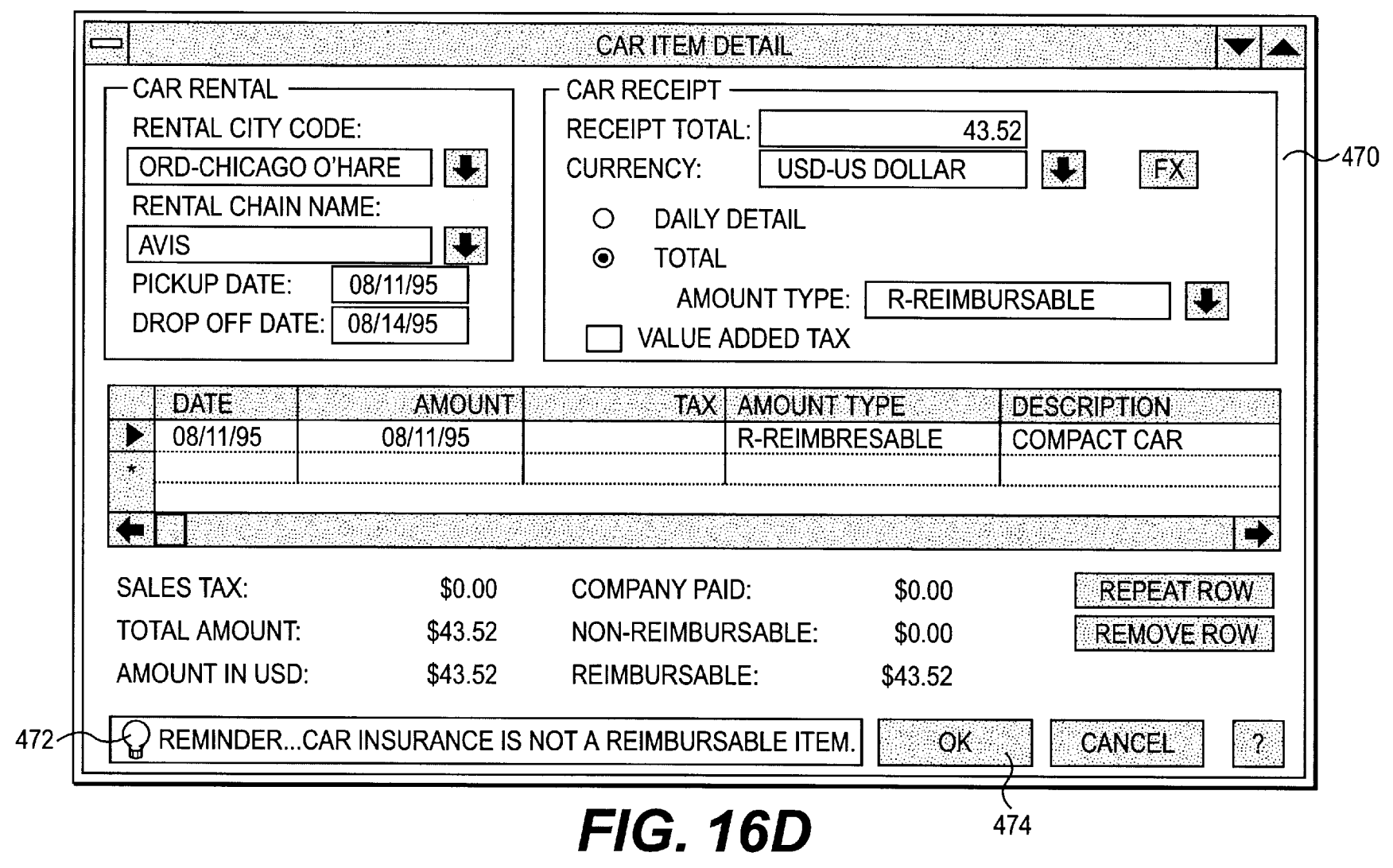
Figure 16H:
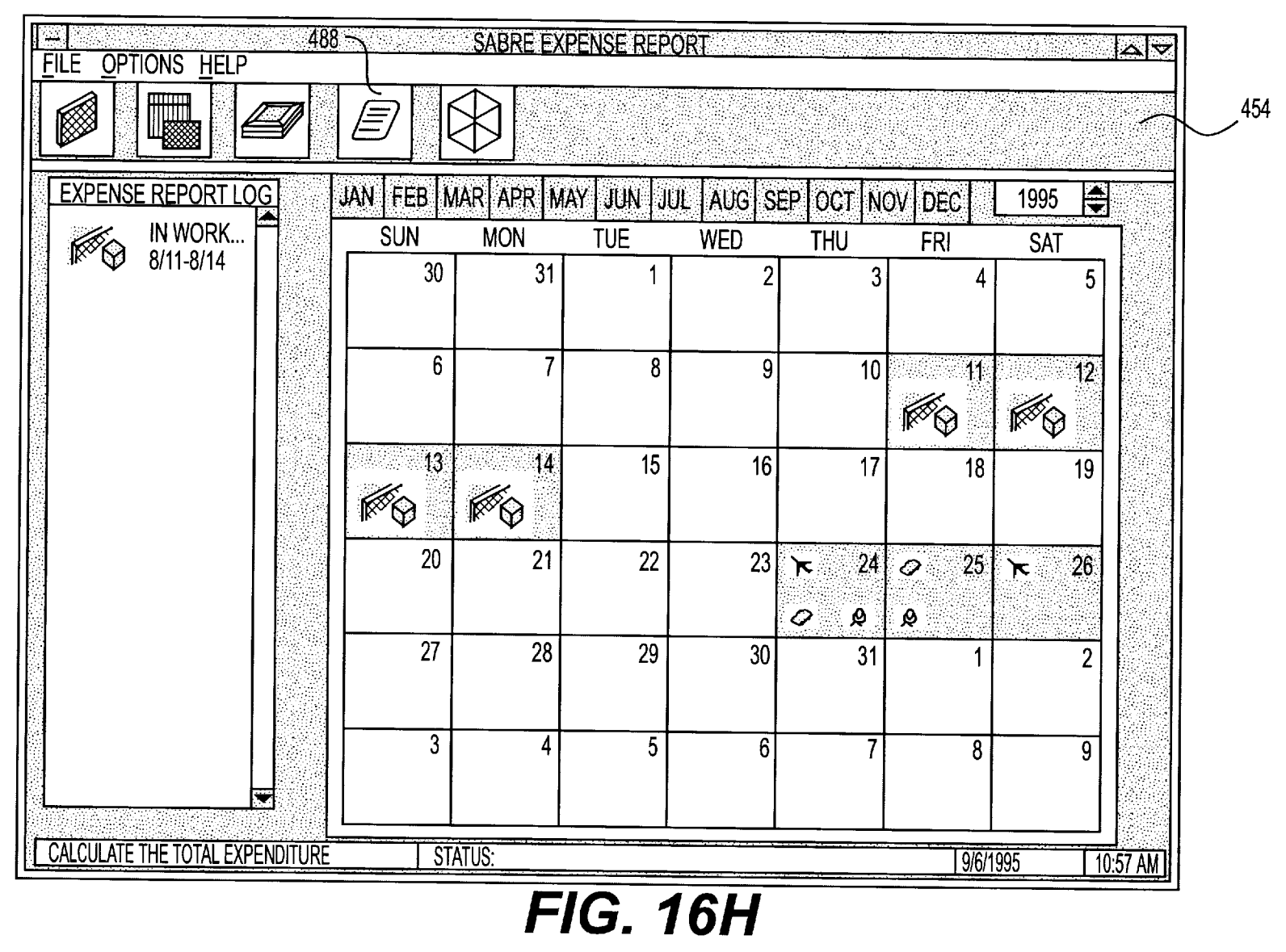
Figure 16I:
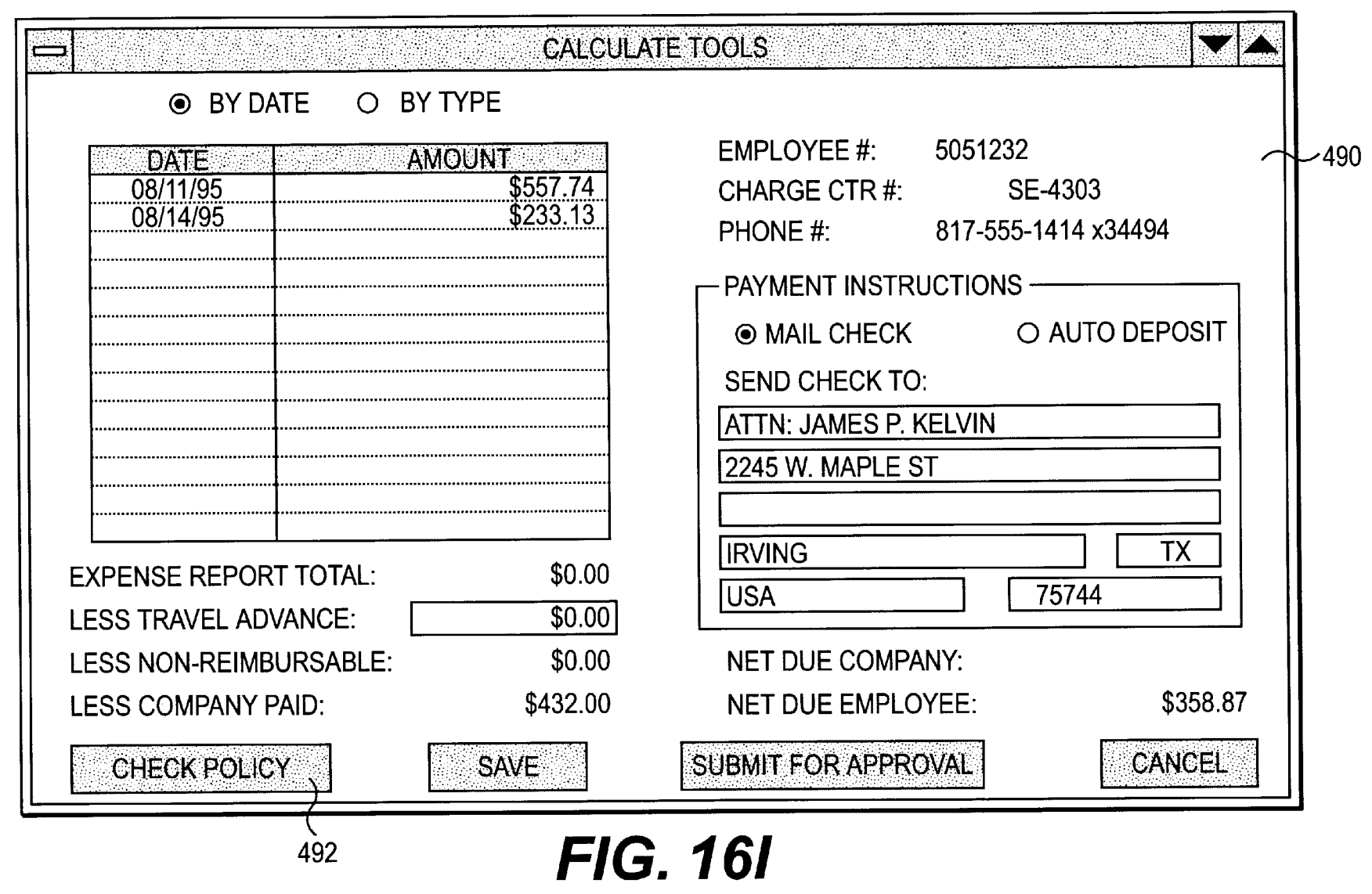
Figure 16J:
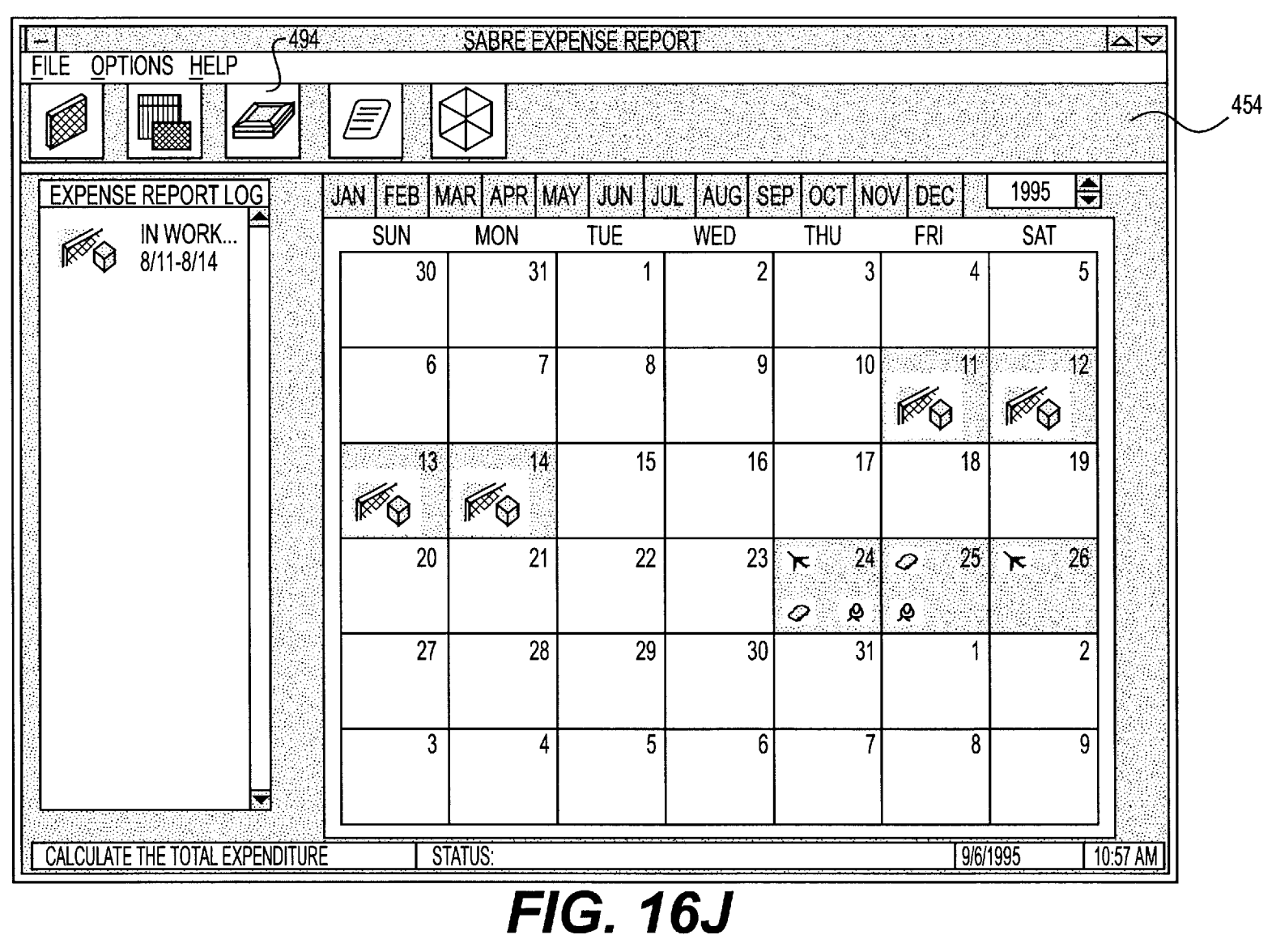
Figure 16K:
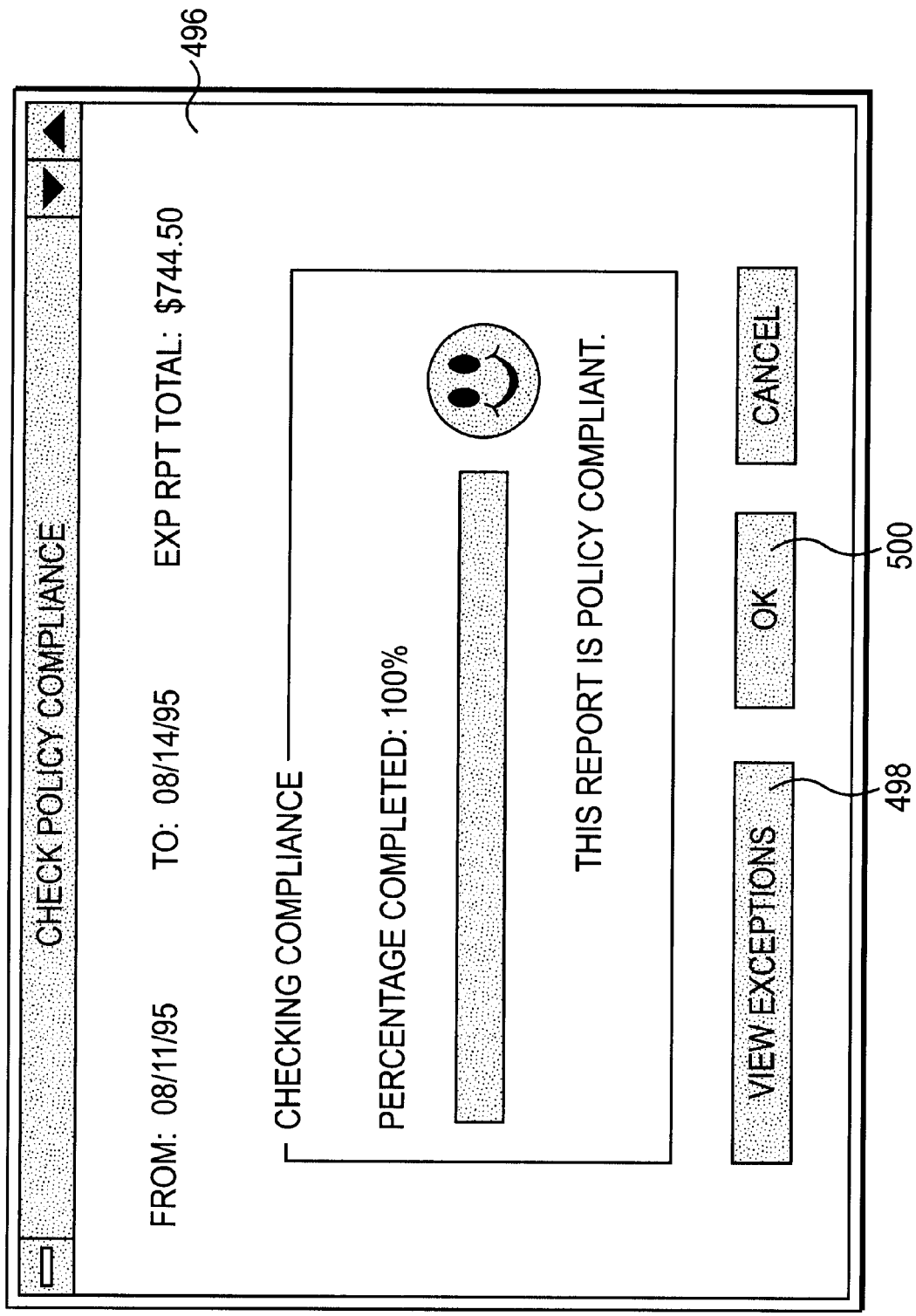
FIG. 16, consisting of 16A–16M, is a series of graphical user interfaces for creating an expense report.
Figure 16M:
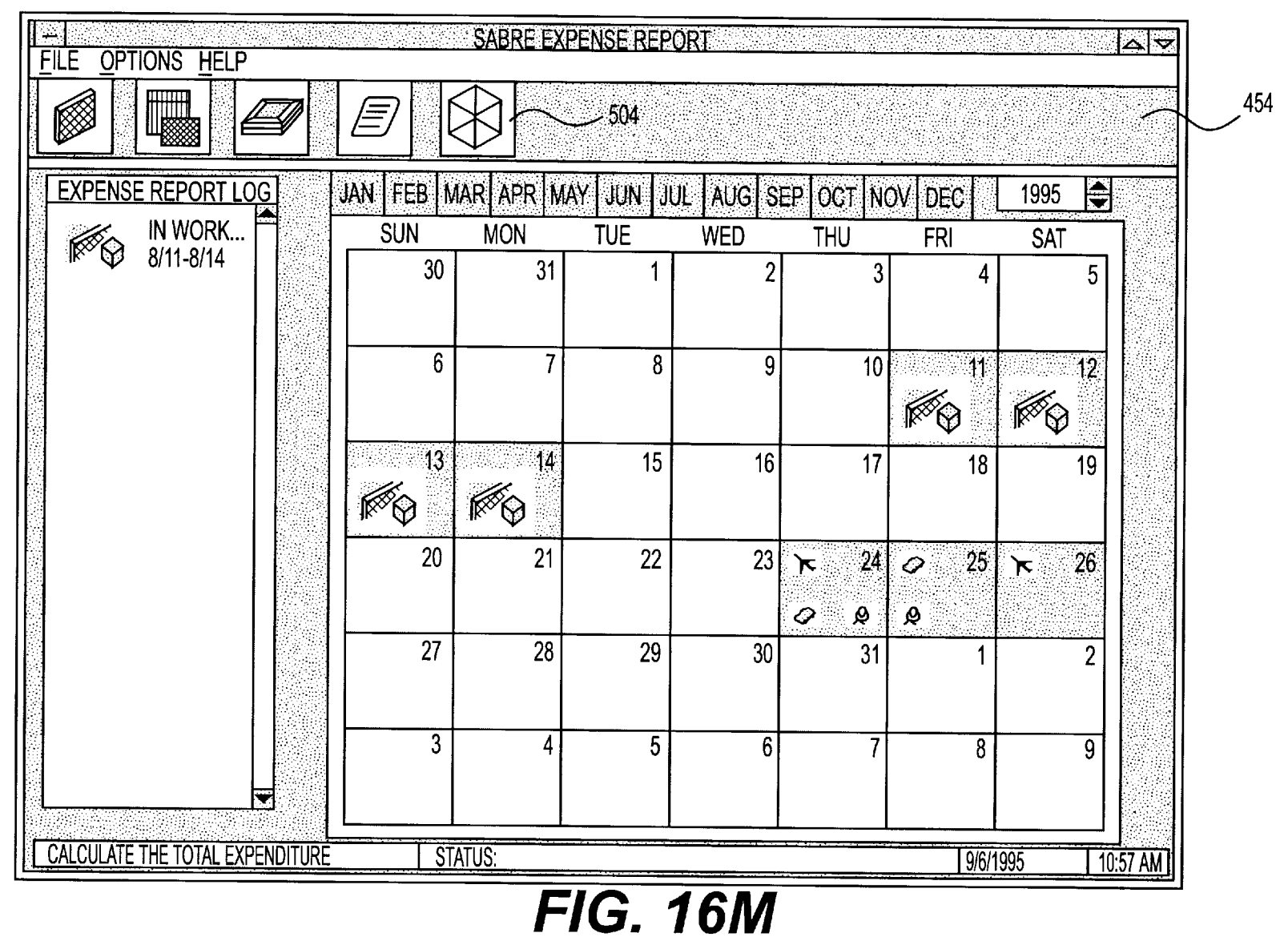

Now turning to FIG. 16, which consists of FIGS. 16A–16M, which are diagrams of graphical user interfaces for creating an expense report as described above in reference to FIG. 10. The traveler 86 selects New Expense Report icon 450 or Modify Expense Report icon 452 from the Expense Report window 454 which shows the status of saved expense reports in an Expense Report Log window 456. Energizing the New Expense Report icon 450 or the Modify Expense Report icon 452 brings up the Expense Data Range window 458, from which the traveler 86 enters or the corporate database 18 autofills date, project and purpose of the trip/expense parameters. The traveler 86 then energizes the Okay button 460 to view the Air Item Detail window 462 from which the traveler 86 enters or the corporate database 18 autofills charge parameters for the selected city pair 464. The traveler 86 may also enter an explanation of expenses in the Explanation window 466.

The traveler 86 then energizes the okay button 468 to view the Car Item Detail window 470 from which the traveler 86 enters or the corporate database 18 autofills car rental and car receipt parameters. The corporate database 18 also provides corporate policy data 472 to the traveler 86. The traveler 86 then energizes the okay button 474 to view the Hotel Item Detail window 476 from which the traveler 86 enters or the corporate database 18 autofills hotel booking and hotel receipt parameters. The traveler 86 then energizes the okay button 478 to view the Meals Detail window 480 from which the traveler 86 enters or the corporate database 18 autofills reimbursement parameters. The traveler 86 then energizes the Okay button 478 to view the Business Entertainment Detail window 484 from which the traveler 86 enters or the corporate database 18 autofills entertainment parameters. To return to the Expense Report window 454, the traveler 86 energizes the Okay button 486.

The traveler 488 may select the Calculate Totals icon 488 to bring up the Calculate Totals window 490. Expense are totaled by date or by type for the traveler 86. The traveler 86 may also input payment instructions.

The traveler 86 may check for policy compliance by energizing the Check Policy button 492 from the Calculate Totals window 490 of the Check Policy icon 494 from the Expense Report window 454. The traveler 86 views the Check Policy Compliance window 496 while the system does a policy check. The traveler 86 may request explanation of policy violations by energizing the View Exceptions button 498. The traveler 86 may also energizing the Okay button 500 to view the expense report in Expense Report window 502. The traveler 86 submits the expense report for approval by energizing the Submit for Approval icon 504.

Figure 17:
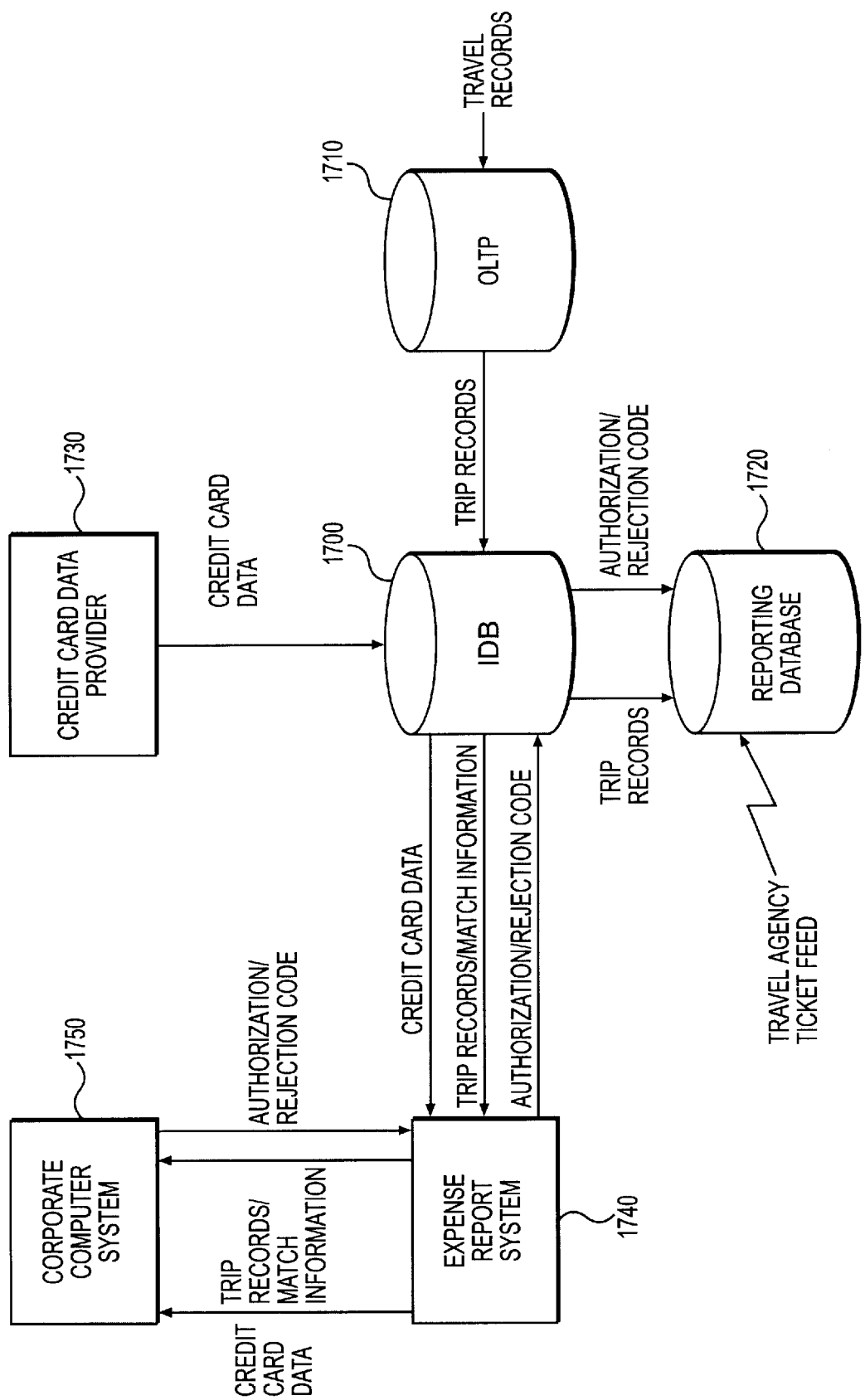
FIG. 17 is a block diagram showing the elements of the integrated database system according to another embodiment of the present invention.

In an alternative embodiment, systems consistent with the present invention match booked trips to receipts that are received after a trip using an integrated database and associated elements. As shown in FIG. 17, an integrated database system (IDB) 1700 receives/sends data from/to an on-line transaction processor system (OLTP) 1710, a reporting database 1720, a credit card data provider 1730, and an expense report system 1740. IDB 1700, OLTP 1710, reporting database 1720, and expense report system 1740 each include a database, a memory, and a processor to perform functions on data.

Expense report system 1740 and corporate computer system 1750 are connected in a network at one location. IDB 1700 and OLTP 1710 are connected in a network at a second location different from the first location. Reporting database 1720 may be connected in the network at the first location or in the network at the second location.

OLTP 1710 performs similar functions as the travel planning module 40 in FIG. 2. OLTP 1710 receives booked trip records including reservations. These reservations may include hotels, airlines, restaurants, activities, and any other travel information related to a traveler's trip itinerary. In one embodiment, the OLTP 1710 includes a processor and instructions for making reservations. In this embodiment, OLTP 1710 has access to travel preference data such as preferred airlines or car rental companies. OLTP 1710 uses a CRS (not shown) to make reservations as described with respect to FIG. 2.

IDB 1700 is a system that receives data, formats the data, and outputs the data to other subsystems. IDB 1700 is used to temporarily hold and format data before outputting it to another subsystem. OLTP 1710 sends trip records to IDB 1700 which in turn sends this information to reporting database 1720 and expense report system 1740. The trip records correspond to segments of a user's trip, such as air travel, car rental travel, and hotel stays. Each record has a potential corresponding receipt.

Credit card data provider 1730 feeds receipt data to IDB 1700. The receipt data reflects credit card purchases and is provided by a credit card data provider 1730 such as a one-hundred dollar charge at a Marriot Hotel in Atlanta, Georgia. Credit card receipt information is provided by companies that have agreed to the release of this information. IDB 1700 parses the incoming credit card data and places each receipt in a standard pre-defined format. For example, receipt data may include airline names in a plurality of formats, such as American Airlines or AA. The standard format has predefined locations for specific types of information. For example, the first three lines of a record in the standard format may include a company name, the next few lines a company address, followed by a total amount of payment, and the date of sale.

IDB 1700 compares the trip records to the credit card data as discussed with respect to FIG. 18 below. The purpose of this comparison is to match elements of the trip data with receipts for each element. For example, a planned hotel stay is matched with credit card receipt data for the hotel stay. The result of the comparison is a list of matches that are found between credit card receipts and trip records. This matched data along with all trip data and receipt data are output to the expense report system 1740. Expense report system 1740 outputs to corporate computer 1750 all the trip data, credit card data, and matched data information. Corporate computer 1750 forwards the information to designated parties such as those preparing expense reports. Traveler prepared expense reports are reviewed by an administrator and approved or rejected. Corporate computer 1750 returns an approved or rejected code to the expense report system 1740. Expense report system 1740 forwards the authorization or rejection code to the IDB 1700 which in turn forwards the same to reporting database 1720.

Reporting database 1720 gathers expense and travel information for purposes of generating reports. Reporting database 1720 also receives information from a travel agency ticket feed on the status of various tickets, such as refunds, voids, and exchanges. Reporting database 1720 stores this information for reports.

Figure 18:
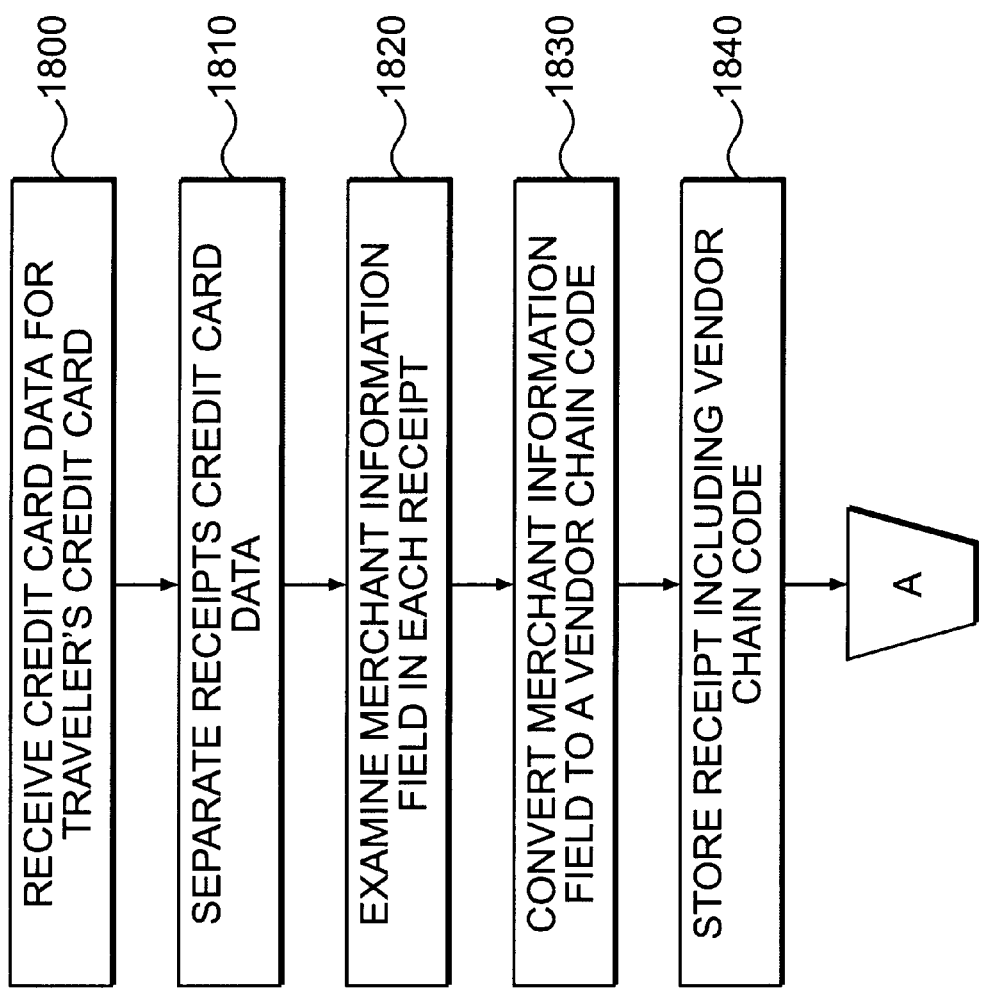
FIG. 18 is a flow chart showing the steps for placing credit card data in a uniform format.

FIG. 18 shows the steps performed by IDB 1700 to format credit card data. IDB 1700 receives credit card data related to a traveler's credit card from credit card provider 1730 (step 1800). IDB 1700 separates receipts in the credit card data (step 1810). IDB 1700 then examines each receipt for a merchant information field (step 1820). The merchant information field may be in many forms such as a full or partial name of the merchant or some other code that uniquely identifies a merchant. IDB 1700 converts the information from the merchant information field into a vendor chain code representing the merchant (step 1830). For example, the merchant information field may indicate a specific hotel in a chain such as the Hyatt Regency in Miami, Fla. IDB 1700 converts the merchant information into a vendor chain code that represents just the hotel chain— Hyatt. IDB 1700 stores a table of merchants that may correspond to various codes in the credit card data. Next, IDB 1700 stores the receipt data along with the vendor chain code (step 1840). Processing continues with FIG. 20.

Figure 19:
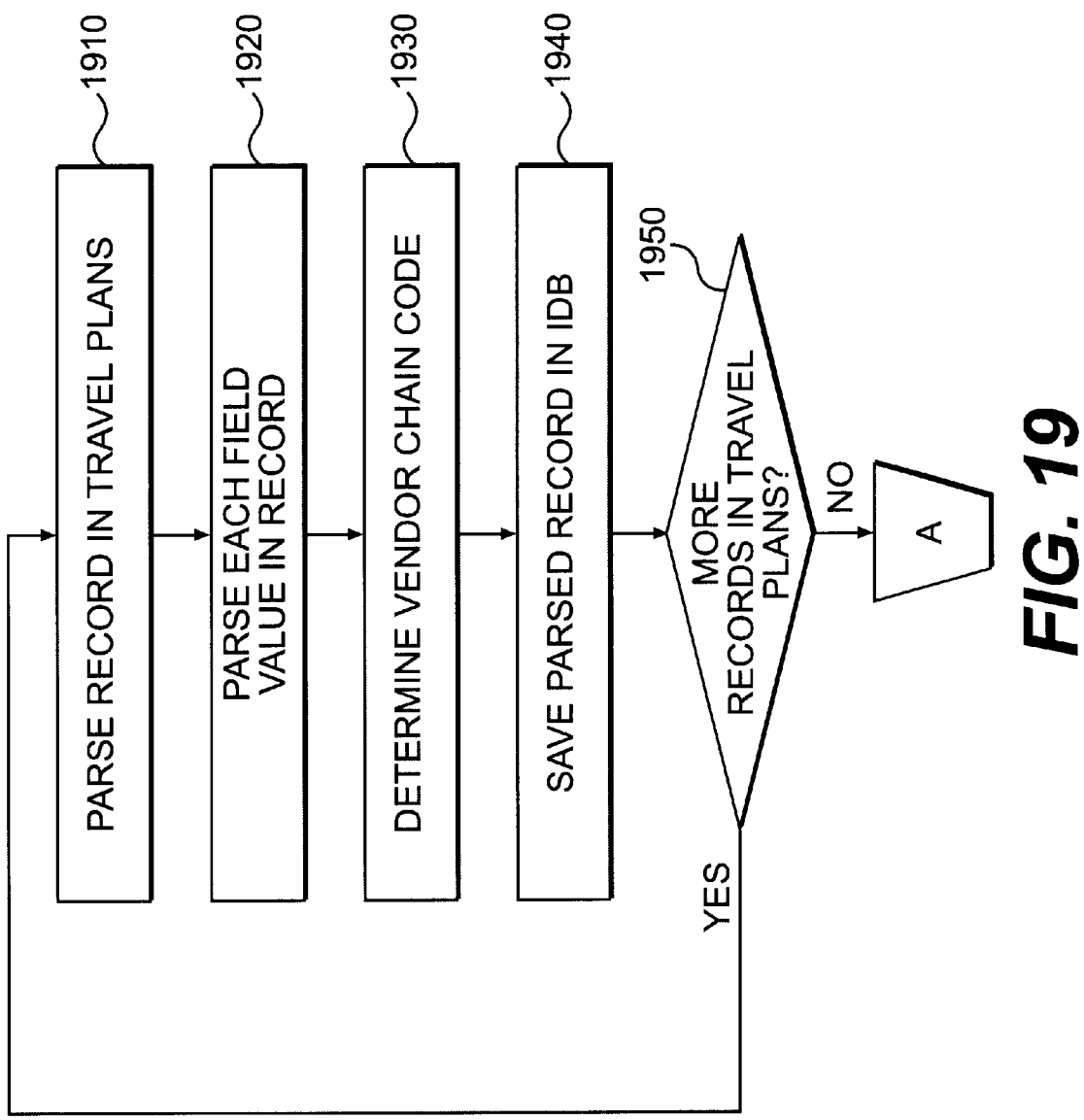
FIG. 19 is a flow chart showing the steps for examining the trip records.

FIG. 19 shows the steps for converting travel data into a pre-defined format and storing the formatted data. As discussed above, trip records include a plurality of segments where each segment is stored as a record in IDB 1700. IDB 1700 parses each record in the trip records (step 1910). IDB 1700 parses each field value in the record, such as the merchant information field and the date field (step 1920). IDB 1700 determines the pre-defined vendor chain code associated with a merchant in the information field of the record (step 1930). IDB 1700 then saves the parsed record including the vendor chain code (step 1940). IDB 1700 determines whether there are more records in the trip records to parse (step 1950) and if not processing continues with the steps shown in FIG. 20.

Figure 20:
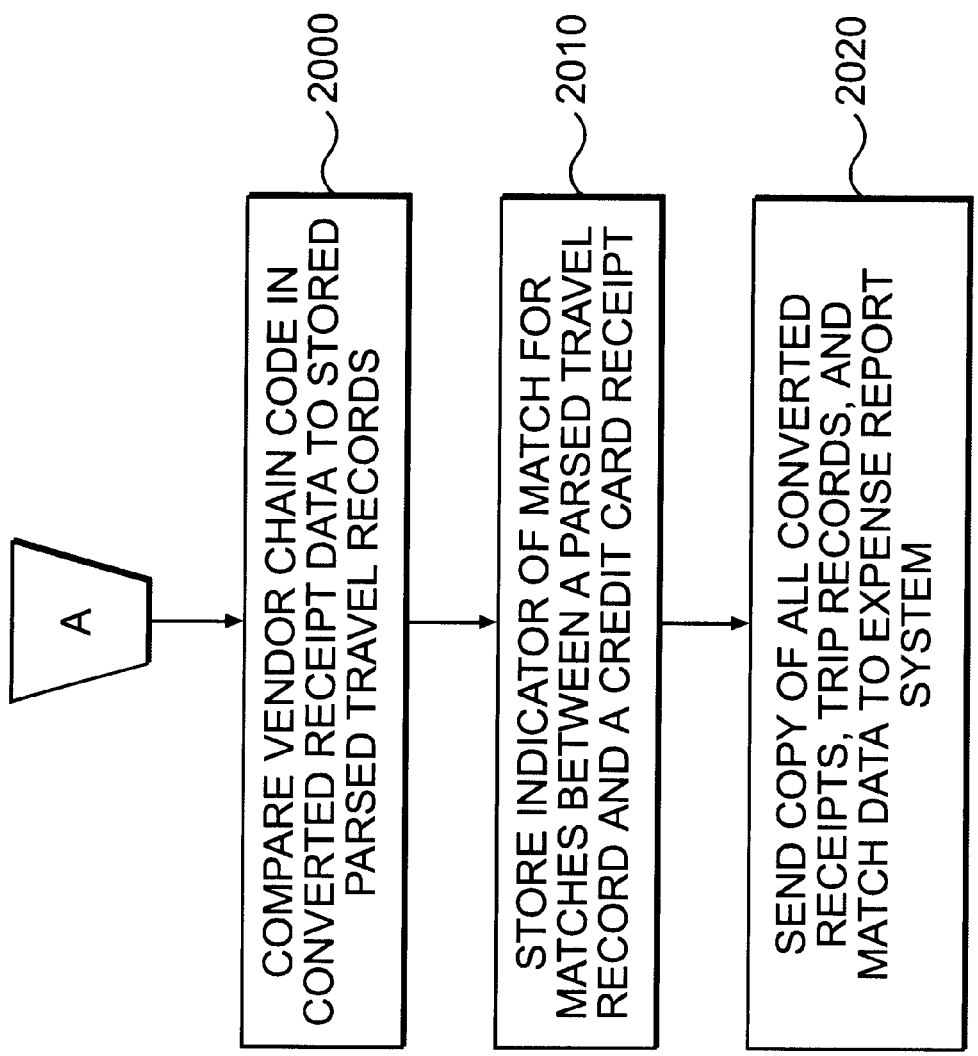
FIG. 20 is a flow chart showing the steps for comparing the credit card data and trip records according to one embodiment of the present invention.

FIG. 20 shows the steps IDB 1700 performs to match travel data and credit card receipts. IDB 1700 compares the vendor chain codes in the converted receipt data to the vendor chain codes stored with the parsed records (step 2000). If the codes match, an indicator is stored along with the parsed record identifying a matching receipt (step 2010). IDB 1700 sends a copy of all converted receipts, trip records, and match data to the expense report system 1740 (step 2020).

In one embodiment, IDB 1700 waits a period of time after a trip before performing the steps in FIG. 20 in order to allow time for all of the credit card receipts to be returned.

In another embodiment, other data besides merchant information is used to match receipt data to trip data such as a date of the trip/date of payment, amount of receipt/amount of reservation, or any other data present in both the trip data and the receipt data.

The foregoing description of an implementation of the invention is presented for purposes of illustration and description. It is not exhaustive and does not limit the invention to the precise form disclosed. Modifications and variations are possible in light of the above teachings or may be acquired from practicing the invention. For example, the described implementation includes software, but the present invention may be implemented as a combination of hardware and software or on hardware alone. The scope of the invention is defined by the claims and their equivalents.

What is claimed is:

1. A computerized method for processing information related to travel including:
   storing in a database a travel data record corresponding to a travel itinerary, said travel data record including a chain code associated with a provider of travel services;
   receiving data reflecting at least one expense transaction;
   extracting merchant information from the expense transaction data;
   assigning a chain code based on the extracted merchant information;
   comparing the assigned chain code to the chain code associated with the provider of travel services; and
   outputting data reflecting a match between the assigned chain code and the chain code associated with the travel data record.

2. The method according to claim 1, wherein the step of comparing including the steps of:
   examining travel segments in the travel data record; and
   determining a chain code for each travel segment.

3. The method of claim 2 wherein the step of comparing includes the step of:
   comparing the assigned chain code to the chain code for each segment in the travel data record.

4. The method according to claim 1 further including the steps of:
   locating a payment date in each receipt;
   converting the payment date into a pre-defined format; and
   comparing travel dates for the segments in the travel data to the stored converted payment dates.

5. The method according to claim 1, further including the steps of:
   outputting the receipt date to an external system;
   outputting the travel data to the external system;
   outputting matches, in response to the step of comparing, to the external system.

6. A data processing system for processing travel data and expense receipts comprising:
   a memory including program instructions; and
   a processor operating responsive to the program instructions to:
      receive a travel data record, said travel data record including at least one chain code associated with a provider of travel services;
      receive data reflecting an expense receipt;
      extract merchant information from the expense receipt data;
      assign a chain code based on the extracted merchant information;
      compare the assigned chain code to the chain code associated with the travel data record; and
      output data reflecting a match between the assigned chain code and the chain code associated with the travel data record.

7. The system of claim 6 wherein said travel data includes a plurality of travel segments, the processor further operates responsive to the program instructions to:
   identify segments in the travel data; and
   extract a chain code from each segment.

8. The system of claim 7 wherein the processor further operates responsive to the program instructions to:
   receive a plurality of receipts;
   locate merchant information in each receipt;
   convert the merchant identifier to a pre-defined format;
   store the converted merchant identifier with the receipt; and
   compare the extracted segment chain codes to the assigned chain code in the receipt.

9. The system of claim 6 wherein the processor further operates responsive to the program instructions to:
   locate a payment date in the receipt;
   convert the payment date into a pre-defined format;
   store the converted payment date; and
   compare the stored travel dates in the segments of the travel data to the stored converted payment dates.

10. The system of claim 6, wherein the processor further operates responsive to the program instructions to:
    output the receipt data to an external system;
    output the travel data to the external system; and
    output matches, based on the comparison, to the external system.

11. A data processing system for matching trip data and receipts comprising:
    an on-line transportation processing system for generating trip records; and
    an integrated database system for receiving the generated trip records from the processing system and receiving receipt data from at least one provider of travel services, said integrated database system including means for extracting chain codes from the trip records, means for converting merchant information contained in the receipt data to chain codes, means for comparing the extracted chain codes of the trip records to the converted chain codes associated with the receipt data, and means for outputting the trip records, receipt data and comparison data.

12. A system for matching booked trip data with travel receipts comprising:

a transaction processor configured to receive a set of booked trip data records generated in a reservation system, each of the booked trip data records comprising a set of different types of travel services; and an integrated database system configured to receive the booked trip data generated in the reservation system and travel expense statements generated by a credit provider and including information on a set of purchases, the integrated database system having a table of vendor chain codes for each of a plurality of merchants and a processor configured to examine each booked trip data record to identify travel merchant information for each of the different types of travel services listed in each of the booked trip data records, identify a vendor chain code for each of the travel services listed in each of the booked trip data records based on the identified travel merchant information, examine each of the travel expense statements to identify travel merchant information reflected by each purchase, assign a vendor chain code from the table of vendor chain codes to each purchase based on the identified travel merchant information, compare the identified vendor chain code of each travel service listed in the booked trip data records with the assigned vendor chain code of each purchase, and output a listing of matched vendor chain codes reflecting matches between the travel service listed in the booked trip data records and the purchase.

13. The system of claim 12, wherein the processor of the integrated database system is further configured to output a listing of matched date information reflecting matches between the travel service listed in the booked trip data records and the purchase.

14. A computer implemented method of matching booked trip data with travel receipts comprising:

receiving a plurality of booked trip data records each including a listing of different types of travel services;

receiving one or more travel expense statements each listing a plurality of credit card receipts each reflecting one or more credit card purchases from a credit card service provider;

examining each of the booked trip data records so as to identify travel merchant information for each of the different types of travel services listed in each of the booked trip data records;

identifying a vendor chain code for each of the travel services listed in each of the booked trip data records based on the identified travel merchant information;

separating the credit card receipts listed in the one or more travel expense statements;

examining each of the separated credit card receipts so as to identify travel merchant information reflected in each credit card purchase;

assigning a vendor chain code from a table of vendor chain codes to each credit card receipt based on the identified travel merchant information;

comparing the identified vendor chain codes of each of the travel services listed in the booked trip data records with the assigned vendor chain codes of the credit card receipts;

matching common vendor chain codes between the travel services listed in the booked trip data records and the credit card purchases reflected in the credit card receipts; and outputting a listing of the matched vendor chain codes between the travel services listed in the booked trip data records and the credit card purchases reflected in the credit card receipts.

15. The method claim 14, further comprising:

matching date information of each of the travel services listed in each of the booked trip data records with corresponding date information associated of each of the credit card purchases reflected in the credit card receipts; and outputting a listing of the matched date information between the travel services listed in the booked trip data records and the credit card purchases reflected in the credit card receipts.

* * * * *

UNITED STATES PATENT AND TRADEMARK OFFICE
CERTIFICATE OF CORRECTION

PATENT NO. : 6,442,526 B1
DATED : August 27, 2002
INVENTOR(S) : Arlene M. Vance et al.

It is certified that error appears in the above-identified patent and that said Letters Patent is hereby corrected as shown below:

Column 15,
Line 59, "including" should read -- includes --.

Column 18,
Line 36, "method claim" should read -- method of claim --.

Signed and Sealed this

Fourth Day of January, 2003

JAMES E. ROGAN
*Director of the United States Patent and Trademark Office*